(12) United States Patent
Anderson et al.

(10) Patent No.: US 6,319,989 B1
(45) Date of Patent: Nov. 20, 2001

(54) BROAD MWD, COMPOSITIONALLY UNIFORM ETHYLENE INTERPOLYMER COMPOSITIONS, PROCESS FOR MAKING THE SAME AND ARTICLE MADE THEREFROM

(75) Inventors: Kenneth W. Anderson; Pak-Wing S. Chum, both of Lake Jackson; David A. Eversdyk, Angleton; Lonnie G. Hazlitt; Pradeep Jain, both of Lake Jackson; Kalyan Sehanobish, Friendsville; Li-Min Tau, Lake Jackson, all of TX (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/463,207

(22) PCT Filed: Jul. 2, 1998

(86) PCT No.: PCT/US98/03854

§ 371 Date: Jan. 20, 2000

§ 102(e) Date: Jan. 20, 2000

(87) PCT Pub. No.: WO99/03902

PCT Pub. Date: Jan. 28, 1999

Related U.S. Application Data

(60) Provisional application No. 60/053,263, filed on Jul. 21, 1997.

(51) Int. Cl.[7] .................... C08F 8/00; C08L 9/00; C08L 23/00; C08L 23/04
(52) U.S. Cl. ................ 525/191; 525/232; 525/240
(58) Field of Search .................... 525/191, 232, 525/240

(56) References Cited

U.S. PATENT DOCUMENTS

| 4,209,599 | | 6/1980 | Brady et al. ............... 526/64 |
| 5,288,531 | * | 2/1994 | Falla et al. ............... 428/35.2 |
| 5,382,630 | * | 1/1995 | Stehling et al. ............ 525/240 |
| 6,117,465 | * | 9/2000 | Falla .................... 426/127 |

FOREIGN PATENT DOCUMENTS

| 0 570 199 A1 | 11/1993 | (EP) . |
| 0 778 289 A1 | 6/1997 | (EP) . |
| 93/07210 | 4/1993 | (WO) . |
| 94/17112 | 8/1994 | (WO) . |
| 96/18662 | 6/1996 | (WO) . |
| 97/43323 | 11/1997 | (WO) . |

* cited by examiner

Primary Examiner—Nathan M. Nutter

(57) ABSTRACT

The present invention pertains to a continuous process and polymerization system characterized by separate injection of catalyst and make-up feed, an ethylene interpolymer composition characterized as having broad molecular weight distribution (MWD) and optimized compositional uniformity, a process for making such a compostion and a fabricated article made from such composition. The novel composition is characterized as having a melt flow ratio, $I_{10}/I_2$, from 8 to 30, a $M_w/M_n$ of greater than 4 as determined by gel permeation chromatography, a melt index, $I_2$, from 0.01 to 1000 grams/10 minutes, preferably greater that 0.1 to 10 grams/10 minutes, and a density less than 0.945 g/cm$^3$. The novel composition exhibits good processibility and improved toughness properties, especially excellent film tear and impact resistance, and is particularly well-suited for use in applications such as high performance trash can liners and heavy duty shipping bags.

12 Claims, 31 Drawing Sheets

BROAD MWD, COMPOSITIONALLY UNIFORM ETHYLENE INTERPOLYMER COMPOSITIONS, PROCESS FOR MAKING THE SAME AND ARTICLE MADE THEREFROM

CROSS REFERENCE TO RELATED APPLICATIONS

This application claims priority of previously filed U.S. Patent Provisional application Ser. No. 60/053,263 filed on Jul. 21, 1997 and previously filed PCT Application PCT/US98/13854 filed on Jul. 2, 1998.

This invention relates to an ethylene interpolymer composition characterized as having broad molecular weight distribution (MWD) and improved compositional uniformity. The invention also relates to a process for making such a composition and fabricated articles made from the novel composition. The novel composition exhibits good processibility and improved toughness properties, especially excellent film tear and impact resistance, and is particularly well-suited for use in applications such as high performance trash can liners and heavy duty shipping bags.

In the manufacture of ethylene interpolymers such as ethylene interpolymerized with at least one unsaturated comonomer, a number of polymerization methods and procedures are known. For example, single site and constrained geometry catalyst systems have been disclosed for manufacturing olefin polymers with high compositional uniformity and relatively narrow molecular weight distributions.

Variations in the reactor systems used to manufacture ethylene interpolymers are also known. For example, while single site catalysis systems are disclosed to provide compositionally uniform, narrow MWD products (e.g., EXACT plastomers supplied commercially by Exxon Chemical Corporation) when employed in a high pressure polymerization system and conversely products with decreased homogeneity with respect to the short chain branching distribution and a broader molecular weight distribution (e.g., EXCEED resins supplied commercially by Exxon Chemical Corporation) when employed in a low pressure gas phase polymerization process.

While the art is replete with various products and manufacturing techniques, the known range of manufacturing capabilities still do not permit the manufacturing of ethylene interpolymer compositions characterized as having good processability and excellent toughness properties such as excellent film tear and impact resistance. That is, known ethylene interpolymer compositions (either as single reactor products, multiple reactor products or polymer blends) do not exhibit the desired balance of good processability (i.e., sufficient extrusion processing characteristics to avoid, for example, objectionable melt fracture during blown film fabrication with sufficient melt strength to permit, for example, good bubble stability to maximize output rates) and excellent toughness.

The traditional polyethylene solution for achieving improved toughness properties involves manufacturing products with narrow molecular weight distributions as broad molecular weight distributions are known to yield reduced toughness properties. Beyond providing a narrow molecular weight distribution, linear polyethylenes are known to provide improved toughness properties relative to highly branched LDPE. Beyond a narrow molecular weight distribution and a linear polymer backbone, compositional uniformity has been offered for enhanced toughness properties. However, while the combination of a narrow molecular weight distribution, a linear polymer backbone and compositional uniformity may provide enhanced toughness, this combination of polymer properties invariably provides poor processability (e.g., the occurrence of melt fracture).

In contrast to the combination of a narrow molecular weight distribution, increased compositional uniformity and a linear polymer backbone, to achieve the balance of good processability (i.e., resistance to melt fracture and improved melt strength) and toughness properties, Lai et al. disclose in U.S. Pat. No. 5,272,236, the disclosure of which is incorporated by reference, substantially linear ethylene polymers characterized as having narrow molecular weight distribution, high compositional uniformity and long chain branching.

Other proposed solutions for achieving the desired property balance include polymer blends such as those disclosed by Kale et al. in U.S. Pat. No. 5,210,142 and Hazlitt et al. in U.S. Pat. No. 5,370,940, the disclosures of both of which are incorporated by reference. However, while such polymer blends exhibit good handling properties and processability, known polymer blends inevitably exhibit insufficient compositional uniformity to provide the desired toughness properties.

Because no known ethylene interpolymer composition provides the desired balance of good to excellent processability, melt fracture resistance, melt strength and toughness as demonstrated by high tear and impact resistance, there is a need for an improved ethylene interpolymer composition. There is also a need for a process for making an improved ethylene interpolymer composition with the desired property balance. There is also a need for a process for making an improved ethylene interpolymer composition wherein the process involves polymerization using multiple reactors and the process is characterized by improved flexibility such that a broad range of product molecular weights and/or densities can be economically manufactured. There is also a need for a blown film with good extrusion processability and high tear and impact resistance. These and other objects will become apparent from the detailed description of the present invention provided herein below.

We have discovered an ethylene interpolymer composition which is characterized by a broad molecular weight distribution and yet also possesses a relatively high compositional uniformity respecting its short chain branching distribution or fractional crystallinity. One aspect of the invention is a process and ethylene polymerization system, the system comprising at least two injection points and at least two polymerization reactors, each reactor having a reaction stream or zone wherein at least one catalyst system and make-up feed is injected and wherein the make-up feed comprises ethylene and optionally at least one unsaturated comonomer, the process comprising continuously operating the at least two polymerization reactors and separately injecting the catalyst system and the make-up feed into the reaction stream or zone of at least one reactor.

A second aspect of the invention is a process and polymerization system for making an ethylene polymer composition, the composition comprising ethylene interpolymerized with at least one unsaturated comonomer and characterized as having:

a) a melt flow ratio, $I_{10}/I_2$, from 8 to 10.4, b) a $M_w/M_n$ of greater than 4 as determined by gel permeation chromatography, c) a melt index, $I_2$, greater than 0.1 gram/10 minutes, d) a composition density less than 0.945 gram/cubic centimeter, and e) based on the total weight of crystallizable polymer portions, a weight percent at the dominant peak temperature above 75° C., as determined using crystallization analysis fractionation in the range of 20 to 100° C., equal to or greater than the mathematical product of $1.7946 \times 10^{-28} \times 10^{(31.839 \times composition\ density)}$ for composition density in grams/cubic centimeter, the system comprising at least two injection points and at least two polymerization reactors, each reactor having a reaction stream or zone wherein at least one catalyst system and make-up feed is injected and wherein the make-up feed comprises ethylene and optionally at least one unsaturated comonomer, the process comprising continuously operating the at least two polymerization reactors and separately injecting the catalyst system and the make-up feed into the reaction stream or zone of at least one reactor.

A third aspect of the invention is a polymer composition comprising ethylene interpolymerized with at least one unsaturated comonomer, wherein the composition is characterized as having:

a) a melt flow ratio, $I_{10}/I_2$, from 8 to 10.4, b) a $M_w/M_n$ of greater than 4 as determined by gel permeation chromatography, c) a melt index, $I_2$, greater than 0.1 gram/10 minutes, d) a composition density less than 0.945 gram/cubic centimeter, and e) based on the total weight of crystallizable polymer portions, a weight percent at the dominant peak temperature above 75° C., as determined using crystallization analysis fractionation in the range of 20 to 100° C., equal to or greater than the mathematical product of $1.7946 \times 10^{-28} \times 10^{(31.839 \times composition\ density)}$ for composition density in grams/cubic centimeter.

The fourth aspect of the invention is a fabricated article comprising an ethylene interpolymer composition, the composition comprising ethylene interpolymerized with at least one unsaturated comonomer and characterized as having:

a) a melt flow ratio, $I_{10}/I_2$, from 8 to 10.4, b) a $M_w/M_n$ of greater than 4 as determined by gel permeation chromatography, c) a melt index, $I_2$, greater than 0.1 gram/10 minutes, d) a composition density less than 0.945 gram/cubic centimeter, and e) based on the total weight of crystallizable polymer portions, a weight percent at the dominant peak temperature above 75° C., as determined using crystallization analysis fractionation in the range of 20 to 100° C., equal to or greater than the mathematical product of $1.7946 \times 10^{-28} \times 10^{(31.839 \times composition\ density)}$ for composition density in grams/cubic centimeter.

In general, the invention represents the ability to separate $I_{10}/I_2$, MWD and compositional uniformity into substantially independent properties and achieve a previously unknown combination of these intrinsic properties as well as a previously unknown combination of performance properties.

FIG. 1 is a plot of the weight percent crystallized at the dominant peak temperature above 75° C., determined using a crystallization analysis fractionation technique (i.e., CRYSTAF™ fractionalysis equipment, software and procedures as provided by PolymerChar) in the range of 20 to 100° C. and based on the total amount of crystallizable polymer portions, for Inventive Compositions and comparative compositions as a function of composition density.

Figure 12:
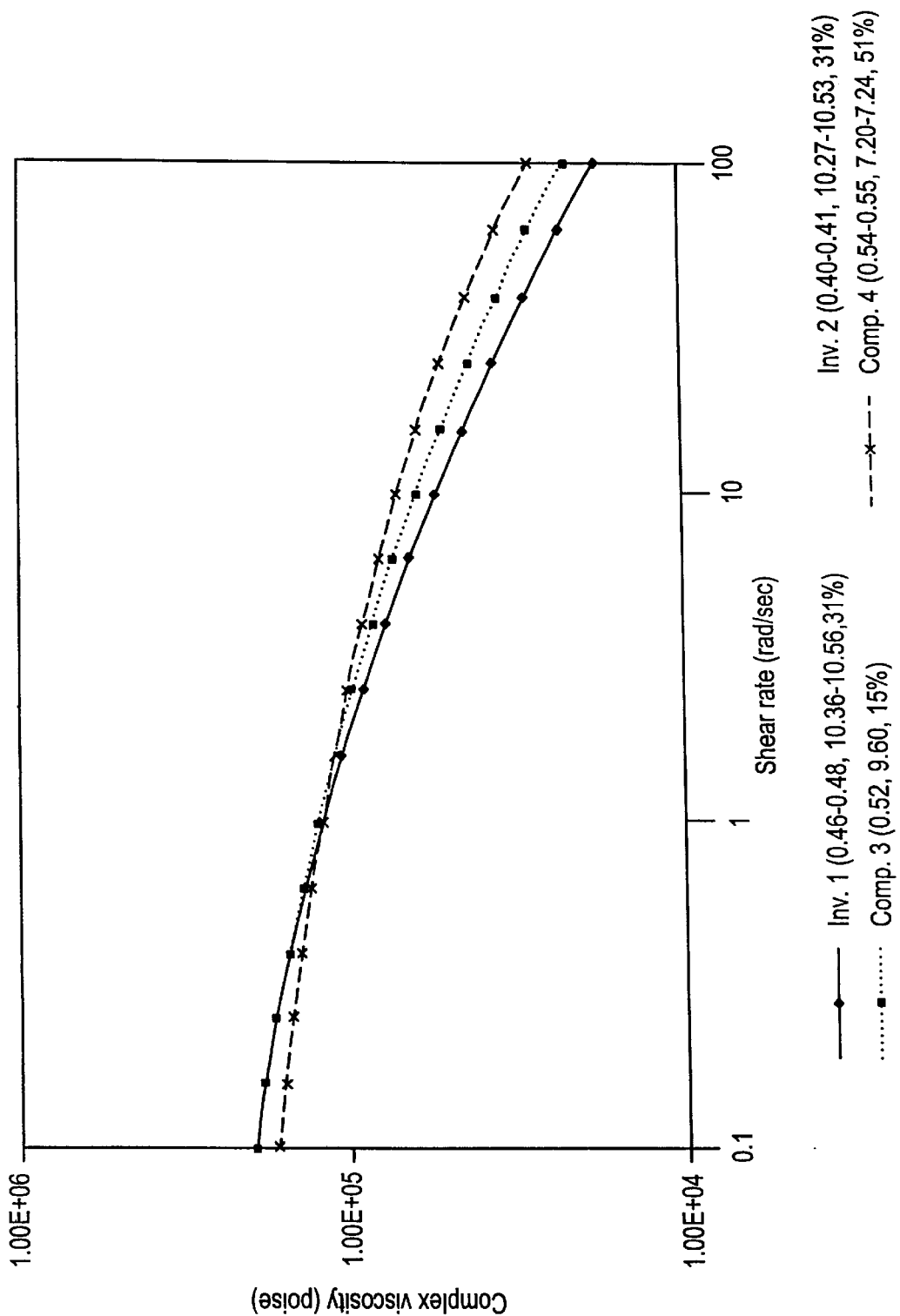

FIG. 12 is a low shear rheology curve of Inventive Compositions 1 and 2 and comparative compositions 3 and 4.

Figure 13:
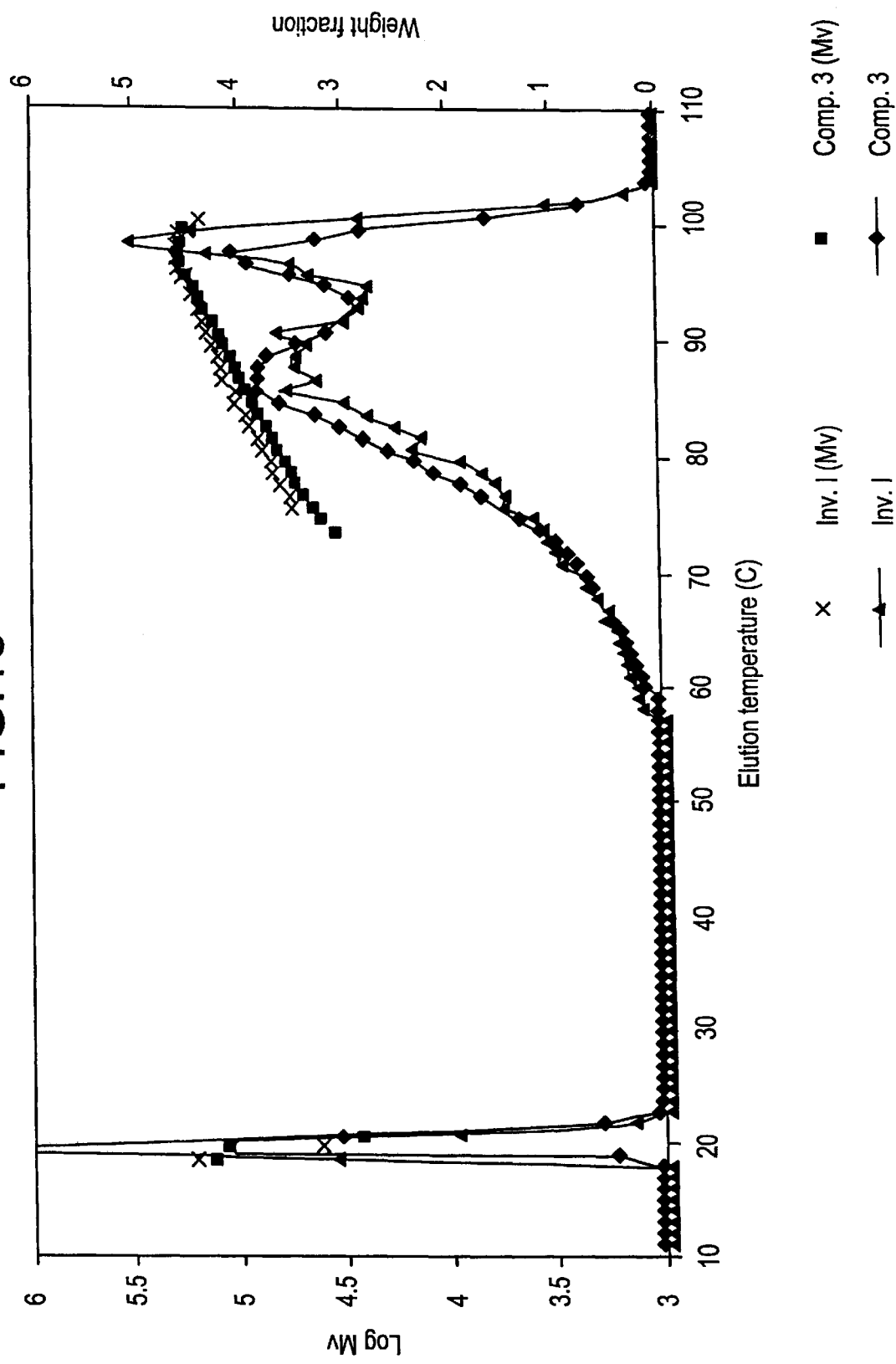

FIG. 13 is an ATREF-DV curve comparing the short chain branching distribution as related to viscosity-average molecular weight ($M_v$) of Inventive Composition 1 and comparative composition 3.

Figure 14:
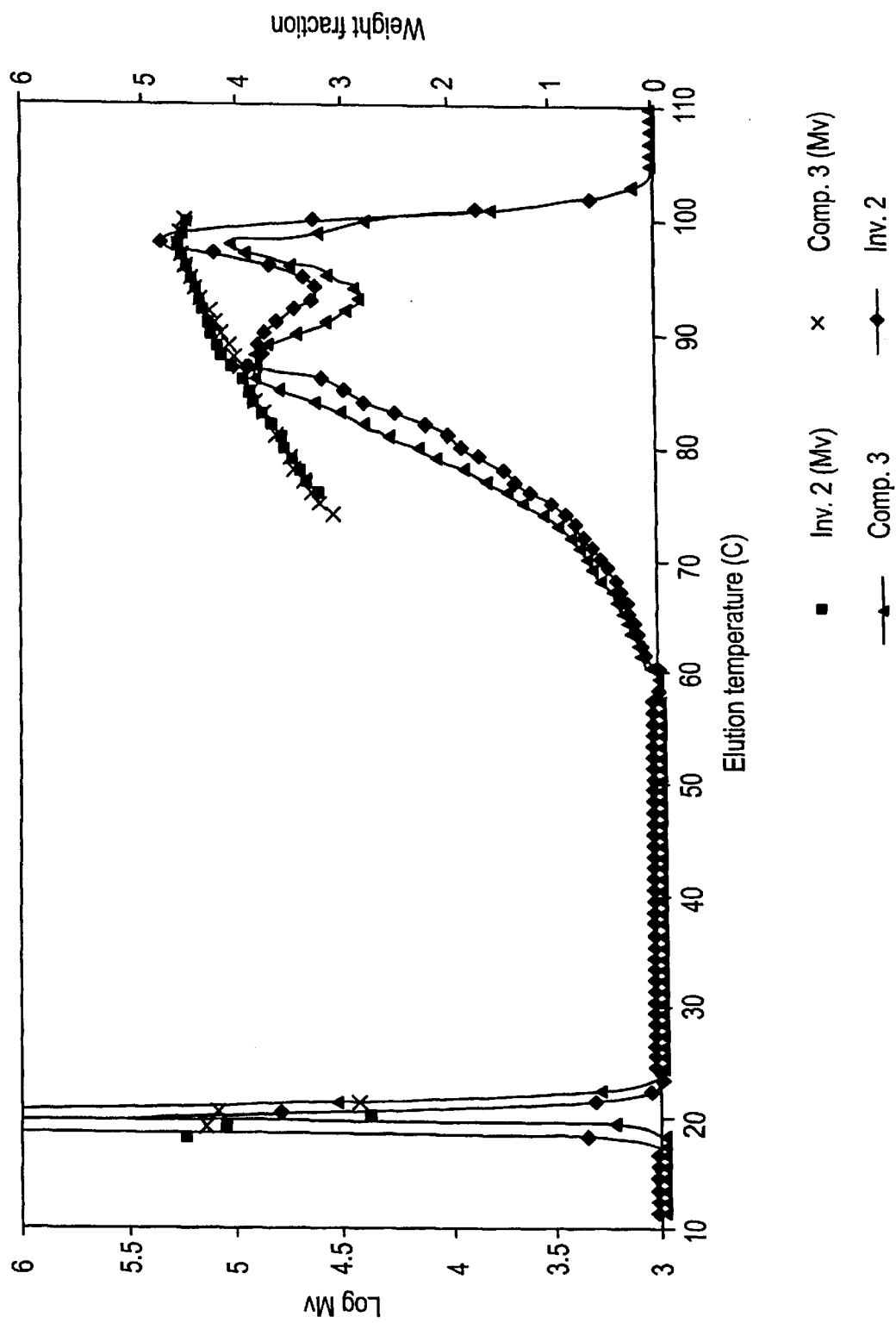

FIG. 14 is an ATREF-DV curve comparing the short chain branching distribution as related to viscosity-average molecular weight ($M_v$) of Inventive Composition 2 and comparative composition 3.

Figure 15:
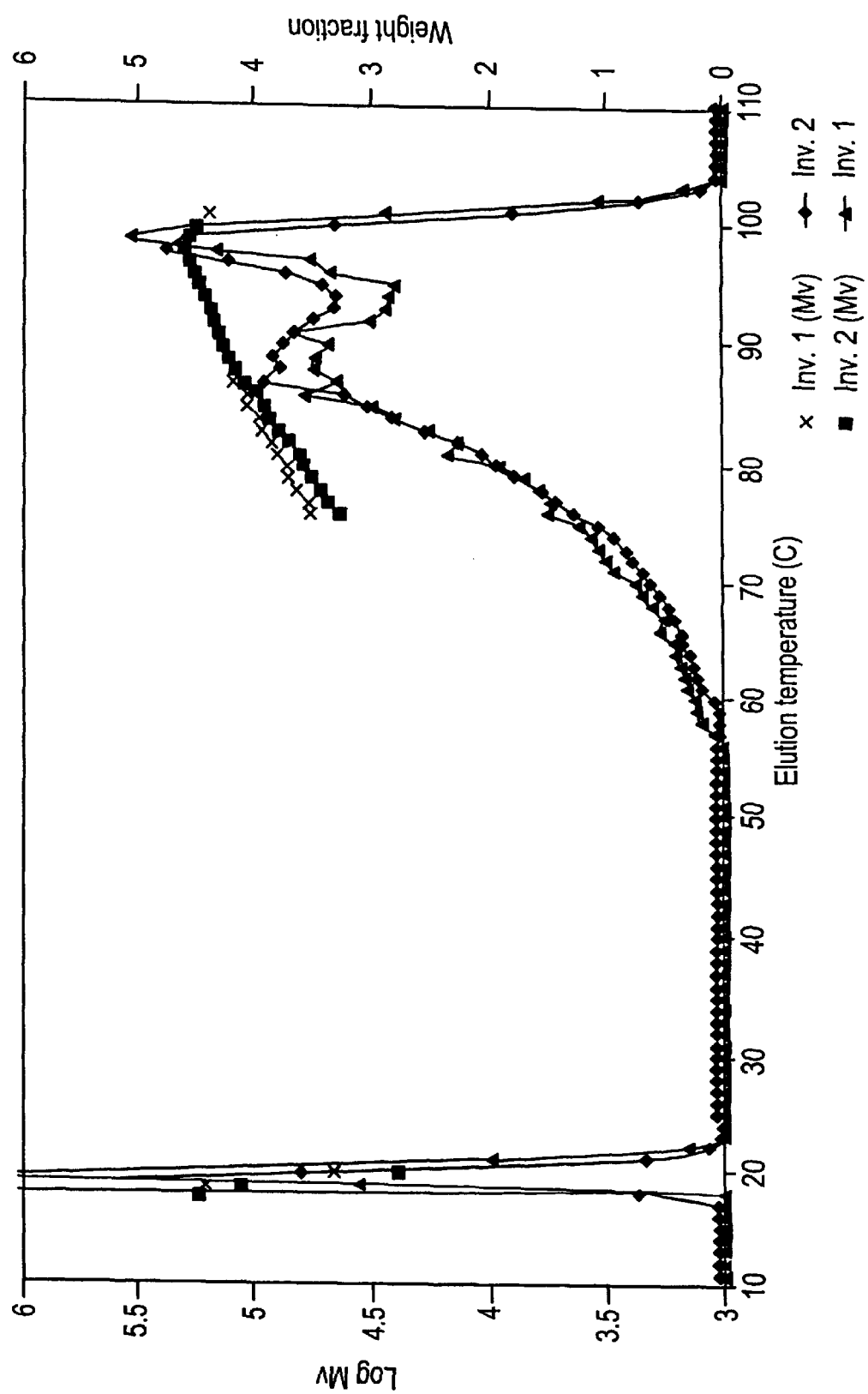

FIG. 15 is an ATREF-DV curve comparing the short chain branching distribution as related to viscosity-average molecular weight ($M_v$) of Inventive Compositions 1 and 2.

Figure 16:
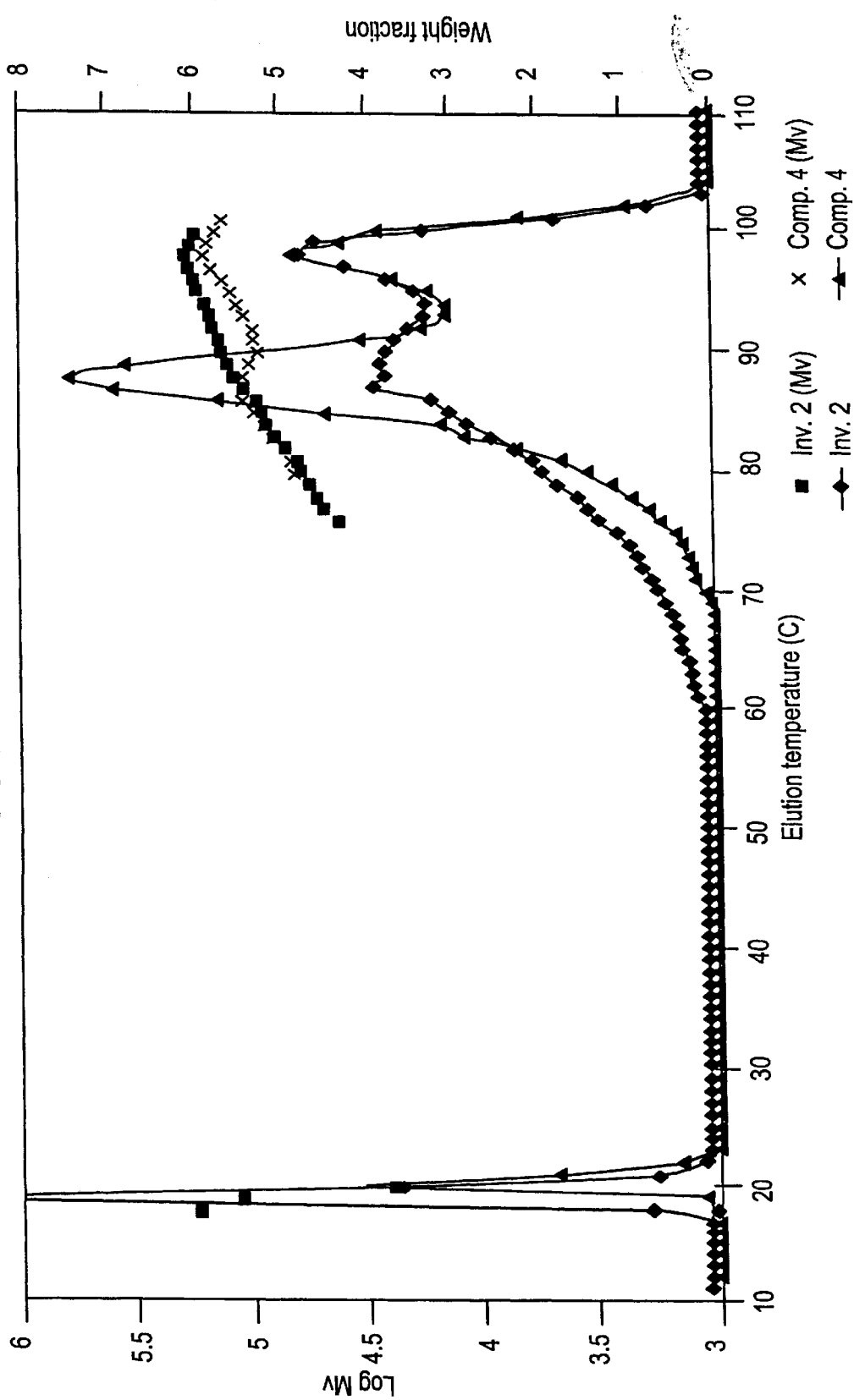

FIG. 16 is an ATREF-DV curve comparing the short chain branching distribution as related to viscosity-average molecular weight ($M_v$) of Inventive Composition 2 and comparative composition 4.

Figure 17:
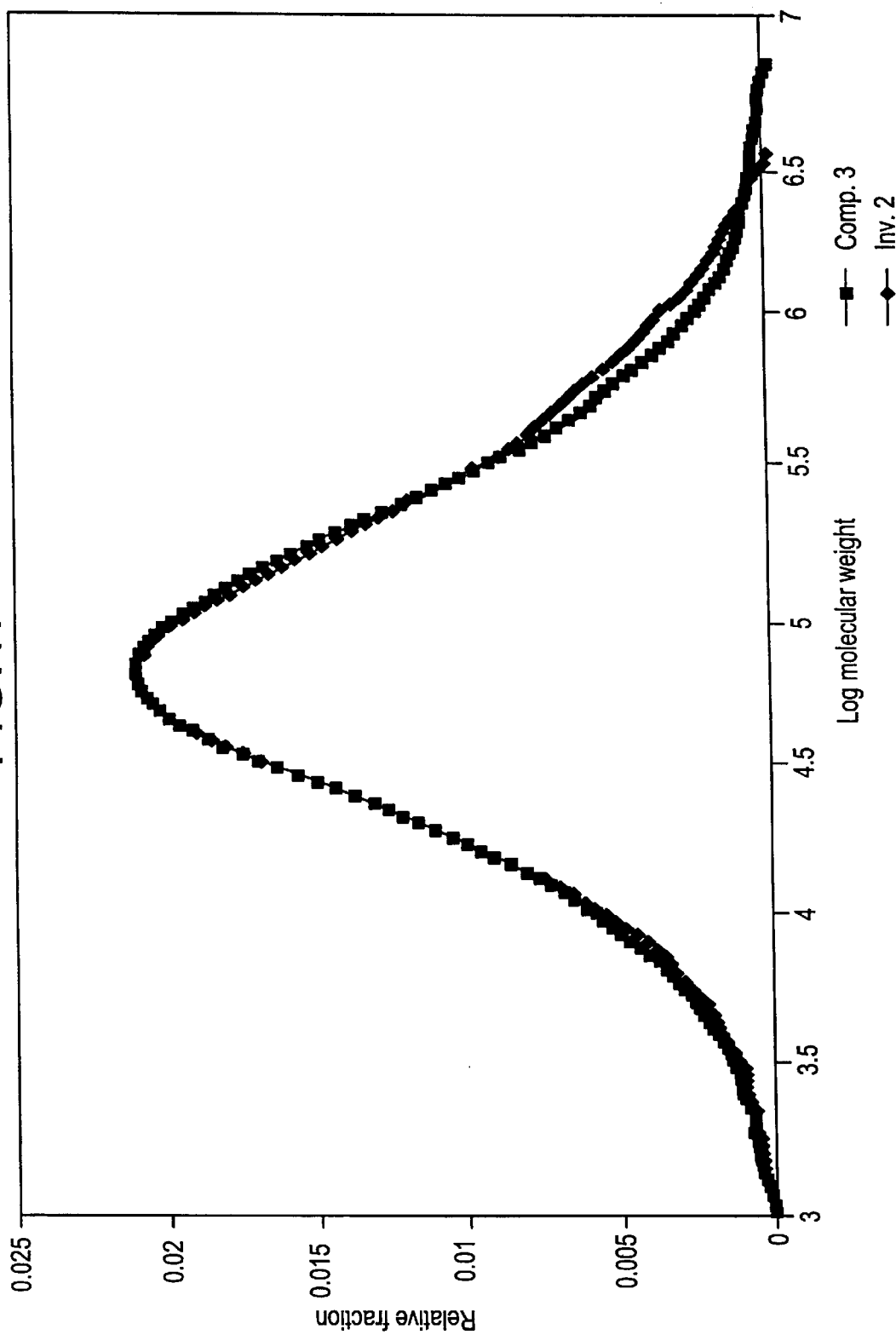

FIG. 17 is a gel permeation chromatography (GPC) curve comparison of Inventive Composition 2 and comparative composition 3.

Figure 18:
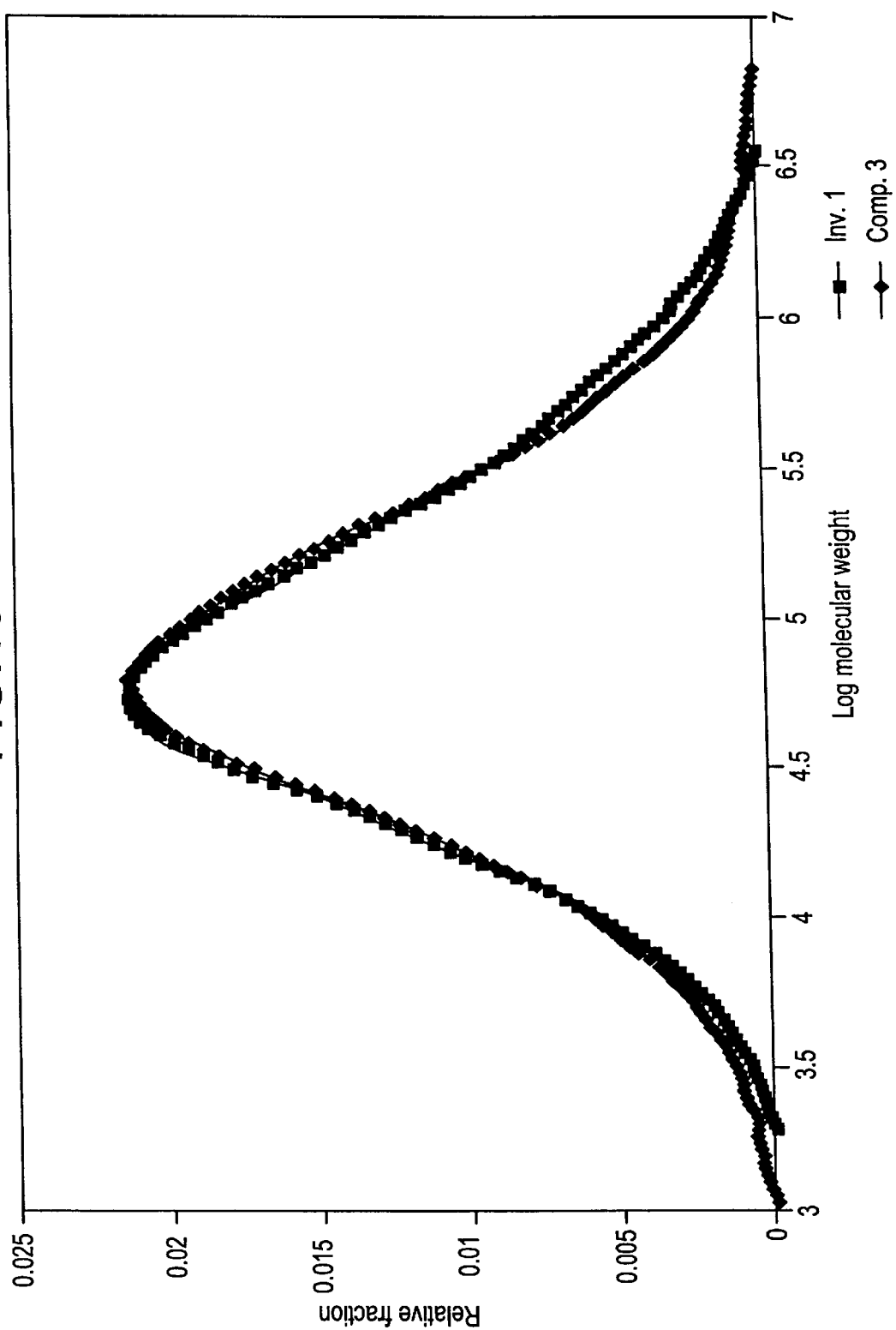

FIG. 18 is a gel permeation chromatography (GPC) curve comparison of Inventive Composition 1 and comparative composition 3.

Figure 19:
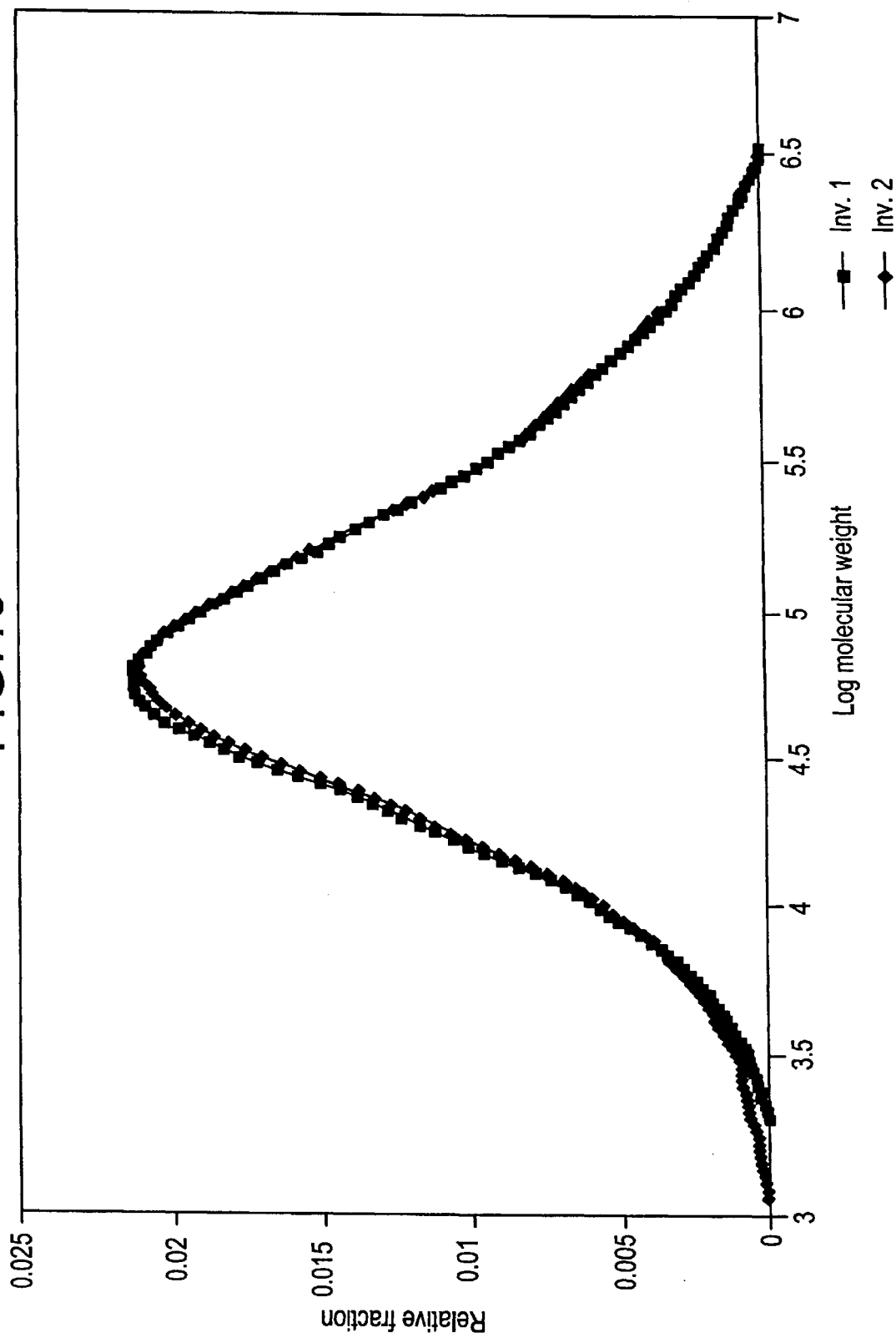

FIG. 19 is a gel permeation chromatography (GPC) curve comparison of Inventive Compositions 1 and 2.

Figure 20:
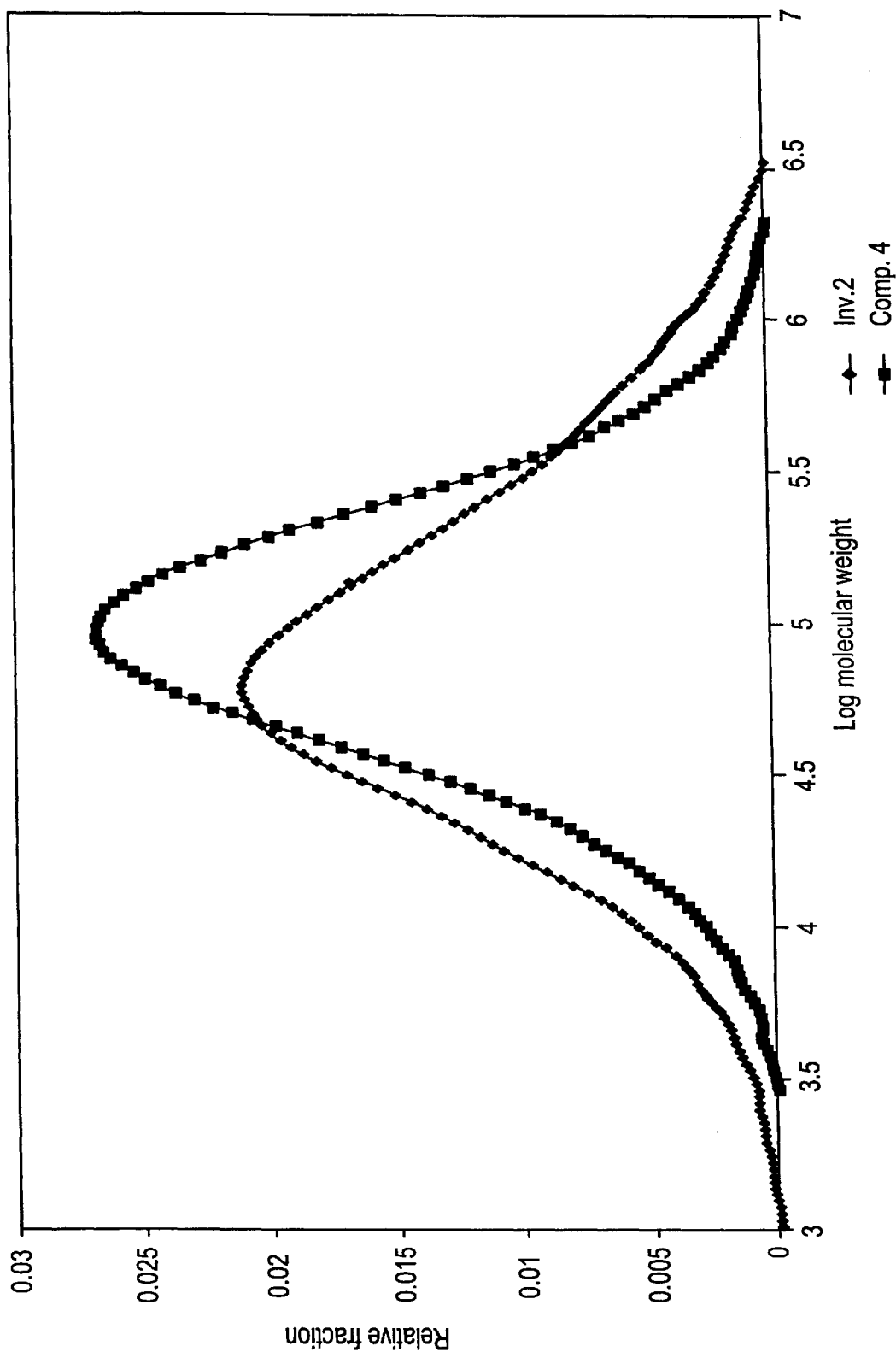

FIG. 20 is a gel permeation chromatography (GPC) curve comparison of Inventive Composition 2 and comparative composition 4.

Figure 21:
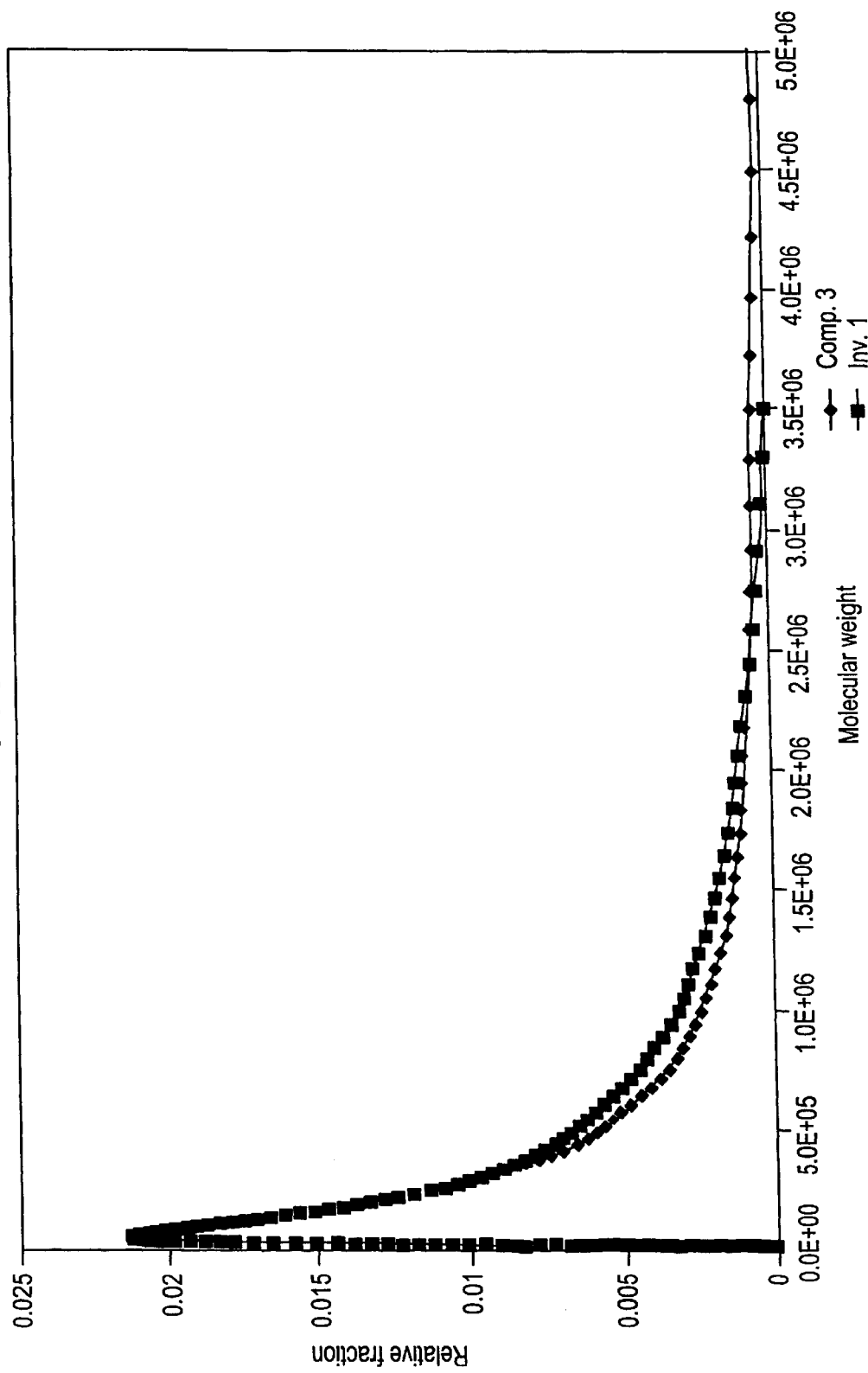

FIG. 21 is a GPC molecular weight versus relative weight fraction comparison of Inventive Composition 1 and comparative composition 3.

Figure 22:
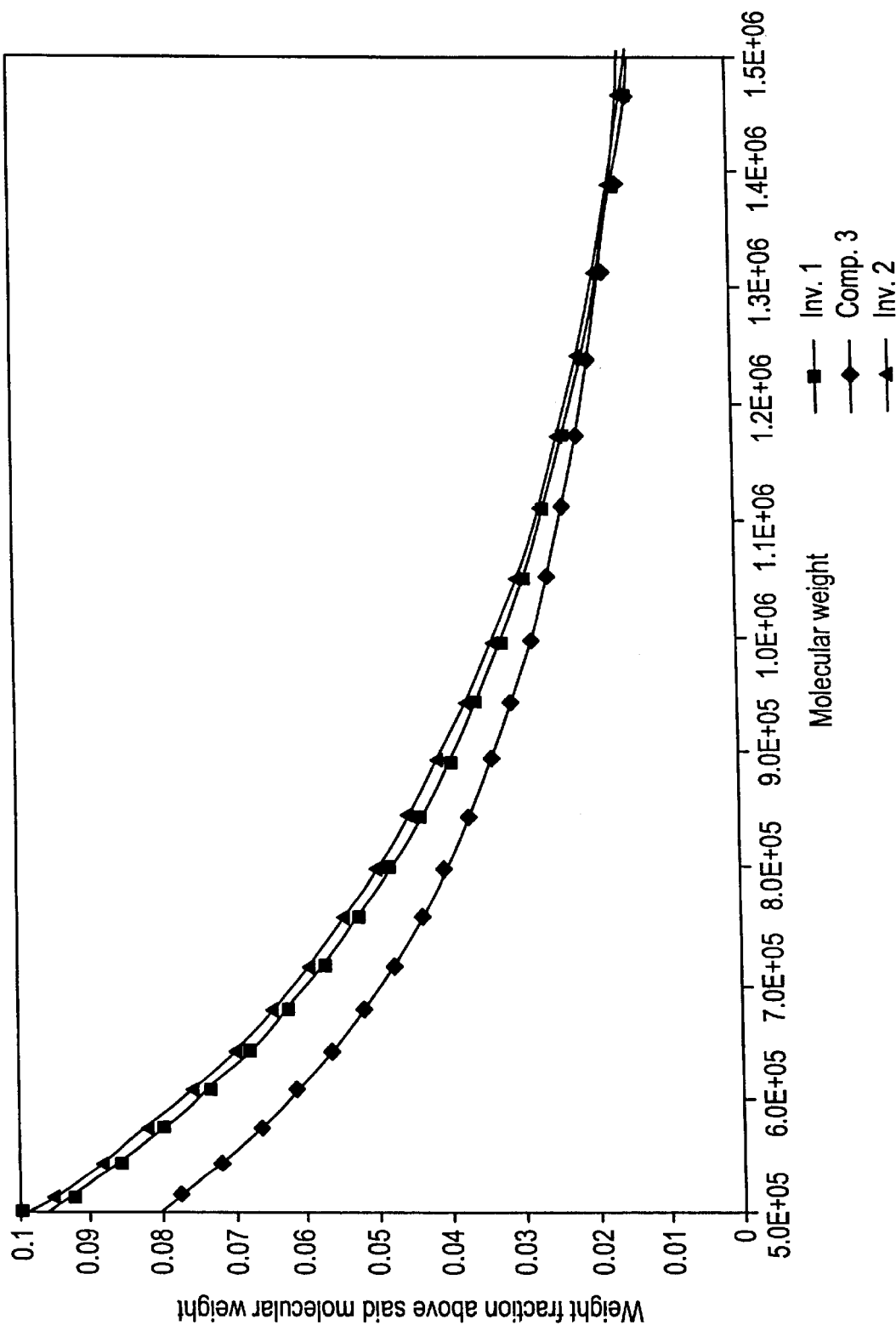

FIG. 22 is a GPC high molecular weight (up to 5,500,000 g/moles) weight fraction comparison of Inventive Compositions 1 and 2 and comparative composition 3.

Figure 23:
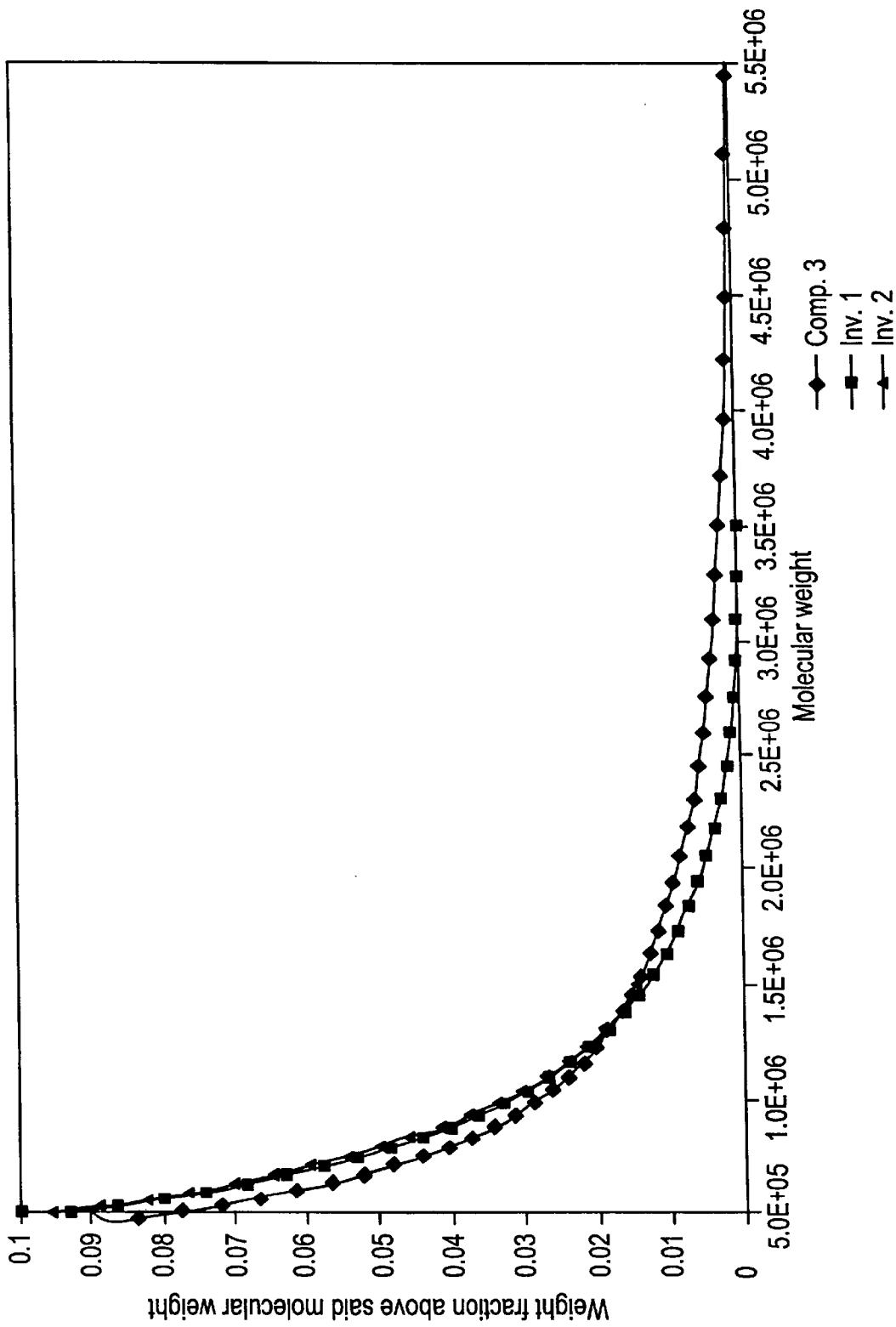

FIG. 23 is a GPC high molecular weight (up to 1,500,000 g/moles) weight fraction comparison of Inventive Compositions 1 and 2 and comparative composition 3.

Figure 24:
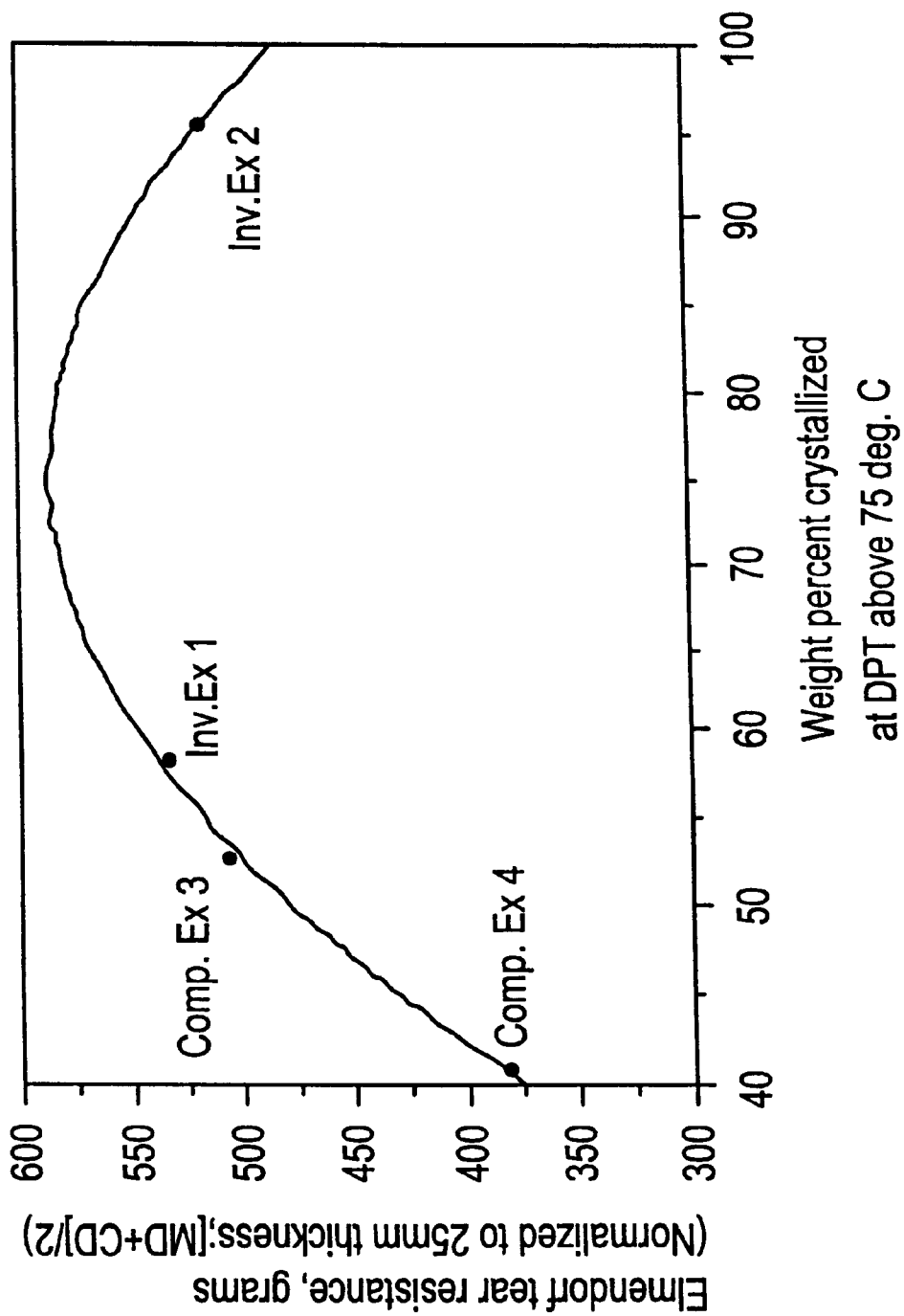

FIG. 24 is a plot of blown film tear resistance as a function of the weight percent of crystallized polymer portion at the dominant peak temperature above 75° C. for Inventive Compositions 1 and 2 and comparative compositions 3 and 4.

Figure 25:
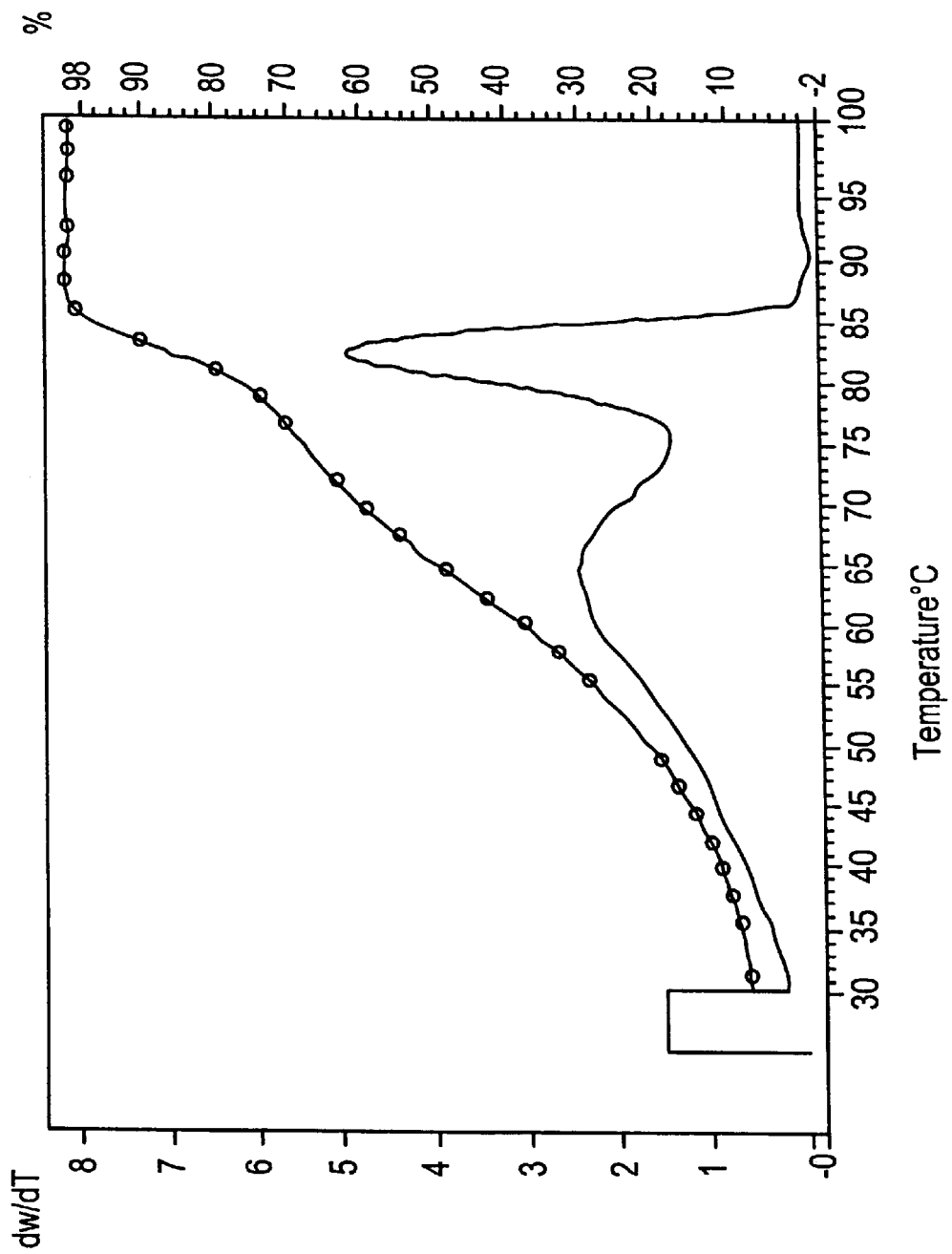

FIG. 25 is the CRYSTAF curve for Inventive Composition 11 which includes peak temperature assignments and weight fraction integration for the areas corresponding to the respective peak temperatures.

Figure 26:
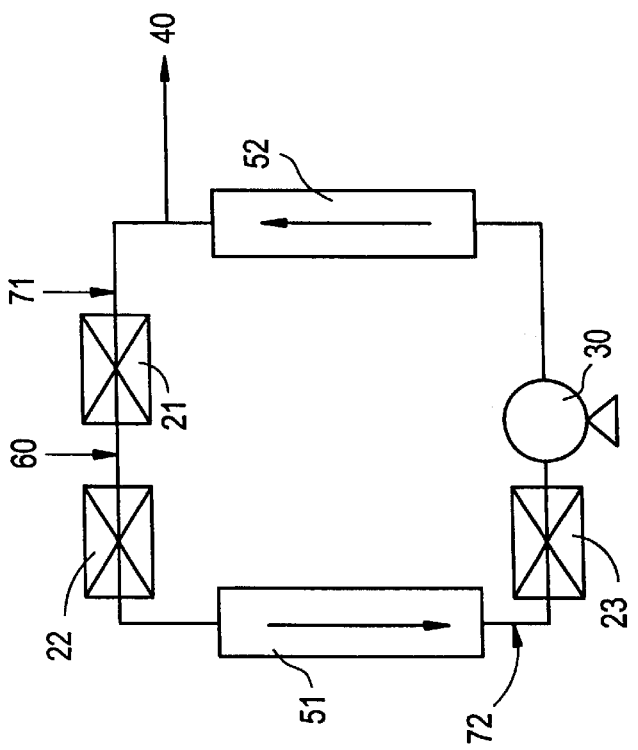

FIG. 26 is a process flow diagram of one of the two reactors used to manufacture Inventive Composition 9 illustrating the simultaneous injection and mixing of catalyst and make-up feed using a mechanical mixer.

Figure 27:
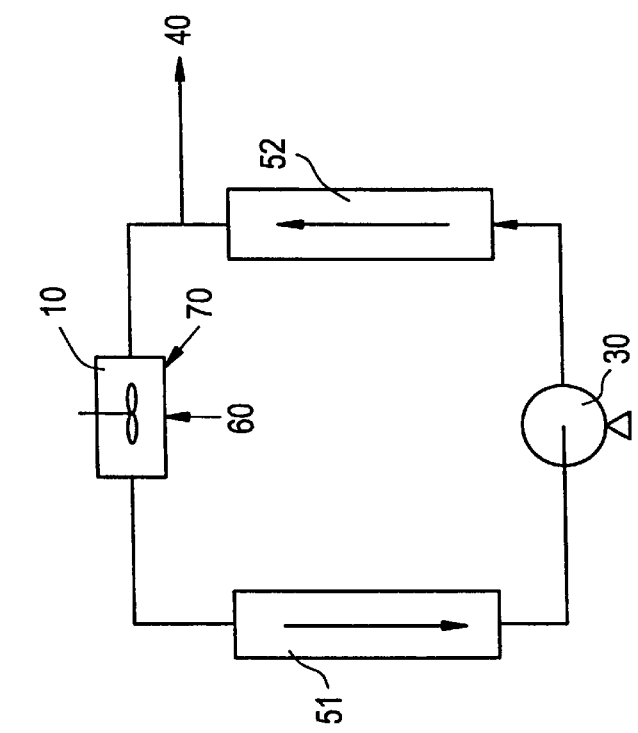

FIG. 27 is a process flow diagram of one of the two reactors used to manufacture Inventive Compositions 1, 2, 7, 8 and 10–15 illustrating the separate injection and mixing of catalyst and make-up feed using static mixers.

Figure 28:
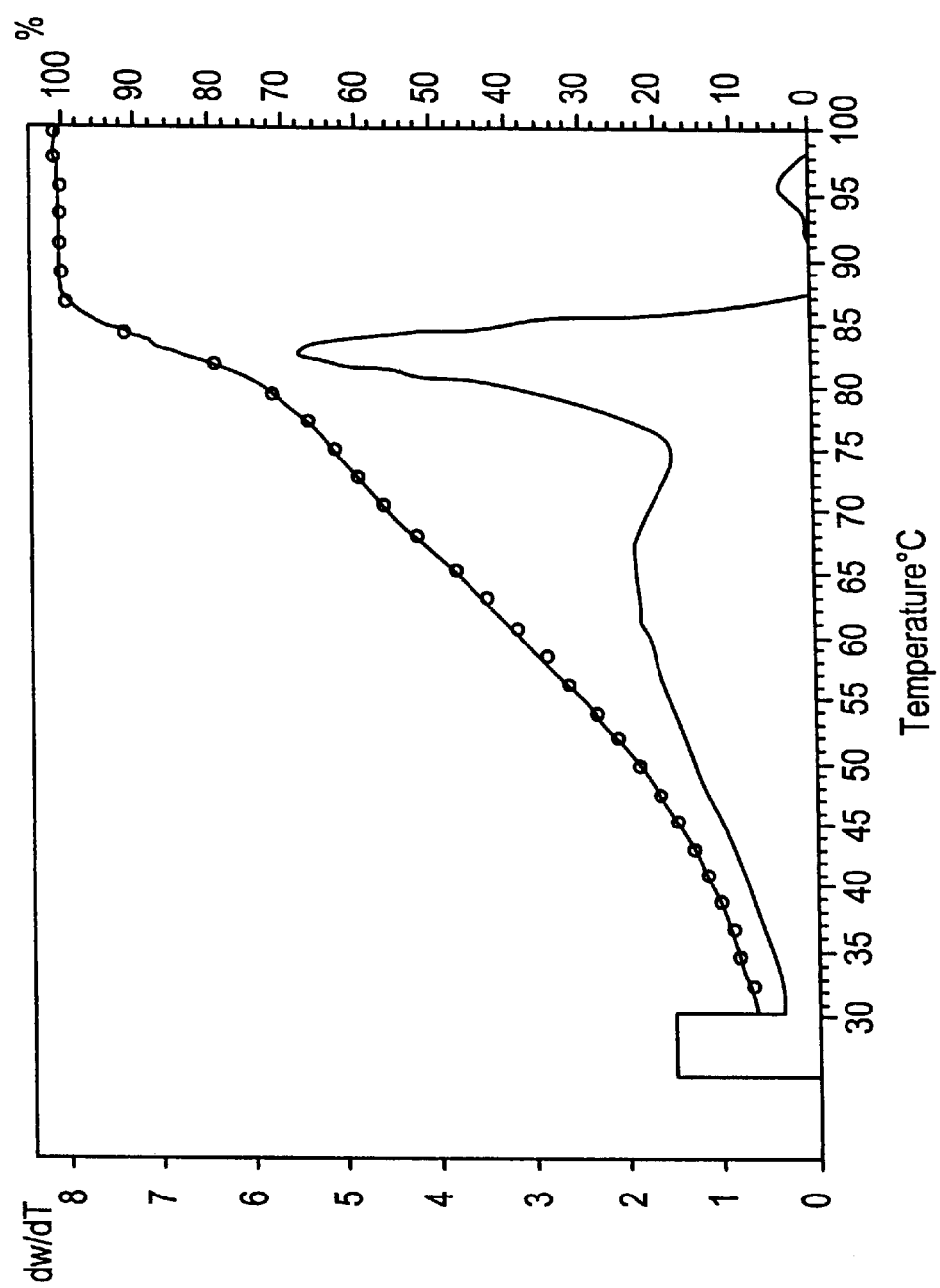

FIG. 28 is a CRYSTAF curve for Inventive Composition 12 which includes peak temperature assignments and weight fraction integration for the areas corresponding to the respective peak temperatures.

Figure 29:
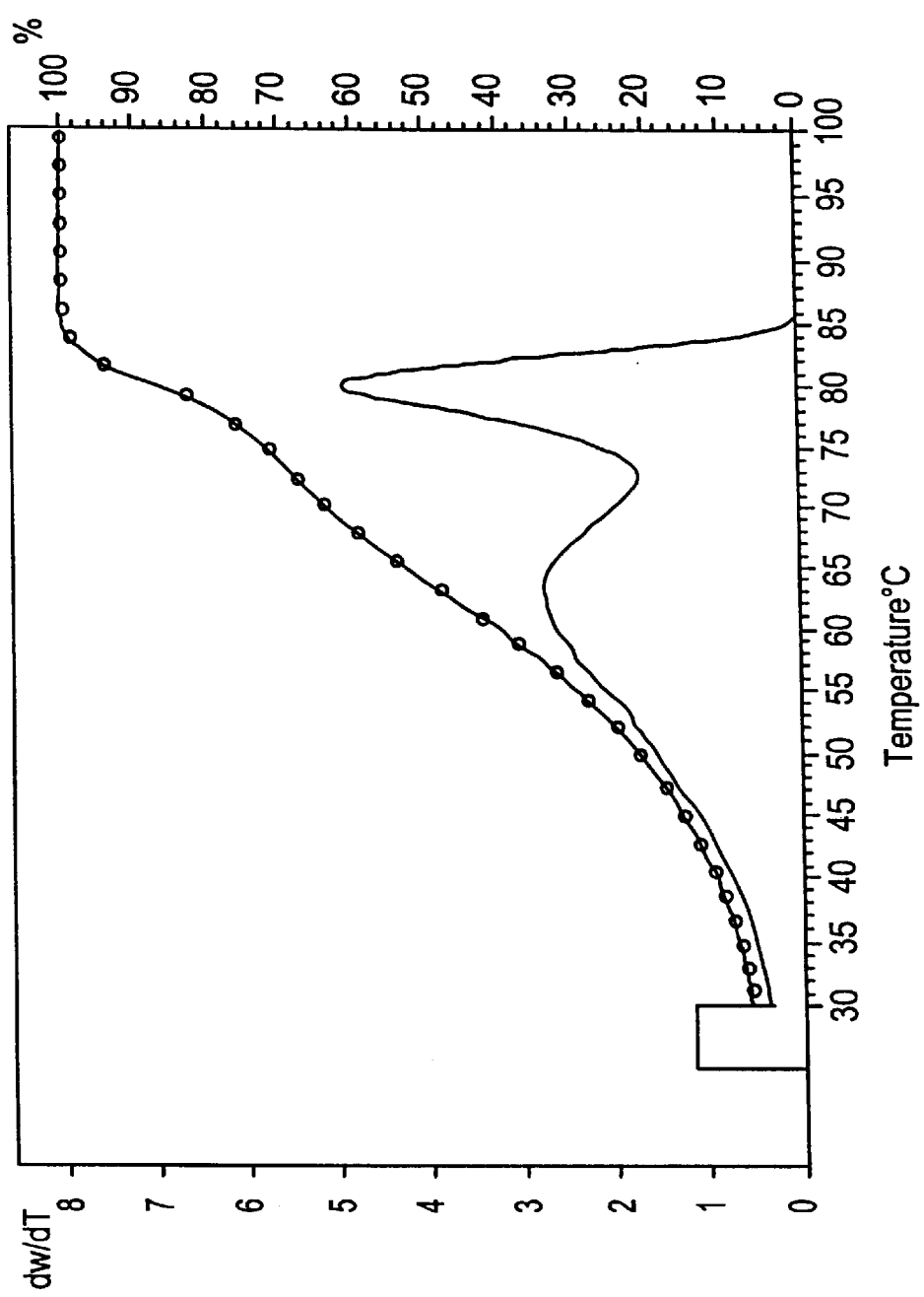

FIG. 29 is a CRYSTAF curve for Inventive Composition 16 which includes peak temperature assignments and weight fraction integration for the areas corresponding to the respective peak temperatures.

Figure 30:
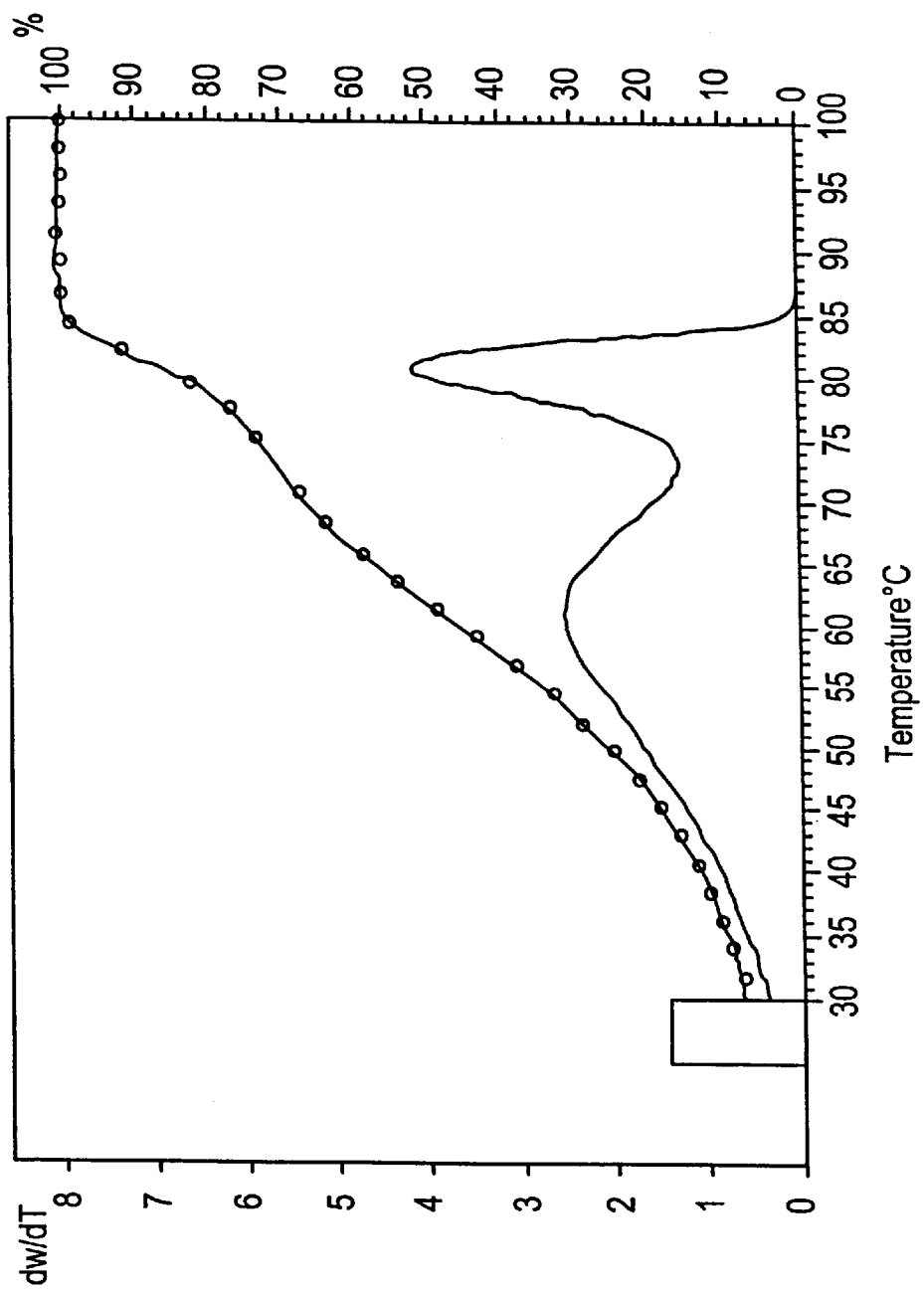

FIG. 30 is a CRYSTAF curve for Inventive Composition 17 which includes peak temperature assignments and weight fraction integration for the areas corresponding to the respective peak temperatures.

Figure 31:
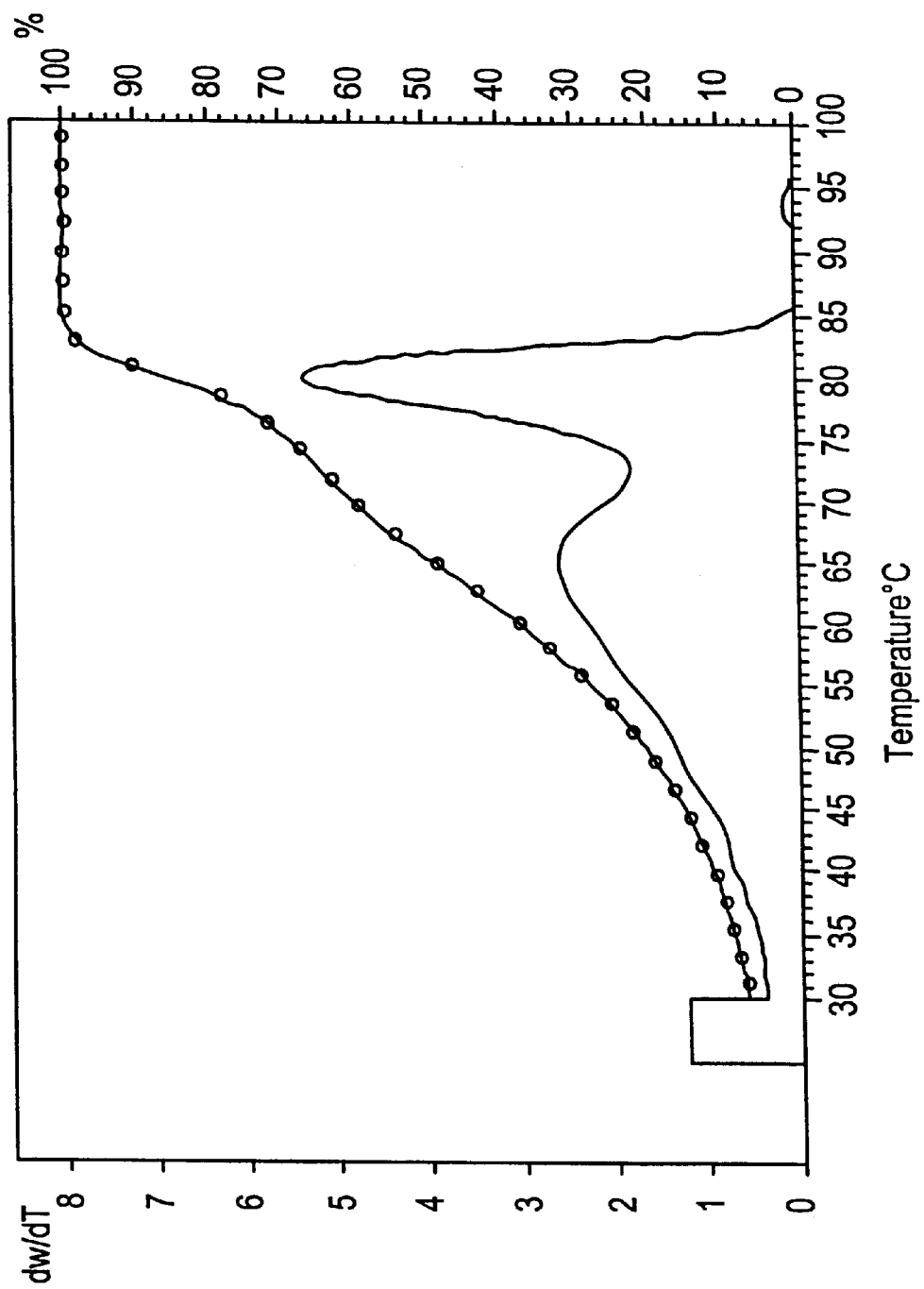

FIG. 31 is a CRYSTAF curve for Inventive Composition 18 which includes peak temperature assignments and weight fraction integration for the areas corresponding to the respective peak temperatures.

Figure 32:
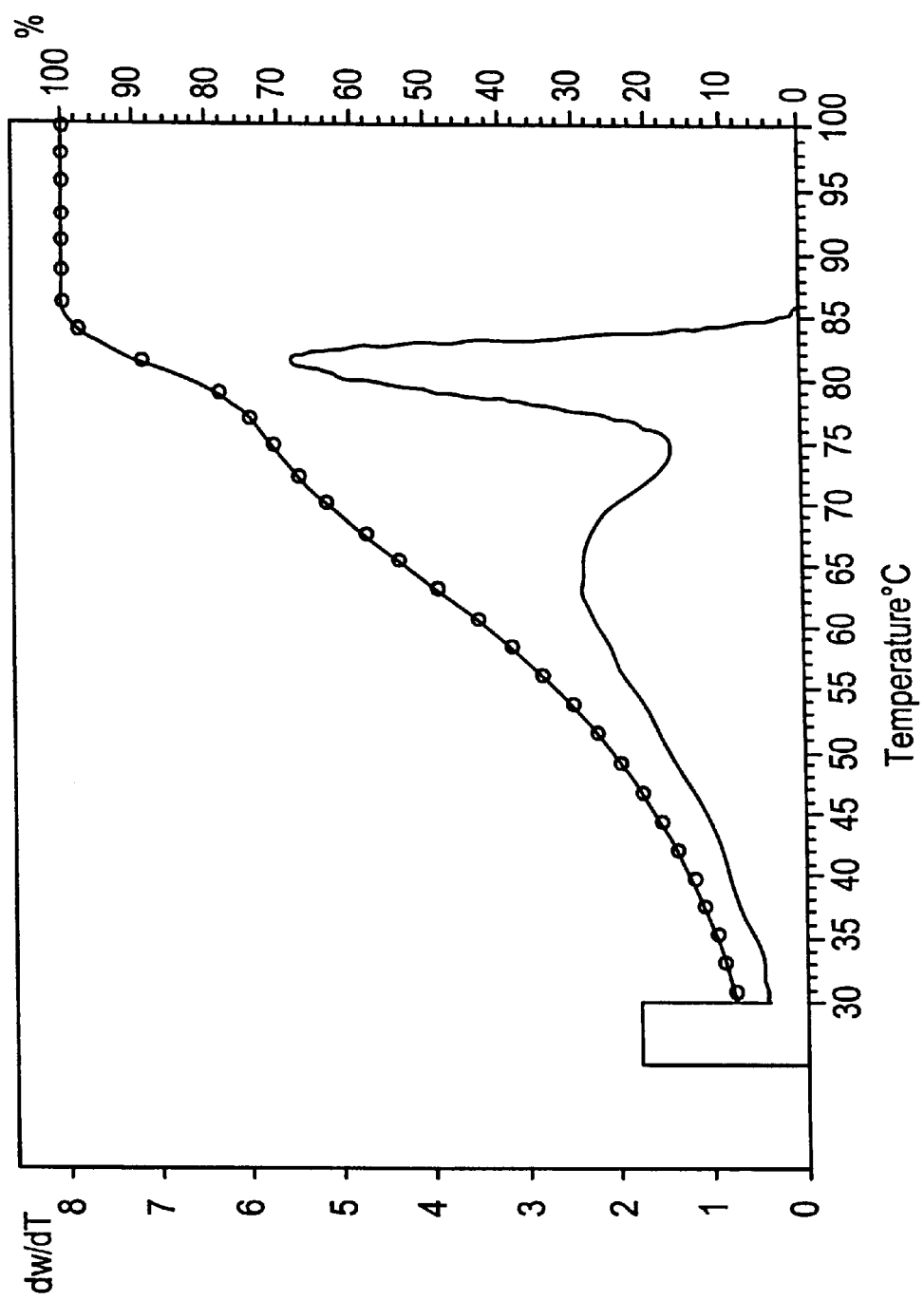

FIG. 32 is a CRYSTAF curve for Inventive Composition 19 which includes peak temperature assignments and weight fraction integration for the areas corresponding to the respective peak temperatures.

As mentioned above, FIG. 1 is a plot of the weight percent crystallized (based on the total amount of crystallizable polymer portions) at the dominant peak temperature above 75° C. as a function of composition density. The weight percent crystallized at the dominant peak temperature was determined by crystallization analysis fractionation in the range of 20 to 100° C. In comparison to comparative compositions, FIG. 1 indicates that a composition of the present invention has a higher amount of higher crystallizing polymer portions at equivalent composition densities. Such increases in higher crystallizing polymer portions yield improved compositional uniformity with regard to the short chain branching distribution or fractional crystallization of the novel composition.

Figure 2:
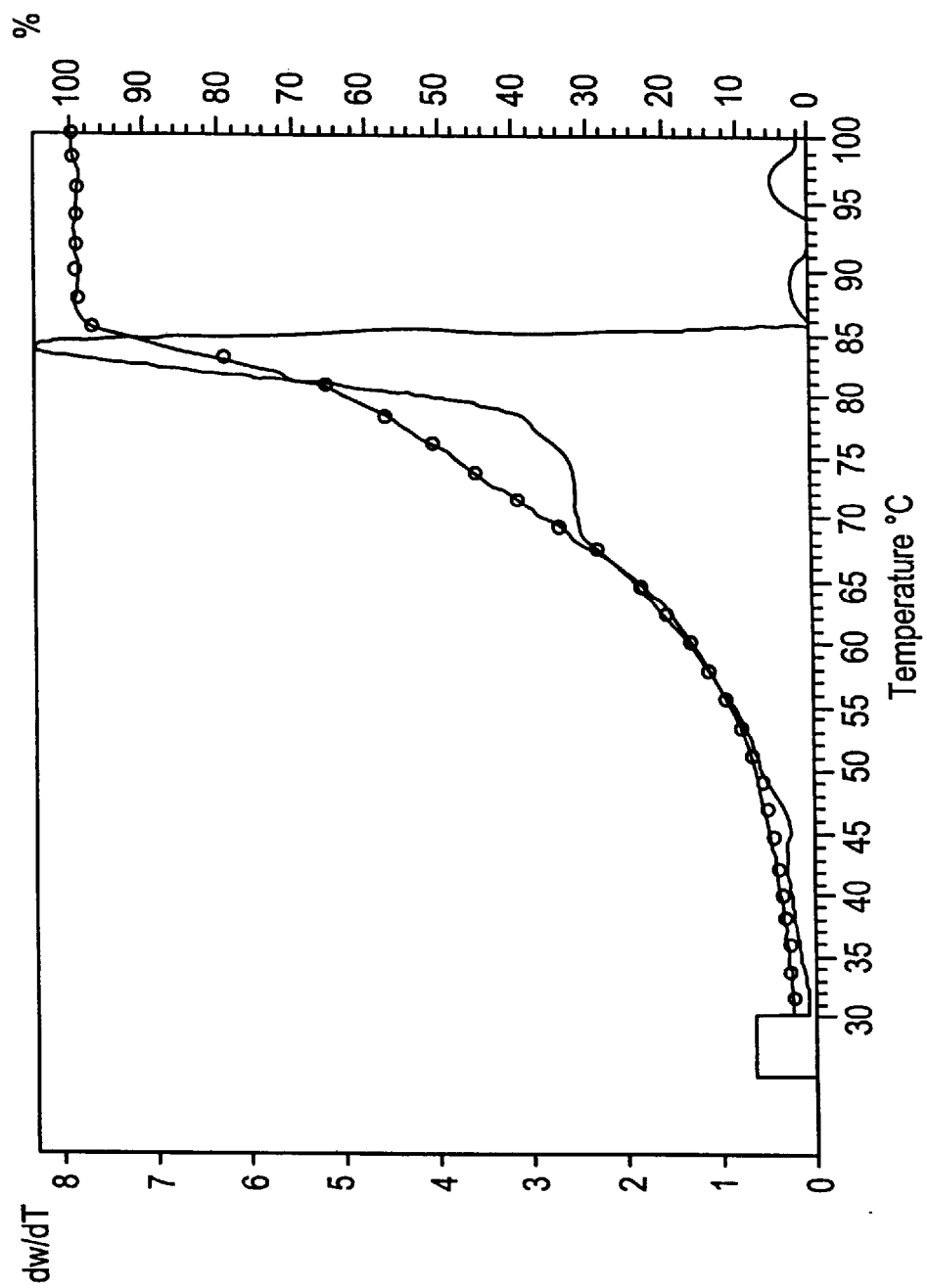
FIG. 2 is a CRYSTAF curve for Inventive Composition 1 which includes peak temperature assignments and weight fraction integration for the areas corresponding to the respective peak temperatures.
Figure 3:
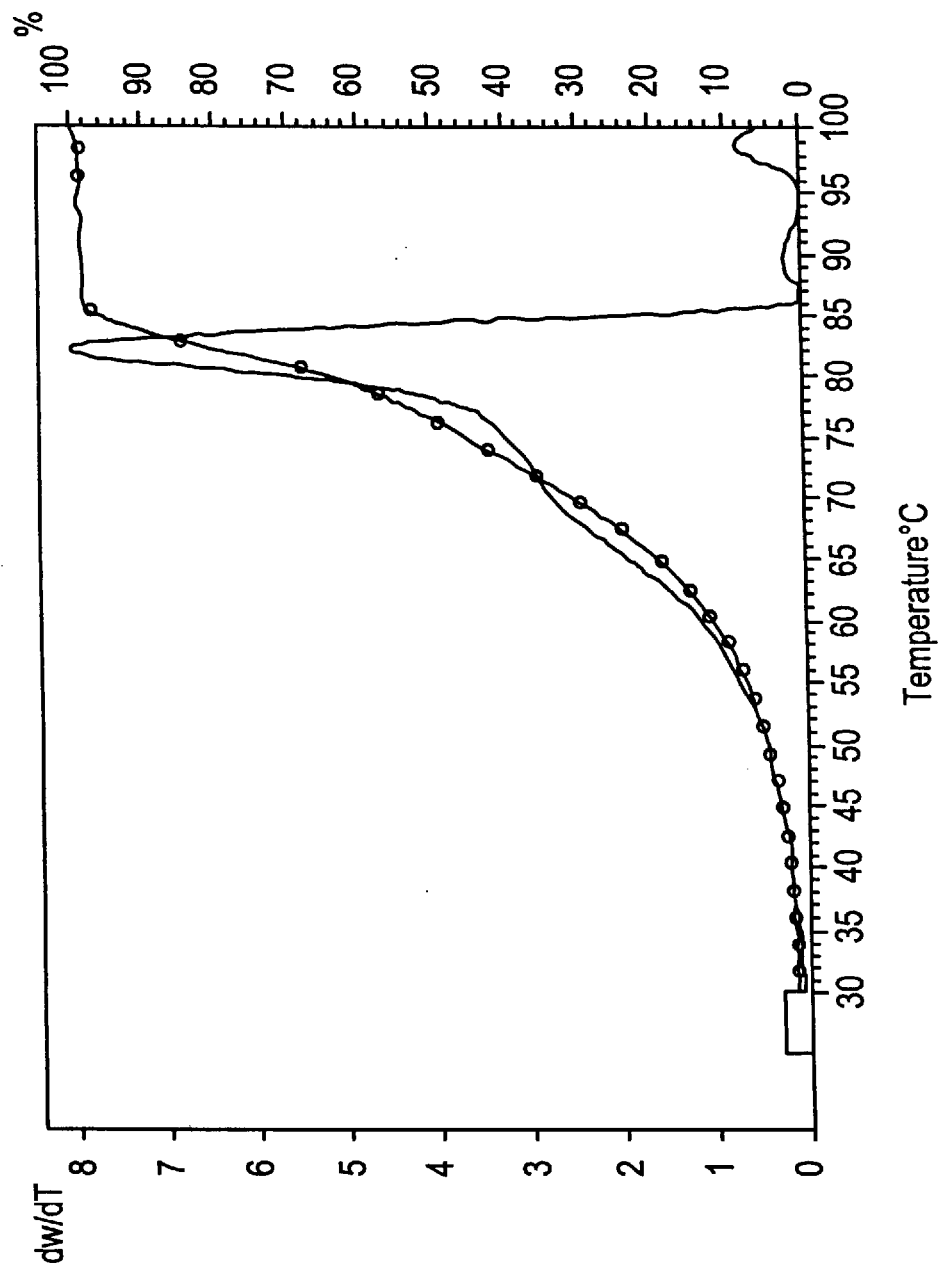
FIG. 3 is a CRYSTAF curve for Inventive Composition 2 which includes peak temperature assignments and weight fraction integration for the areas corresponding to the respective peak temperatures.
Figure 4:
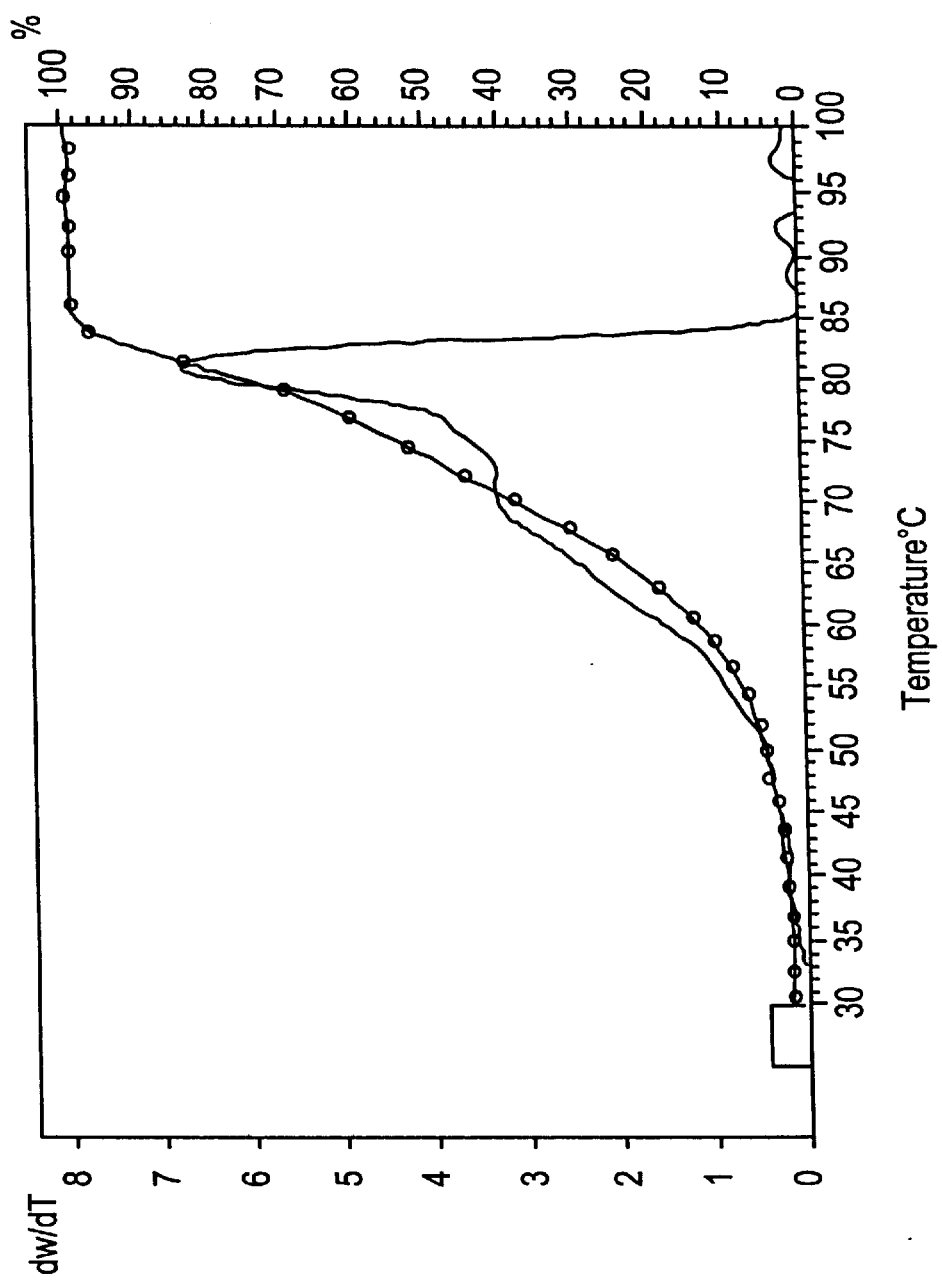
FIG. 4 is a CRYSTAF curve for comparative composition 3 which includes peak temperature assignments and weight fraction integration for the areas corresponding to the respective peak temperatures.
Figure 5:
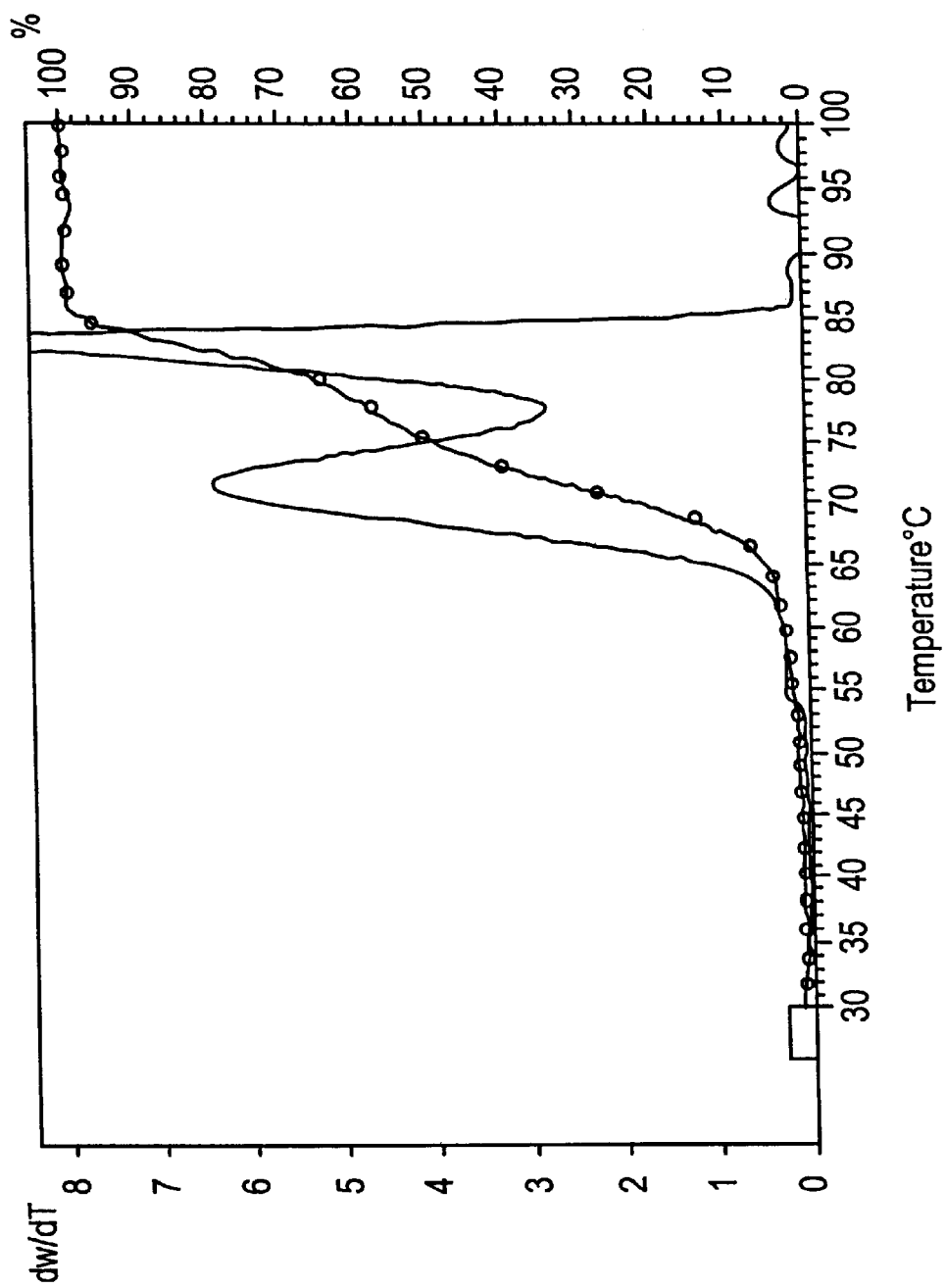
FIG. 5 is a CRYSTAF curve for comparative composition 4 which includes peak temperature assignments and weight fraction integration for the areas corresponding to the respective peak temperatures.
Figure 8:
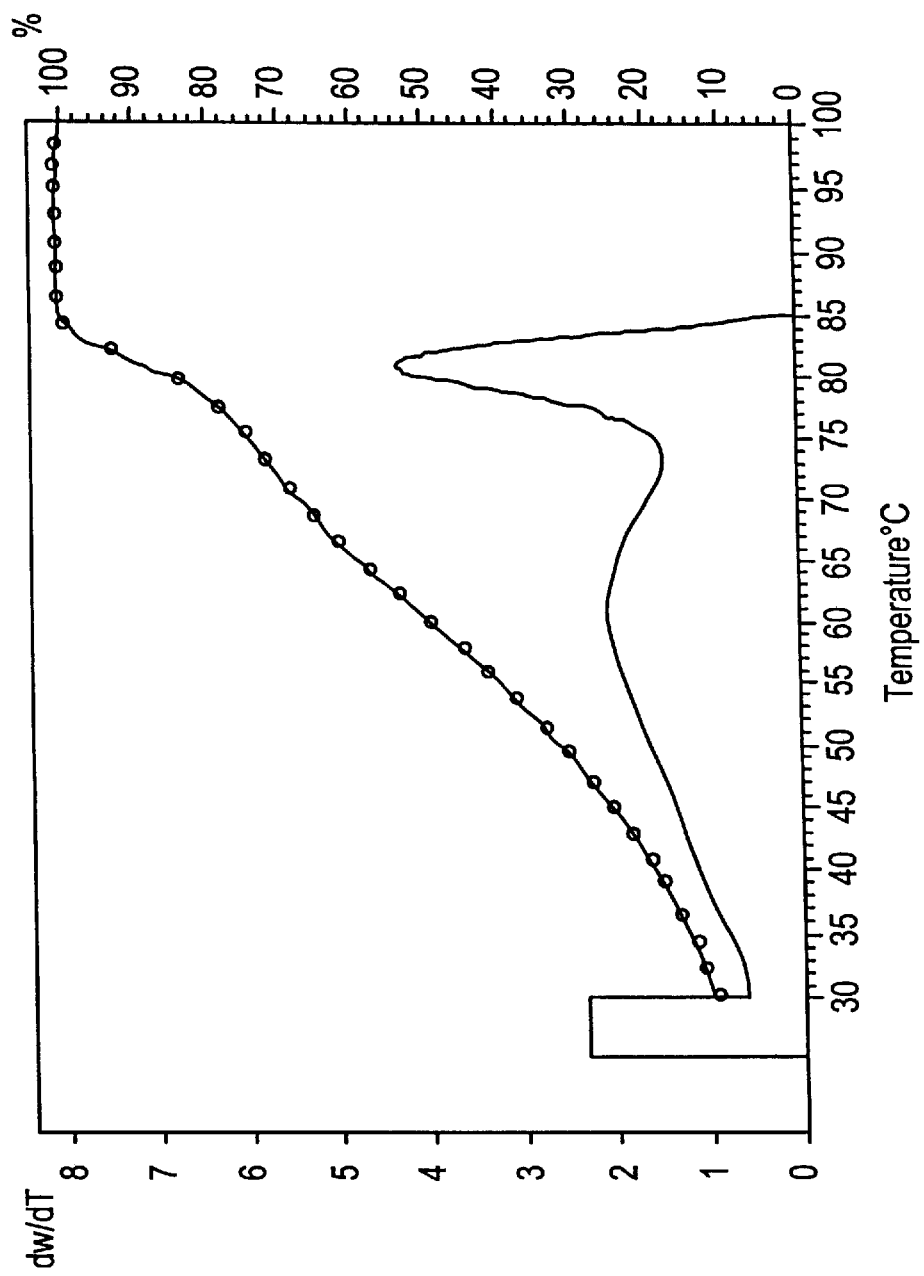
FIG. 8 is the CRYSTAF curve for Inventive Composition 7 which includes peak temperature assignments and weight fraction integration for the areas corresponding to the respective peak temperatures.
Figure 9:
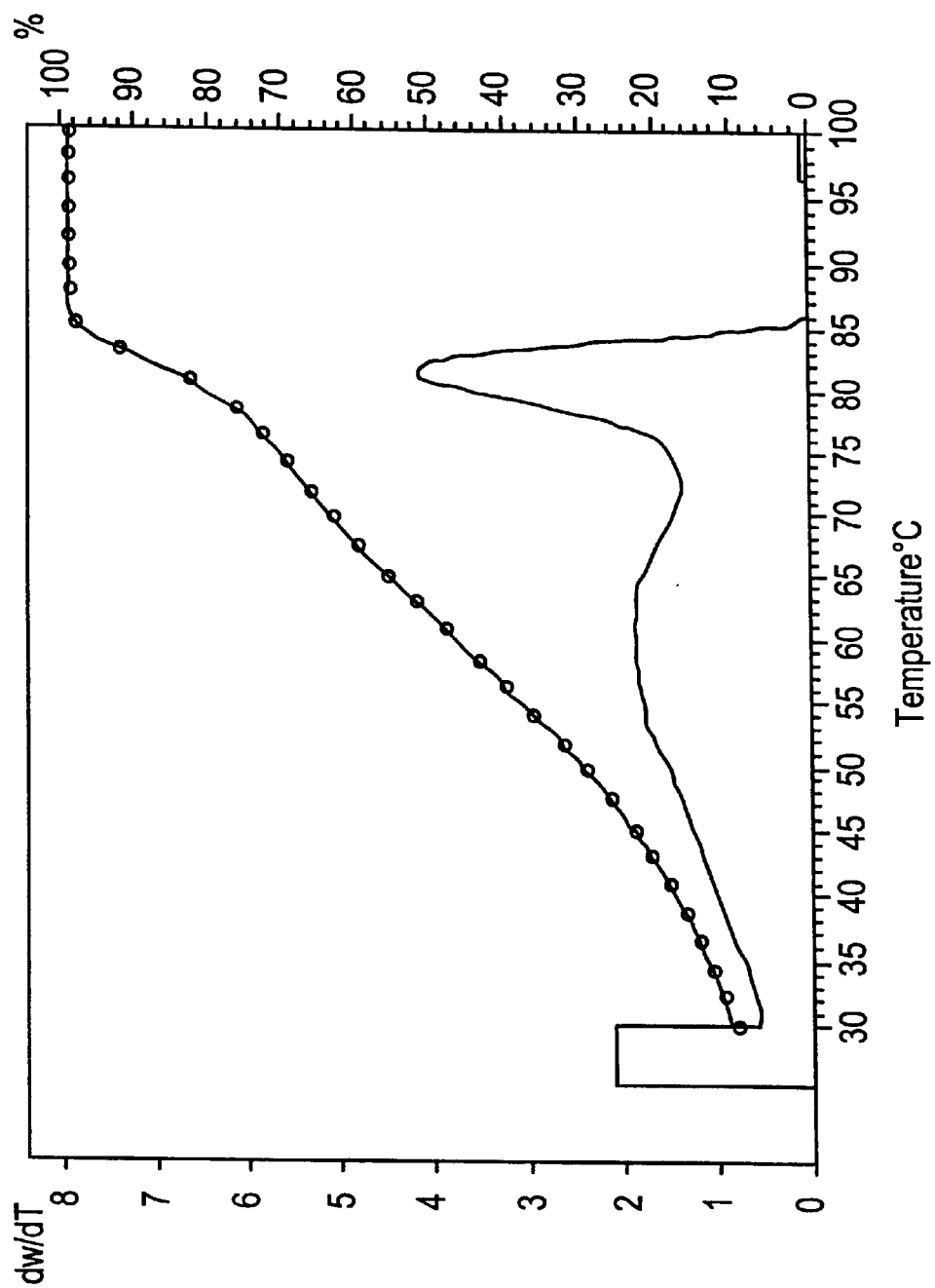
FIG. 9 is the CRYSTAF curve for Inventive Composition 8 which includes peak temperature assignments and weight fraction integration for the areas corresponding to the respective peak temperatures.
Figure 10:
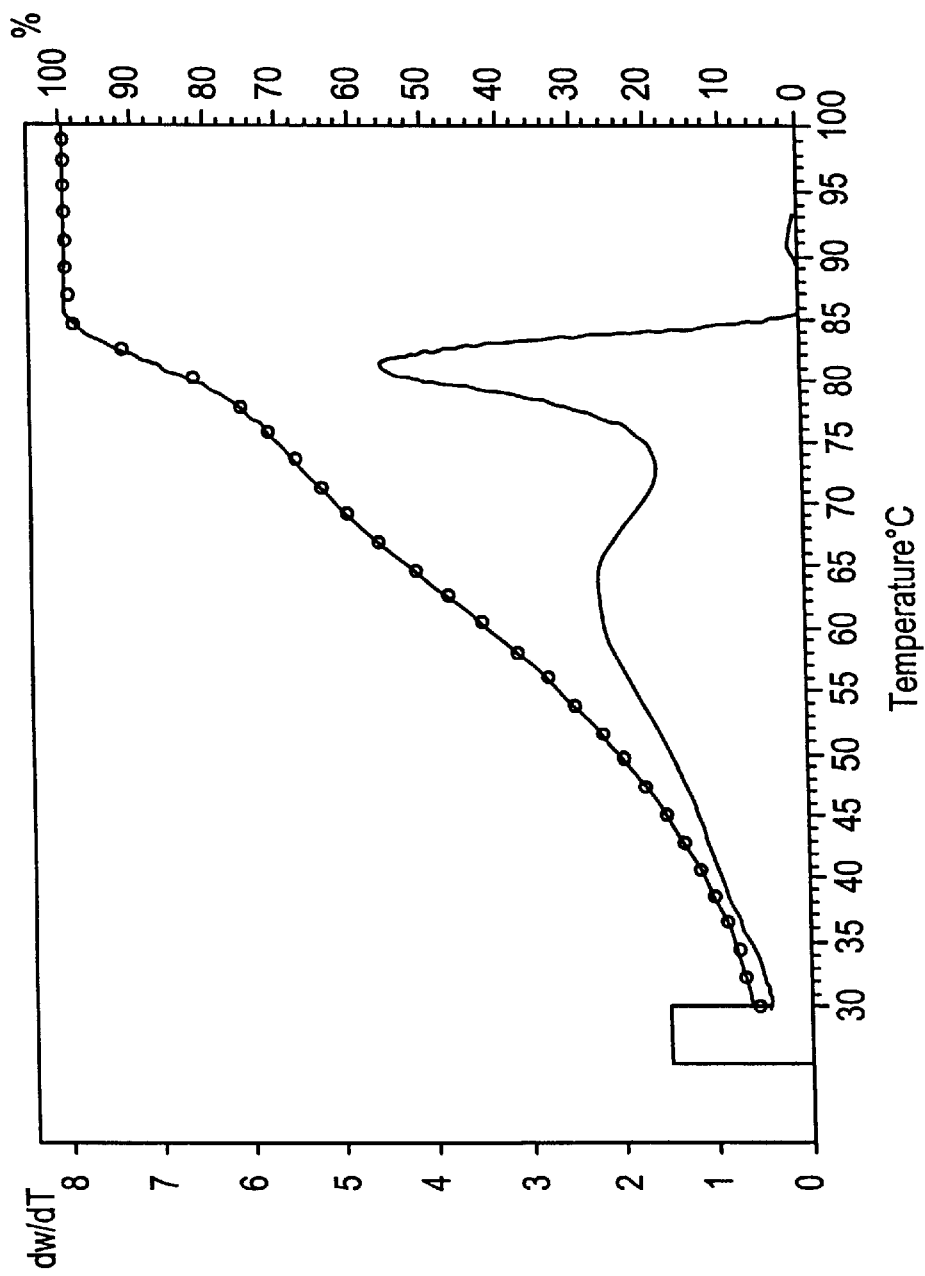
FIG. 10 is a CRYSTAF curve for Inventive Composition 9 which includes peak temperature assignments and weight fraction integration for the areas corresponding to the respective peak temperatures.
Figure 11:
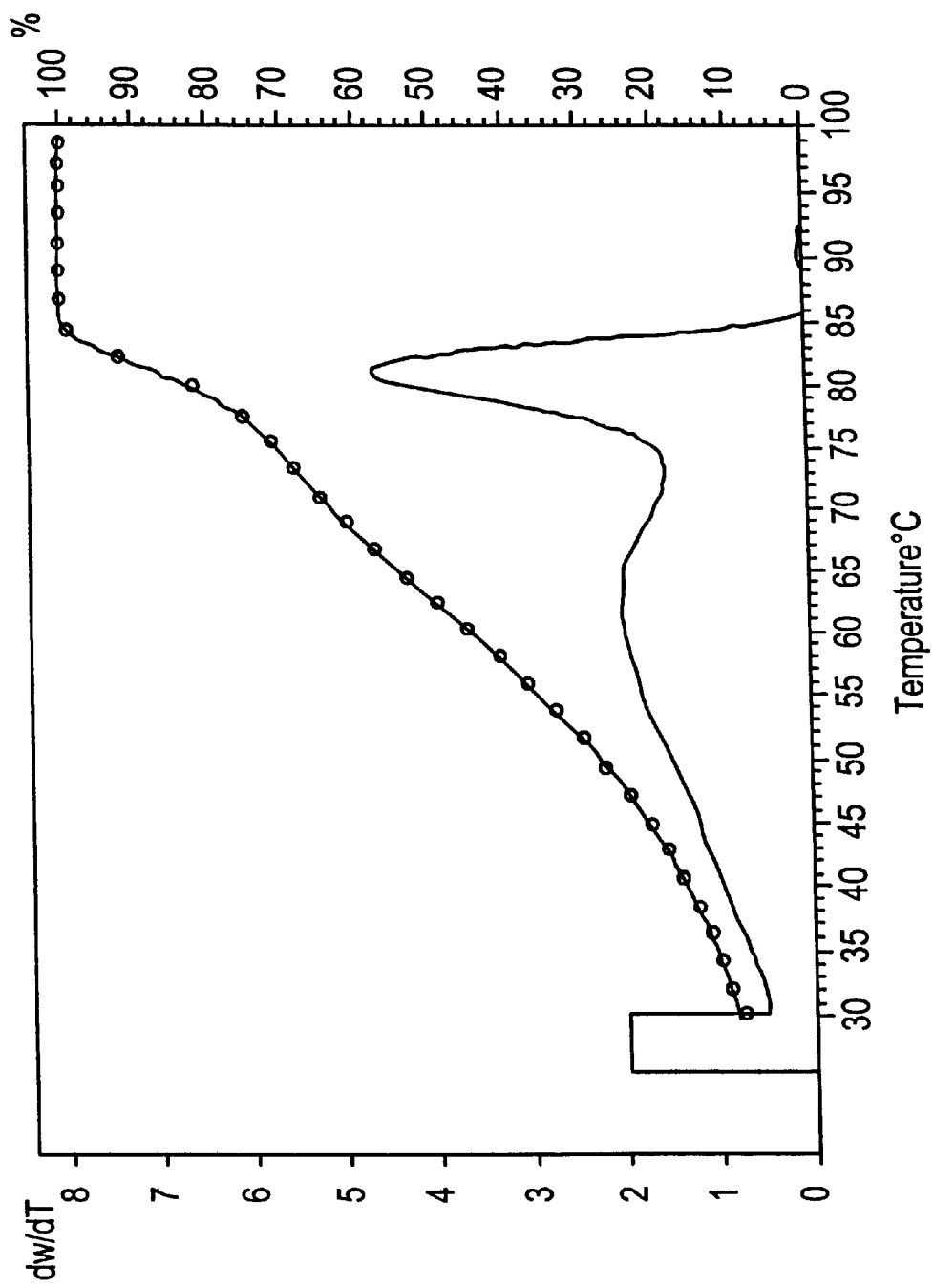
FIG. 11 is a CRYSTAF curve for Inventive Composition 10 which includes peak temperature assignments and weight fraction integration for the areas corresponding to the respective peak temperatures.

While the CRYSTAF curve of an inventive composition indicates improved compositional uniformity, especially at higher overall composition densities, CRYSTAF curves for known compositions show at least two distinct polymer portions. For example, as illustrated in FIG. 8 for Inventive Composition 7, at a density of about 0.917 g/cc, an inventive composition shows one broad flat polymer portion and one sharp polymer portion. Additionally, FIGS. 2 and 3 illustrate, at a density of about 0.927 g/cc (i.e., Inventive Compositions 1 and 2), the CRYSTAF curve of an inventive composition will essentially reflect one sharp polymer portion with a shoulder occurring at a peak temperature less than that corresponding to the sharp polymer portion.

Figure 6:
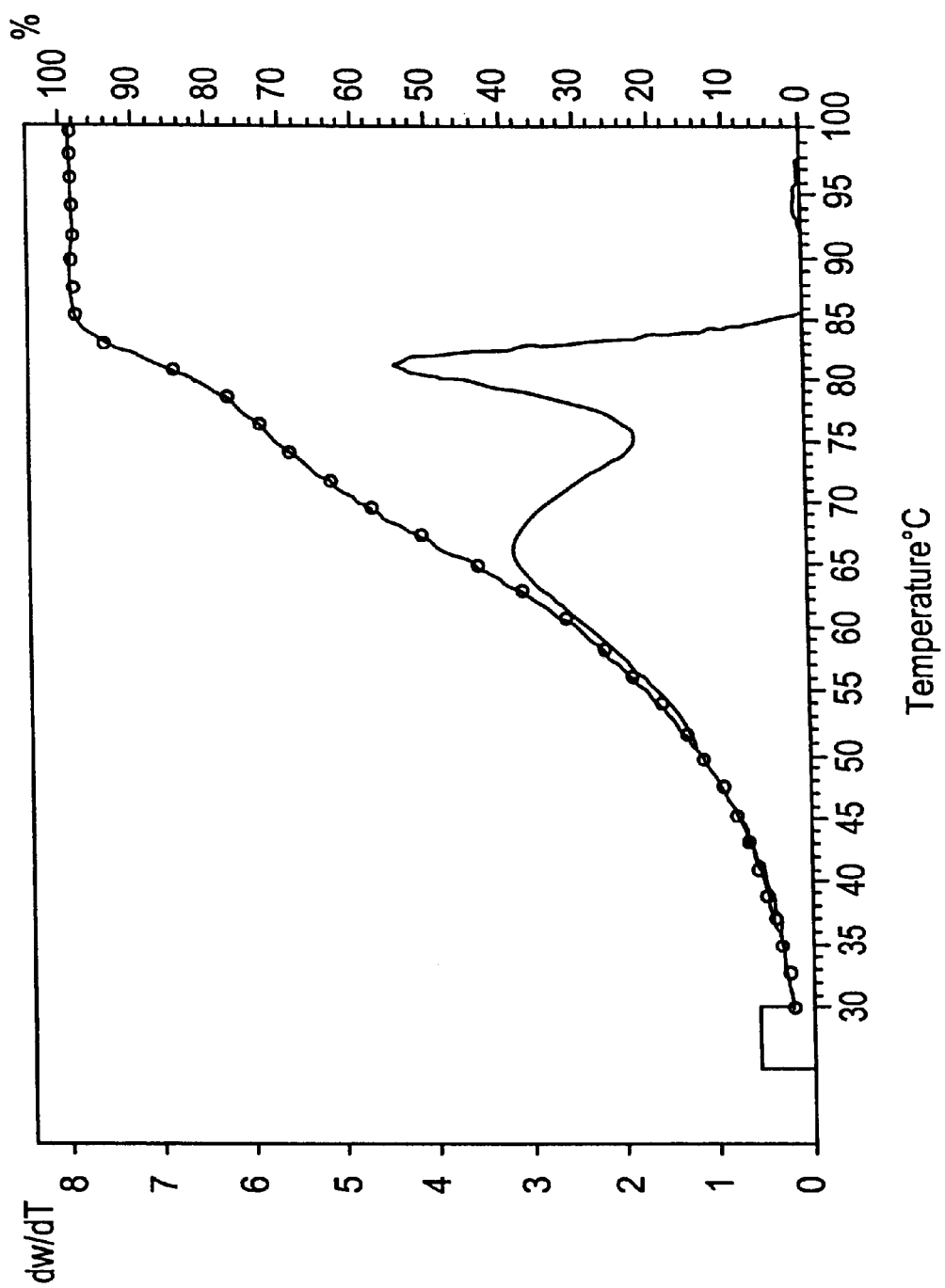
FIG. 6 is a CRYSTAF curve for comparative composition 5 which includes peak temperature assignments and weight fraction integration for the areas corresponding to the respective peak temperatures.
Figure 7:
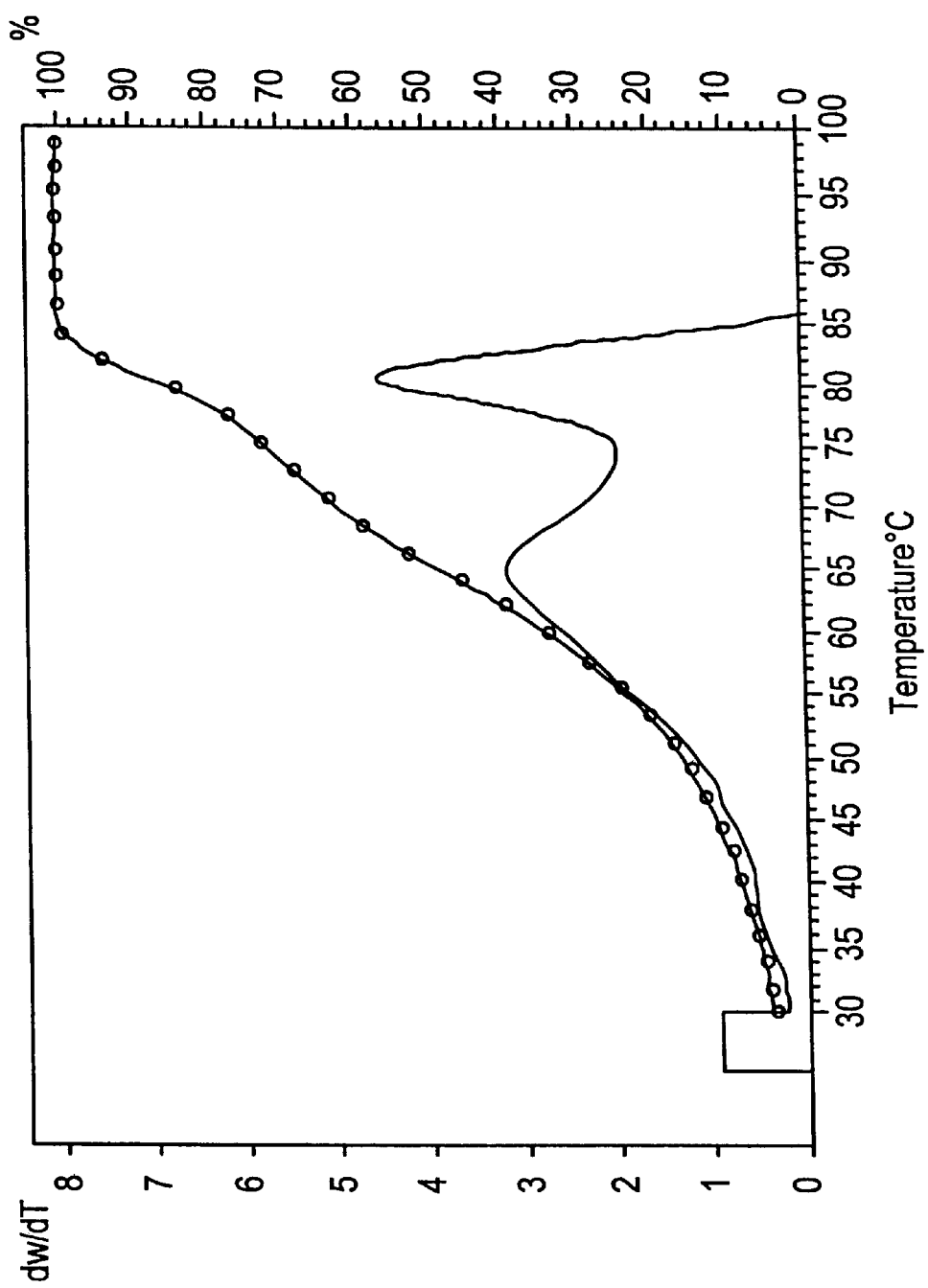
FIG. 7 is a CRYSTAF curve for comparative composition 6 which includes peak temperature assignments and weight fraction integration for the areas corresponding to the respective peak temperatures.

Conversely, CRYSTAF curve of a conventional heterogeneously branched ethylene polymer (FIG. 6), such as DOWLEX™ LLDPE resin 2045, a 1.0 $I_2$ melt index, 0.920 g/cc density ethylene/1-octene copolymer supplied by The Dow Chemical Company, shows two very distinct, sharp polymer portions.

We have discovered the substantial distinctness between the dominant polymer portions of an ethylene interpolymer composition results in reduced tear properties when the composition is converted into film form. In particular, we discovered that surprisingly a composition having a broad molecular weight distribution to accomplish good processability can be manufactured with an optimized compositional uniformity and thereby insure that fabricated articles made therefrom will exhibit improved toughness.

The term "dominant peak temperature" as used herein refers to the peak temperature as determined from crystallization analysis fractionation in the range of 20 to 100° C. that represents and corresponds to the highest weight percent of crystallized polymer portion based on the total amount of crystallizable polymer portions for the whole composition. Every composition with crystallizable polymer portions will have only one dominant peak temperature although the composition may be characterized as having measurable crystallized polymer portions at several different peak temperatures. Where a composition has more than one peak temperature that represents and corresponds to the highest weight percent of crystallized polymer portions, the dominant peak temperature will that peak temperature occurring at the lower temperature. For example, for a composition characterized as having a 40 weight percent crystallized polymer portion occurring at two different peak temperatures, 80° C. and 99° C., and wherein all other peak temperatures represent and correspond to lower weight percentages of crystallized polymer portions for the composition, the dominate peak temperature will be 80° C. (i.e., the lower of 80° C. and 99° C.) and the weight percent of the crystallized polymer portion at the dominant peak temperature will 40 weight percent.

The term "composition density" as used herein means the density of a single component polymer or a polymer mixture of at least two ethylene polymers measured in accordance with ASTM D-792. The term "composition density" refers to a solid state density measurement of pellets, film or a molding as distinguished from a melt density determination.

The term "polymer", as used herein, refers to a polymeric compound prepared by polymerizing monomers, whether of the same or a different type. The generic term "polymer" thus embraces the terms "homopolymer," "copolymer," "terpolymer" as well as "interpolymer."

The term "interpolymer", as used herein, refers to polymers prepared by the polymerization of at least two different types of monomers. The generic term "interpolymer" thus includes the term "copolymers" (which is usually employed to refer to polymers prepared from two different monomers) as well as the term "terpolymers" (which is usually employed to refer to polymers prepared from three different types of monomers).

The term "heterogeneously branched linear ethylene polymer" is used herein in the conventional sense in reference to a linear ethylene interpolymer having a comparatively low short chain branching distribution index. That is, the interpolymer has a relatively broad short chain branching distribution. Heterogeneously branched linear ethylene polymers have a SCBDI less than 50 percent and more typically less than 30 percent.

The term "homogeneously branched linear ethylene polymer" is used herein in the conventional sense to refer to a linear ethylene interpolymer in which the comonomer is randomly distributed within a given polymer molecule and wherein substantially all of the polymer molecules have the same ethylene to comonomer molar ratio. The term refers to an ethylene interpolymer that is characterized by a relatively high short chain branching distribution index (SCBDI) or composition distribution branching index (CDBI). That is, the interpolymer has a SCBDI greater than or equal to 50 percent, preferably greater than or equal to 70 percent, more preferably greater than or equal to 90 percent. At higher degrees of compositional uniformity, homogeneously branched ethylene polymers can be further characterized as essentially lacking a measurable high density, high crystallinity polymer portion as determined using a temperature rising elution fractionation technique (abbreviated herein as "TREF").

SCBDI is defined as the weight percent of the polymer molecules having a comonomer content within 50 percent of the median total molar comonomer content and represents a comparison of the monomer distribution in the interpolymer to the monomer distribution expected for a Bernoullian distribution. The SCBDI of an interpolymer can be readily calculated from TREF as described, for example, by Wild et al., *Journal of Polymer Science, Poly. Phys. Ed.*, Vol. 20, p. 441 (1982), or in U.S. Pat. Nos. 4,798,081; 5,008,204; or by L. D. Cady, "The Role of Comonomer Type and Distribution in LLDPE Product Performance," SPE Regional Technical Conference, Quaker Square Hilton, Akron, Ohio, October 1–2, pp. 107–119 (1985), the disclosures of all which are incorporated herein by reference. However, the preferred TREF technique does not include purge quantities in SCBDI calculations. More preferably, the monomer distribution of the interpolymer and SCBDI are determined using $^{13}$C NMR analysis in accordance with techniques described in U.S. Pat. Nos. 5,292,845; 4,798,081; 5,089,321 and by J. C. Randall in Rev. Macromol. Chem. Phys., C29, pp. 201–317, the disclosures of both of which are incorporated herein by reference.

In analytical temperature rising elution fractionation analysis (as described in U.S. Pat. No. 5,008,204 and abbreviated herein as "ATREF"), the film or composition to be analyzed is dissolved in a suitable hot solvent (e.g., trichlorobenzene) and allowed to crystallized in a column containing an inert support by slowly reducing the temperature. An ATREF chromatogram curve is then generated by eluting the crystallized polymer sample from the column by slowly increasing the temperature of the eluting solvent (trichlorobenzene). The ATREF curve is also frequently called the short chain branching distribution (SCBD), since it indicates how evenly the comonomer (e.g., octene) is distributed throughout the sample in that as elution temperature decreases, comonomer content increases.

The short chain branching distribution and other compositional information can also be determined using crystallization analysis fractionation such as the CRYSTAF fractionalysis package available commercially from PolymerChar, Valencia, Spain. Practitioners will appreciate that the CRYSTAF fractionalysis technique is more expedient than TREF techniques. The CRYSTAF fractionalysis unit consists of five (5) stainless steel vessels, each with a 60 milliliter volume, installed in oven of a HP5800 II gas chromatograph. An opto-electronic infra detector is used to measure the polymer concentration of the remaining solution at every sampling step during the crystallization process. Reagent grade 1,2,4-trichlorobenezene is used as the solvent. A Hamilton dispenser is programmed to fill the vessels with solvent and sample the reactor reactors to determine polymer concentration.

The fractionalysis starts with the addition of 21 milligrams of polymer composition to 30 milliliters of 1,2,4,-trichlorobenzene (0.07% w/w). The dissolution step is carried out at 140° C. over 45 minutes. After dissolution, the temperature of the solution is decreased to 100° C. at a rate of 40° C./minute and permitted to stand at 100° C. for 30 minutes to equilibrate. The detector is set to read zero with pure 1,2,4-trichlorobenzene and crystallization is initiated by setting a cooling rate of 0.3° C./minute to 30° C. For compositions having densities lower than 0.89 g/cc, cryogenic cooling with $CO_2$ to 20° C. is typically required to quantify the full range crystallizable polymer portions.

At regular intervals during the crystallization, 1.3 milliliters of filtered solution is automatically transported by the dispenser to the detector. The detector reading is average for 10 seconds and 0.8 milliliter of solution is returned to the vessel. The transport line between the vessel and detector is purged with 2 milliliters of pure 1,2,4-trichlorobenzene which is discarded to waste. The sequence of sampling is repeated until 32 detector data points are obtained for each vessel along the whole crystallization temperature range. At the end of the sampling sequence or program, additional measurements are performed in order to measure the soluble fraction of the polymer composition.

Once the analysis is complete, the temperature of each vessels is increased to 140° C. in order to re-dissolve any polymer remaining in the filter. The vessels are emptied and cleaned with 35 milliliters of pure 1,2,4-trichlorobenzene at 140° C. The first derivative of the obtained concentration versus temperature curve is taken as the short chain branching distribution of the polymer composition. Specific integration of the areas under the peak temperatures can quantify the amount of crystallizable polymer portions associated with specific peak temperatures. The peak temperature being a temperature where a significant amount of polymer crystallizes to the extent that a "peak" is illustrated by the derivative of the concentration versus temperature curve.

Practitioners will appreciate that the precision level for CRYSTAF fractionalysis is typical very high. That is, the weight percent determination at the dominant peak temperature above 75° C. is reproducible within ±2 percentage points or ± less than 5% under standard methods and procedures recommended by the PolymerChar. Additional details respecting crystallization analysis fractionation are provided by Benjamin Monrabal in "Crystallization Analysis Fraction: A New Technique for the Analysis of Branching Distribution in Polyolefins," *Journal of Applied Polymer Science*, Vol. 52, pp. 491–499 (1994), the disclosure of which is incorporated herein by reference.

Based on the total weight of crystallizable polymer portions, the novel composition is generally characterized as having a weight percent at the dominant peak temperature above 75° C., as determined using crystallization analysis fractionation in the range of 20 to 100° C., equal to or greater than the mathematical product of $1.7946 \times 10^{-28} \times 10^{(31.839 \times composition\ density)}$ for composition density in grams/cubic centimeter, preferably equal to or greater than the mathematical product of $1.7946 \times 10^{-28} \times 10^{(31.839 \times composition\ density)}$ for composition density in grams/cubic centimeter and less than or equal to 90, and more preferably equal to or greater than the mathematical product of $1.7946 \times 10^{-28} \times 10^{(31.839 \times composition\ density)}$ for composition density in grams/cubic centimeter and less than or equal to 80.

Figure 1:
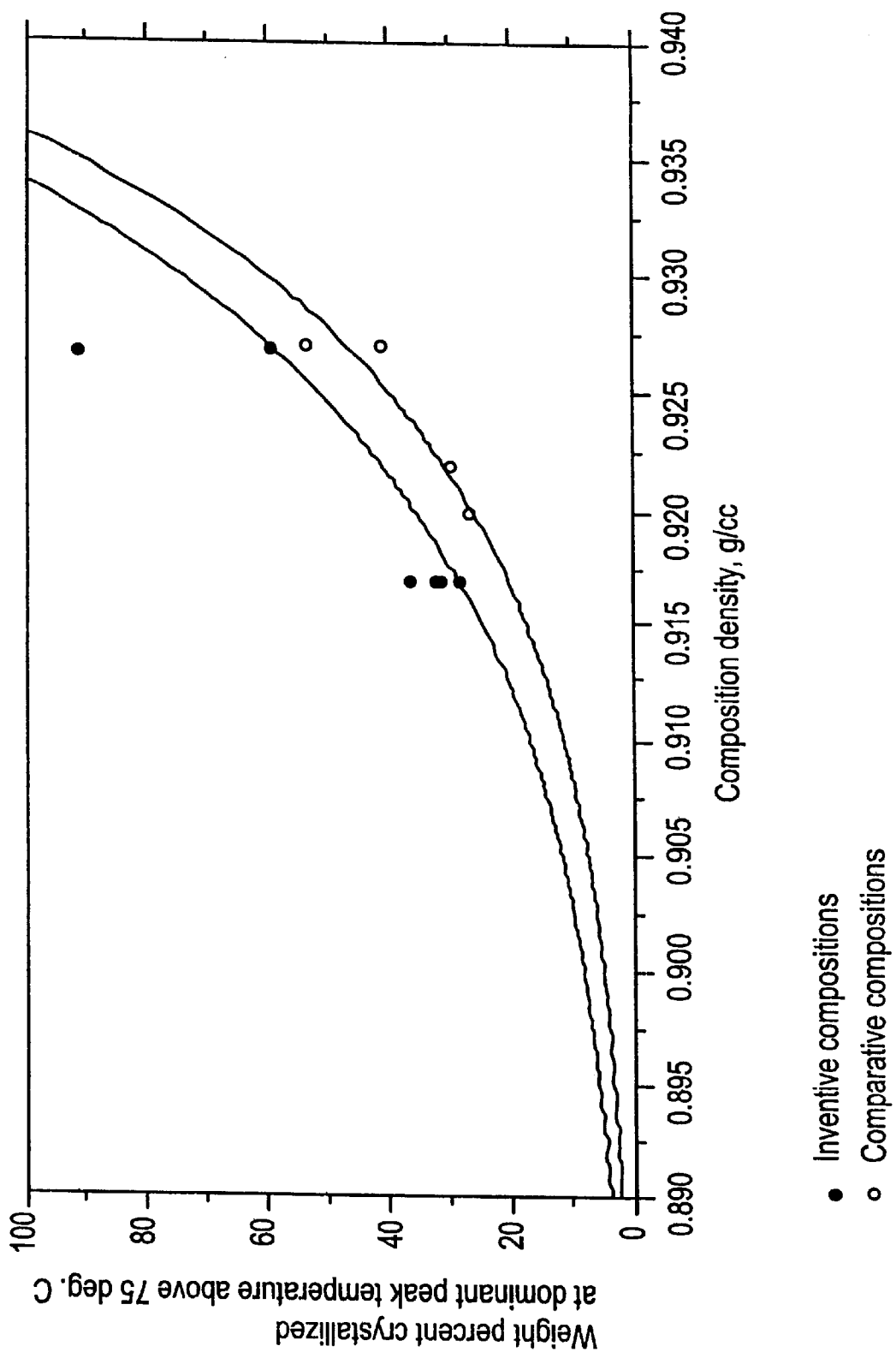

Also, as indicated by FIG. 1, the inventive composition can be generally characterized as having a weight percent crystallized polymer portion at the dominant peak temperature above 75° C., as determined using a crystallization analysis fractionation technique in the range of 20 to 100° C., that is at least 10 percent, preferably at least 30 percent and more preferably at least 40 percent higher than the weight percent crystallized polymer portion at the dominant peak temperature above 75° C. of a comparison composition having essentially the same $I_2$ and composition density.

By the phrase "essentially the same" it is meant that the measured values for the $I_2$ of the inventive composition and the comparison (non-inventive) composition are within 10 percent of each other and the measured values for the composition density of the inventive composition and the comparison (non-inventive) composition are within 0.3% percent of each other. Since the phrase intends to set forth an important requirement, compositions not within this requirement should not be compared for purposes of determining relative crystallized fractional differences as defined in the present invention.

The term "comparison composition" refers to any composition that does not completely meet the defined requirements of the inventive composition (although it may have essentially the same $I_2$ and composition density of the inventive composition) that is compared with the inventive composition to determine relative crystallized fractional differences. As such, whether a composition is an inventive composition or a comparison composition can be deduced from such comparative determinations.

The composition density of the novel composition is generally less than 0.945 g/cc, preferably less than 0.935 g/cc and more preferably less than 0.93 g/cc, and is generally in the range of from 0.90 to 0.945 g/cc, especially in the range of from 0.91 to 0.935 g/cc and most especially in the range of from 0.915 to 0.93 g/cc (as measured in accordance with ASTM D-792).

The molecular weight of polyolefin polymers is conveniently indicated using a melt index measurement according to ASTM D-1238, Condition 190° C./2.16 kg (formerly known as "Condition E" and also known as $I_2$). Melt index is inversely proportional to the molecular weight of the polymer. Thus, the higher the molecular weight, the lower the melt index, although the relationship is not linear. The overall $I_2$ melt index of the novel composition is in the range of from 0.01 to 1000 g/10 minutes, preferably greater than 0.1 g/10 minutes in the range from 0.1 to 50, especially from 0.1 to 10, more especially from 0.1 to 5 g/10 minutes, and most especially in the range between 0.2 and 1.75 g/10 minutes.

Other measurements useful in characterizing the molecular weight of ethylene interpolymer compositions involve melt index determinations with higher weights, such as, for common example, ASTM D-1238, Condition 190° C./10 kg (formerly known as "Condition N" and also known as $I_{10}$). The ratio of a higher weight melt index determination to a lower weight determination is known as a melt flow ratio, and for measured $I_{10}$ and the $I_2$ melt index values the melt flow ratio is conveniently designated as $I_{10}/I_2$. The novel composition has an $I_{10}/I_2$ melt flow ratio of from 8 to 30. In specifically preferred embodiments, the $I_{10}/I_2$ melt flow ratio is from 8 to 10.4 and especially from 8.2 to 10.3 and more especially from 8.2 to 8.6.

The molecular weight distributions of ethylene polymers are determined by gel permeation chromatography (GPC) on a Waters 150 C. high temperature chromatographic unit equipped with a differential refractometer and three columns of mixed porosity. The columns are supplied by Polymer Laboratories and are commonly packed with pore sizes of $10^3$, $10^4$, $10^5$ and $10^6$ Å. The solvent is 1,2,4-trichlorobenzene, from which 0.3 percent by weight solutions of the samples are prepared for injection. The flow rate is about 1.0 milliliters/minute, unit operating temperature is about 140° C. and the injection size is 100 microliters.

The molecular weight determination with respect to the polymer backbone is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in *Journal of Polymer Science*, Polymer Letters, Vol. 6, p. 621, 1968) to derive the following equation:

$$M_{polyethylene} = a * (M_{polystyrene})^b.$$

In this equation, a=0.4316 and b=1.0. Weight average molecular weight, $M_w$, is calculated in the usual manner according to the following formula: $Mj = (\Sigma w_i(M_i^j))^j$; where $w_i$ is the weight fraction of the molecules with molecular weight $M_i$ eluting from the GPC column in fraction i and j=1 when calculating $M_w$ and j=-1 when calculating $M_n$. The novel composition has $M_w/M_n$ greater than or equal to 4, preferably greater than or equal to 4.5, and more preferably greater than or equal to 4.75, and especially in the range of from 4 to 8 and most especially in the range from 4 to 7. However, where the $I_{10}/I_2$ is optimized, preferably the $M_w/M_n$ is in the range of 4 to 4.5.

Parallel plate rheology can be conveniently used to predict easy of extrusion processability by indicating whether a particular ethylene interpolymer composition shear thins or not. In comparisons with known compositions having similar molecular weights and molecular weight distributions, FIG. 12 indicates that the novel composition has a highly favorable parallel plate rheology. Actual blown film fabrication confirms the favorable rheology of the novel composition and also indicates that the novel composition has a relatively high resistance to the onset of melt fracture and excellent melt strength. The excellent melt strength of the novel composition results in excellent bubble stability during, for example, the blown film fabrication investigations.

Melt strength determinations are made at 190° C. using a Goettfert Rheotens and an Instron capillary rheometer. The capillary rheometer is aligned and situated above the Rheotens unit and delivers, at a constant plunger speed of 25.4 mm/min, a filament of molten polymer to the Rheotens unit. The Instron is equipped with a standard capillary die of 2.1 mm diameter and 42 mm length (20:1 L/D) and delivers the filament to the toothed take-up wheels of the Rheotens unit rotating at 10 mm/s. The distance between the exit of the Instron capillary die and the nip point on the Rheotens take-up wheels was 100 mm. The experiment to determine melt strength begins by accelerating the take-up wheels on the Rheotens unit at 2.4 mm/s², the Rheotens unit is capable of acceleration rates from 0.12 to 120 mm/s². As the velocity of the Rheotens take-up wheels increase with time, the draw down force is recorded in centiNewtons (cN) using the Linear Variable Displacement Transducer (LVDT) on the Rheotens unit. The computerized data acquisition system of the Rheotens unit records the draw down force as a function of take-up wheel velocity. The actual melt strength value is taken from the plateau of the recorded draw down force.

The novel composition can be formed by any convenient method, including dry blending selected polymer components together and subsequently melt mixing the component polymers in a mixer or by mixing the polymer components together directly in a mixer (e.g., a Banbury mixer, a Haake mixer, a Brabender internal mixer, or a single or twin screw extruder including a compounding extruder and a side-arm extruder employed directly down stream of a polymerization process).

Preferably, the novel composition is manufactured in-situ using any polymerization method and procedure known in the art (including solution, slurry or gas phase polymerization processes at high or low pressures) provided the operations, reactor configurations, catalysis systems and the like are selected, employed and carried out to indeed provide the novel composition with its defined combination of characteristics. A preferred method of manufacturing the novel composition involves the utilization of a multiple reactor polymerization system with the various reactors operated in series or in parallel configuration or a combination of both where more than two reactors are employed. More preferably, the novel composition is manufactured using a two reactor system wherein the two reactors are operated in a series configuration. In a multiple reactor polymerization system (and especially in a two reactor system) with reactors configured in series, the polymer split is generally from 5 to 60 weight, preferably from 10 to 40 weight percent and more preferably from 15 to 35 weight percent to the first reactor. In particularly preferred embodiments of he invention, the polymer split to the first reactor will be less than 36 weight percent, especially less than 31 weight percent and most especially less than or equal to 27 weight percent. The first reactor is a multiple reactor configuration (e.g. reactors arranged in series) will typically be that reactor situated furthest away from the product outlet to finishing operations. The series configuration of at least two polymerization reactors is preferred in the present invention.

Also, in a preferred embodiment of the invention, a polymerization system consisting of at least one recirculating flow loop reactor and especially a polymerization system consisting of at least two recirculating loop reactors operated nonadiabatically is employed to manufacture the novel composition. Such preferred polymerization systems are as described by Kao et al. in co-pending application number 08/831172, filed Apr. 1, 1997, the disclosure of which is incorporated herein by reference.

The nonadiabatic polymerization is preferably achieved at a volumetric heat removal rate equal to or greater than 400 Btu/hour·cubic foot·° F. (7.4 kW/m$^{3\cdot °}$ K), more preferably, equal to or greater than 600 Btu/hour·cubic foot·° F. (11.1 kW/m$^{3\cdot °}$ K), more especially equal to or greater than 1,200 Btu/hour·cubic foot·° F. (22.2 kW/m$^{3\cdot °}$ K) and most especially equal to or greater than 2,000 Btu/hour·cubic foot·° F. (37 kW/m$^{3\cdot °}$ K).

"Volumetric heat removal rate" as used herein is the process heat transfer coefficient, U, in Btu/hour·square foot·° F., multiplied by the heat exchange area, A, in square feet, of the heat exchange apparatus divided by the total reactor system volume, in cubic feet. One of ordinary skill will recognize that there should be consistency respecting whether process side or outside parameters are used as to U and surface area calculations and determinations. The calculations contained herein are based on the outside surface areas and outside diameters of heat exchange tubes, coils, etc. whether or not the reactor mixture flows through such tubes, coils, etc. or not.

To effectuate nonadiabatic polymerization, any suitable heat exchange apparatus may be used, in any configuration, including, for example, a cooling coil positioned in a polymerization reactor or reactors, a shell-and-tube heat exchanger positioned in a polymerization reactor or reactors wherein the reactor flow stream(s) (also referred to in the art as "reaction mixture") passes through the tubes, or an entire recirculating flow loop reactor being designed as a heat exchange apparatus by providing cooling via a jacket or double piping. In a suitable design, a form of a shell-and-tube heat exchanger can be used wherein the exchanger housing has an inlet and an outlet for the reactor flow stream and an inlet and outlet for heat transfer media (e.g. water, water/glycol, steam, SYLTHERMO™ material or media supplied by The Dow Chemical Company under the designation DOWTHERM®). In another design, the reactor flow stream flows through a plurality of heat transfer tubes within the heat exchanger housing while the heat transfer media flows over the tubes' exterior surfaces transferring the heat of reaction or polymerization from the reactor flow stream. Alternatively, the reaction stream flows through the housing and the heat transfer media flows through the tubes. Suitable heat exchange apparatuses for use in the manufacturing of the novel composition are commercially available items (such as, for example, a static mixer/heat exchanger supplied by Koch) having a tortuous path therethrough defined by the tubes' tubular walls and/or having solid static interior elements forming an interior web through which the reaction mixture flows.

It is generally contemplated that any known catalyst system useful for polymerizing olefins can be used to manufacture the novel composition including conventional Ziegler-Natta catalyst systems, chromium catalyst systems, so-called single site catalyst systems disclosed, for example, the monocyclo-pentadienyl transition metal olefin polymerization catalysts described by Canich in U.S. Pat. No. 5,026,798 or by Canich in U.S. Pat. No. 5,055,438, the disclosures of which are incorporated herein by reference) and constrained geometry catalyst systems (for example, as described by Stevens et al. in U.S. Pat. No. 5,064,802, the disclosure of which is incorporated herein by reference). However, in preferred embodiments, a conventional Ziegler-Natta catalyst system is used to manufacture the novel composition. For preferred embodiments that utilize a polymerization system consisting of at least two reactors, preferably a conventional Ziegler-Natta catalyst system is employed in each of the at least two reactors.

Preferred Ziegler-Natta catalysts for use in manufacturing the novel composition are those that are useful at relatively high polymerization temperatures. Examples of such compositions are those derived from organomagnesium compounds, alkyl halides or aluminum halides or hydrogen chloride, and a transition metal compound. Examples of such catalysts are described in U.S. Pat No. 4,314,912 (Lowery, Jr. et al.), U.S. Pat. No. 4,547,475 (Glass et al.), and U.S. Pat. No. 4,612,300 (Coleman, III), the disclosures of which are incorporated herein by reference.

Particularly suitable organomagnesium compounds include, for example, hydrocarbon soluble dihydrocarbylmagnesium such as the magnesium dialkyls and the magnesium diaryls. Exemplary suitable magnesium dialkyls include particularly n-butyl-sec-butylmagnesium, diisopropylmagnesium, di-n-hexylmagnesium, isopropyl-n- butyl-magnesium, ethyl-n-hexylmagnesium, ethyl-n-butylmagnesium, di-n-octylmagnesium and others wherein the alkyl has from 1 to 20 carbon atoms. Exemplary suitable magnesium diaryls include diphenylmagnesium, dibenzylmagnesium and ditolylmagnesium. Suitable organomagnesium compounds include alkyl and aryl magnesium alkoxides and aryloxides and aryl and alkyl magnesium halides with the halogen-free organomagnesium compounds being more desirable.

Among the halide sources which can be employed herein are the active non-metallic halides, metallic halides, and hydrogen chloride.

Any convenient method and procedure known in the art can be used to prepare a Ziegler-Natta catalyst suitable for use in the present invention. One suitable method and procedure is described in U.S. Pat. No. 4,612,300, the disclosure of which is incorporated herein by reference (Example P). The described method and procedure involves sequentially adding to a volume of Isopar™ E hydrocarbon, a slurry of anhydrous magnesium chloride in Isopar™ E hydrocarbon, a solution of $EtAlCl_2$ in n-hexane, and a solution of $Ti(O-iPr)_4$ in Isopar™ E hydrocarbon, to yield a slurry containing a magnesium concentration of 0.166 M and a ratio of Mg/Al/Ti of 40.0:12.5:3.0. An aliquot of this slurry and a dilute solution of $Et_3Al$ (TEA) are independently pumped in two separate streams and combined immediately prior to introduction polymerization reactor system to give an active catalyst with a final TEA:Ti molar ratio of 6.2:1.

Suitable unsaturated comonomers useful for polymerizing with ethylene include, for example, ethylenically unsaturated monomers, conjugated or non-conjugated dienes, polyenes, etc. Examples of such comonomers include $C_3$–$C_{20}$ α-olefins such as propylene, isobutylene, 1-butene, 1-hexene, 1-pentene, 4-methyl-1-pentene, 1-heptene, 1-octene, 1-nonene, 1-decene, and the like. Preferred comonomers include propylene, 1-butene, 1-hexene, 4-methyl-1-pentene and 1-octene, and 1-octene is especially preferred. Other suitable monomers include styrene, halo- or alkyl-substituted styrenes, tetrafluoroethylene, vinylbenzocyclobutane, 1,4-hexadiene, 1,7-octadiene, and cycloalkenes, e.g., cyclopentene, cyclohexene and cyclooctene.

Additives, such as antioxidants (e.g., hindered phenolics, such as IRGANOX™ 1010 or IRGANOX™ 1076 supplied by Ciba Geigy), phosphites (e.g., IRGAFOS™ 168 also supplied by Ciba Geigy), cling additives (e.g., PIB), SANDOSTAB PEPQ™ (supplied by Sandoz), pigments, colorants, fillers, antistats, processing aids, and the like may also be included in the novel composition or fabricated article. Although generally not required, films, coatings and moldings formed from the novel composition may also contain additives to enhance antiblocking, mold release and coefficient of friction characteristics including, but not limited to, untreated and treated silicon dioxide, talc, calcium carbonate, and clay, as well as primary, secondary and substituted fatty acid amides, release agents, silicone coatings, etc. Still other additives, such as quaternary ammonium compounds alone or in combination with ethylene-acrylic acid (EAA) copolymers or other functional polymers, may also be added to enhance the antistatic characteristics of films, coatings and moldings formed from the novel composition and permit the use of the composition in, for example, the heavy-duty packaging of electronically sensitive goods.

The fabricated articles of the invention (such as, for example, but not limited to, a film, film layer, fiber, molding and coating) may further include recycled and scrap materials and diluent polymers, to the extent that the balanced processability, impact resistance and tear resistance properties are maintained. Exemplary diluent materials include, for example, elastomers, rubbers and anhydride modified polyethylenes (e.g., polybutylene and maleic anhydride grafted LLDPE and HDPE) as well as with high pressure polyethylenes such as, for example, low density polyethylene (LDPE), ethylene/acrylic acid (EAA) interpolymers, ethylene/vinyl acetate (EVA) interpolymers and ethylene/methacrylate (EMA) interpolymers, and combinations thereof.

The fabricated article of the invention may find utility in a variety of applications. Suitable applications are thought to include, for example, but are not limited to, monolayer packaging films; multilayer packaging structures consisting of other materials such as, for example, biaxially oriented polypropylene or biaxially oriented ethylene polymer for shrink film and barrier shrink applications; packages formed via form/fill/seal machinery; peelable seal packaging structures; cook-in food packages; compression filled packages; heat sealable stretch wrap packaging film such as, for example, fresh produce packaging and fresh red meat retail packaging; liners and bags such as, for example, cereal liners, grocery/shopping bags, and especially heavy-duty shipping sacks and high performance trash can liners (bags) where higher levels of downgauging are now possible due to the improved toughness properties exhibited by the fabricated article of the invention.

The fabricated article of the invention can be prepared by any convenient method known in the art. Suitable methods include, for example, lamination and coextrusion techniques or combinations thereof, blown film, cast film, extrusion coating, injection molding, blow molding, thermoforming, profile extrusion, pultrusion, compression molding, rotomolding, or injection blow molding operations or combinations thereof and the like.

The fabricated article of the invention can be of any thickness required or desired for its end-use application. In particular, the novel film of the invention can be of any suitable film thickness, however, practitioners will appreciate that the significant downgauging may be possible due to the improved toughness properties exhibited by the novel film.

EXAMPLES

The following examples are provided for the purpose of explanation, rather than limitation.

In an evaluation to investigate the tear resistance of various ethylene interpolymer compositions, several compositions were obtained. For this investigation, Inventive Compositions 1 and 2 were manufactured using a non-adiabatic polymerization system consisting of two recirculating loop reactors configured in series. The process conditions employed in the manufacturing of the two inventive examples are provided in Table 1.

Also for the investigation, comparative composition 3 was manufactured according to methods and procedures described U.S. Pat. No. 5,370,940 using an adiabatic polymerization system consisting of two sphere reactors configured in series. The process conditions employed in the manufacturing of comparative composition 3 are provided in Table 2.

Comparative composition 4 was manufactured using the same polymerization system and similar process conditions as employed in the manufacture of Inventive Compositions 1 and 2, except a constrained geometry catalyst system was utilized in flow loop Rx1 instead of a heterogeneous Ziegler-Natta titanium coordination catalyst system.

TABLE 1

| | Inv. Ex. 1 | |
|---|---|---|
| | Flow Loop R × 1 | Flow Loop R × 2 |
| Process Temperature, °C. | 161 | 190 |
| Process Pressure, psig | 525 | 525 |
| Polymer Concentration wt. % | 10.6 | 19.5 |
| $C_2$ Conversion, % (overall) | 73.6 | 89.3 (92.4) |
| Solvent/$C_2$ feed ratio | 6.82 | 2.80 |
| Solvent flow, lbs./hr | 600 | 398 |
| $C_2$ flow, lbs./hr (kg/hr) | 88 (40) | 142 (64) |
| Make-up $C_8$ flow, lbs./hr (kg/hr) | 0 (0) | 19 (8.6) |
| Fresh Hydrogen flow, sccm | 1021 | 3255 |
| Feed Temp., °C. | 40 | 15 |
| Recycle Ratio | 17.7 | 7.6 |
| Polymer split, weight % | 30.4 | 69.6 |
| Residence time, min. | 20.6 | 9.9 |
| Catalyst Type | Heterogeneous Ziegler-Natta Titanium coordination catalyst system | Heterogeneous Ziegler-Natta Titanium coordination catalyst system |
| Catalyst efficiency, MM lbs. product/lb. Titanium | 1.3 | 0.49 |
| Volumetric Heat Removal rate, BTU/hr*ft$^3$*°F. (kW/m$^3$ · °K.) | ~1100 (~18.5) | 620 (11.5) |
| Production rate, lbs./hr. (kg/hr) ((overall)) | 73 (33) | 167 (76) ((240)) |

| | Inv. Ex. 2 | |
|---|---|---|
| | Flow Loop R × 1 | Flow Loop R × 2 |
| Process Temperature, °C. | 161 | 190 |
| Process Pressure, psig | 525 | 525 |
| Polymer Concentration wt. % | 10.6 | 19.5 |
| $C_2$ Conversion, % (overall) | 73.5 | 90 (92.9) |
| Solvent/$C_2$ feed ratio | 6.80 | 2.80 |
| Solvent flow, lbs./hr | 598 | 398 |
| $C_2$ flow, lbs./hr (kg/hr) | 88 (40) | 142 (64) |
| Make-up $C_8$ flow, lbs./hr (kg/hr) | 17.2 (7.8) | 0 (0) |
| Fresh Hydrogen flow, sccm | 950 | 2968 |
| Feed Temp., °C. | 40 | 15 |
| Recycle Ratio | 17.7 | 7.7 |
| Polymer split, weight % | 30.4 | 69.6 |
| Residence time, min. | 20.6 | 10 |
| Catalyst Type | Heterogeneous Ziegler-Natta Titanium coordination catalyst system | Heterogeneous Ziegler-Natta Titanium coordination catalyst system |
| Catalyst efficiency, MM lbs. product/lb. Titanium | 1.4 | 0.56 |
| Volumetric Heat Removal rate, BTU/hr*ft$^3$*°F. (kW/m$^3$ · °K.) | ~1400 (~26) | 585 (10.8) |
| Production rate, lbs./hr. (kg/hr) ((overall)) | 73 (33) | 166 (95) ((239)) |

TABLE 2

| | Comp. Ex 3 | |
|---|---|---|
| | Spherical R × 1 | Spherical R × 2 |
| Process Temperature, °C. | 159 | 197 |
| Polymer Concentration wt. % | 6.7 | 12.2 |
| $C_2$ Conversion, %, (overall) | 80 | 90.5 (92.9) |
| Solvent/$C_2$ feed ratio | 13 | 5.35 |
| Solvent flow, lbs./hr (kg/hr) | 125,788 (57,057) | 116,216 (52,716) |
| $C_2$ flow, lbs./hr | 9676 (4369) | 21,723 (9,854) |
| Make-up $C_8$ flow, lbs./hr (overall) ((kg/hr)) | (2425) ((1100)) | |
| Hydrogen flow, sccm | 0 | ~7000,000 |
| Recycle Ratio | NA | NA |
| Feed Temp., °C. | 76 | 22 |
| Polymer split, weight % | 27.4 | 72.6 |
| Residence time, min | NA | NA |
| Catalyst Type | Heterogeneous Ziegler-Natta Titanium coordination catalyst system | Heterogeneous Ziegler-Natta Titanium coordination catalyst system |
| Catalyst efficiency, MM lbs. product/lb. Ti (overall) | (0.18) | |
| Volumetric Heat Removal rate | NA | NA |
| Production rate, lbs./hr./*r*ft$^3$*°F. (overall) | 9119 | 24153 |

Relative to the polymerization system used to manufacture Inventive Compositions 1 and 2, the two reactor system used to manufacture comparative composition 3 required significantly higher feed temperatures to avoid objectionable levels of gels in the finished product. The independent control of polymer concentration and process temperature that is characteristic of nonadiabatic recirculating flow loop reactors proves to be a tremendous economic benefit in regards to requirements for good gel quality, particularly at lower product melt indexes.

Nominal 0.025 millimeter (mm) blown film was fabricated from Inventive Compositions 1 and 2 and comparative compositions 3 and 4 on an Egan blown film unit equipped with 2 inch (5.1 cm) diameter, 32:1 L/D extruder and a 3 inch (7.6 cm) annular die. The blown film extrusion condition for each film is provided in Table 3.

TABLE 3

| Example | Inv. Ex 1 | Inv. Ex 2 | Comp. Ex 3 | Comp. Ex 4 |
|---|---|---|---|---|
| Die Gap, mil | 35 | 35 | 35 | 35 |
| Melt Temperature, °F. | 450 | 445 | 446 | 442 |
| Die Pressure | 4000 | 4400 | 4200 | 3750 |
| Output, lbs./hr. (kg/hr) | 30.1 (14) | 29 (13) | 30.1 (14) | 18.8 (8.5)* |
| Frostline Height, inches (cm) | 7 (17.8) | 7 (17.8) | 7 (17.8) | 10 (25.4)** |
| Screw rpms | 41 | 41 | 41 | 25 |
| Extruder Amperage | 43 | 44 | 43 | 39 |
| Blow-Up Ratio | 2.7 | 2.7 | 2.7 | 2.7 |

In the actual fabrication of the blown film Inventive Compositions 1 and 2 and comparative composition 3 exhibited good processability and excellent melt stability as indicated by relatively high output performances and relatively low frostline heights (i.e., good bubble stability), respectively. Conversely, comparative composition 4 exhibited a relatively low output performance and a relatively high frostline height.

Table 4 lists some physical properties and film performance properties for Inventive Compositions 1 and 2 and comparative compositions 3 and 4.

Table 4 indicates the Inventive Compositions 1 and 2 have excellent tear resistance, good handling properties (i.e., low film block) and fairly broad molecular weight distributions. The tear resistance of Inventive Composition 1 and 2 was 33–46 percent and 34–37 percent, respectively, higher than the tear resistance of comparative composition 4.

TABLE 4

| Example | Inv. Ex 1 | Inv. Ex 2 | Comp. Ex 3 | Comp. Ex 4 |
|---|---|---|---|---|
| Composition Density, g/cc | 0.9271 | 0.9271 | 0.9262 | 0.9263 |
| $I_2$ g/10 minutes | 0.44 | 0.42 | 0.55 | 0.54 |
| $I_{10}$, g/10 minutes | 4.61 | 3.96 | 5.01 | 3.77 |
| $I_{10}/I_2$ | 10.45 | 9.47 | 9.03 | 6.98 |
| GPC $M_2/M_n$ | 4.74 | 5.37 | 5.53 | 2.72 |
| Weight Avg. MW | 170700 | 173000 | 169300 | 142000 |
| Number Avg. MW. | 36000 | 32200 | 30600 | 52200 |
| Rheotens Melt Strength, Force in centi-Newtons | 8.3 | 9.45 | 7.75 | 7.3 |
| Film Block, grams | 5.50 | 5.72 | 7.95 | 6.40 |
| Avg Elmendorf Type B CD | 526 | 486 | 573 | 429 |
| Normalized Elem. B CD | 591 | 541 | 556 | 405 |
| Std Dev. Elmen. B CD | 34 | 65 | 51 | 47 |
| Avg Elmendorf Type B MD | 490 | 430 | 477 | 339 |
| Normalized Elmen. B MD | 476 | 494 | 459 | 359 |
| Std Dev. Elmen. B MD | 78 | 55 | 35 | 34 |

Film block was determined in accordance with ASTM D3354.
Elmendorf tear resistance was determined in accordance with ASTM D1922 and normalization was to 1 mil (25 mm) thickness.

In an investigation to determine the relative compositional uniformity of various ethylene interpolymers, additional compositions were obtained and analyze using the CRYSTAF fractionalysis technique described above. The additional compositions for this investigation included comparative compositions 5 and 6 and Inventive Compositions 7–10.

Comparative composition 5 was a linear low density polyethylene (LLDPE) resin supplied by The Dow Chemical Company under the commercial designation DOWLEX LLDPE resin 2045. Comparative composition 6 an experimental linear low density polyethylene (LLDPE) resin supplied by The Dow Chemical Company.

Inventive Compositions 7–10 were manufactured using the same polymerization system described above as used to manufacture Inventive Compositions 1 and 2. The process conditions used for Inventive Compositions 7–10 were essential similar to those employed for Inventive Compositions 1 and 2 except the make-up octene flow as higher for Inventive Compositions 7–10 and fresh hydrogen flows to each reactor were adjusted to provide higher $I_{10}/I_2$ ratios for Inventive Compositions 7–10. Inventive Composition 7 was manufactured using a 30 weight percent polymer split to reactor Rx1 (i.e., the first reactor). Inventive Compositions 8–10 were manufactured using a 25 weight percent polymer split to reactor Rx1.

CRYSTAF curves (FIGS. 2–11) were generated for the various compositions and their respective weight percentages of crystallized polymer portion at their respective dominant peak temperatures above 75° C. were deduced from the CRYSTAF curves. Table 5 summarizes the physical properties and the crystallization data for the various compositions.

TABLE 5

| Example | Density, g/cc | $I_2$, g/10 min. | $I_{10}$, g/10 min. | $I_{10}/I_2$ | $M_w/M_n$ | Wt. % crystallized @ DPT above 75° C. |
|---|---|---|---|---|---|---|
| Inv. Ex. 1 | 0.9271 | 0.44 | 4.61 | 10.45 | 4.74 | 58.7 |
| Inv. Ex 2 | 0.9271 | 0.42 | 4.30 | 10.25 | 5.37 | 95.7 |
| Comp. Ex 3 | 0.9262 | 0.55 | 5.01 | 9.03 | 5.53 | 53.0 |
| Comp. Ex 4 | 0.9263 | 0.54 | 3.77 | 6.98 | 2.72 | 40.8 |
| Comp. Ex 5 | 0.920 | 1.0 | ND | ND | ND | 26.6 |
| Comp. Ex 6 | 0.922 | 0.50 | ND | ND | ND | 29.6 |
| Inv. Ex 7 | 0.917 | 0.58 | 6.84 | 11.9 | 6.42 | 28.2 |
| Inv. Ex 8 | 0.917 | 0.64 | 6.85 | 10.7 | 5.5 | 31.2 |
| Inv. Ex 9 | 0.917 | 0.48 | 5.0 | 10.5 | 5.69 | 31.8 |
| Inv. Ex 10 | 0.917 | ND | ND | NA | 5.44 | 31.8 |

ND denotes "not determined."
NA denotes "not applicable."

FIG. 1, which is a plot of the weight percent crystallized polymer portion at the dominant peak temperature above 75° C. as a function of composition density for Inventive Compositions and comparative compositions, was generated using the data in Table 5. Using the crystallization data for Inventive Compositions 1 and 2 and comparative compositions 3 and 4, FIG. 24 was generated to illustrate the relationship between tear resistance and the weight percent of crystallized polymer portion at the dominant peak temperature above 75° C. for the respective compositions. FIG. 24 shows with respect to tear resistance performance that there is an apparent optimum at about 75 weight percent for the crystallized polymer portion at the dominant peak temperature above 75° C.

ATREF was performed for Inventive Compositions 1 and 2 and comparative compositions 3 and 4. FIGS. 13–16 provide various comparisons between the four compositions. In general, the various ATREF comparison complement the CRYSTAF data by indicating that at equivalent overall composition densities the Inventive Compositions possess more polymer crystallizing at higher temperatures, and this distinction becomes even more prominent at higher equivalent composition densities. However, although their amount of polymer portions crystallizing at higher temperatures differ substantially, the inventive compositions and the comparative compositions have essentially equivalent molecular weight as indicated by $M_V$ results.

The raw GPC molecular data for Inventive Compositions 1 and 2 and comparative compositions 3 and 4 are provide in Table 6. FIGS. 17–23 are GPC comparisons between inventive compositions and comparative compositions.

TABLE 6

| Molecular weight | Inv. Ex 1 | | | Inv. Ex 2 | | |
|---|---|---|---|---|---|---|
| | Relative fraction | Percentage above molecular weight | Percent below molecular weight | Relative fraction | Percentage above molecular weight | Percentage below molecular weight |
| 6649990 | | | | | | |
| 6218706 | | | | | | |
| 5819638 | | | | | | |
| 5450006 | | | | | | |
| 5107319 | | | | | | |
| 4789289 | | | | | | |
| 4493865 | | | | | | |
| 4219189 | | | | | | |
| 3963593 | | | | | | |
| 3725529 | | | | | | |
| 3503612 | 0.0E+00 | 0.000% | 100.000% | | | |
| 3296583 | 7.14E−05 | 0.006% | 99.994% | 0.00E+00 | 0.000% | 100.000% |
| 3103295 | 1.78E−04 | 0.021% | 99.979% | 6.61E−05 | 0.005% | 99.995% |
| 2922685 | 3.15E−04 | 0.047% | 99.953% | 2.03E−04 | 0.022% | 99.978% |
| 2753797 | 4.15E−04 | 0.081% | 99.919% | 4.05E−04 | 0.056% | 99.944% |
| 2595769 | 5.31E−04 | 0.125% | 99.875% | 5.82E−04 | 0.104% | 99.896% |
| 2447789 | 6.63E−04 | 0.179% | 99.821% | 7.06E−04 | 0.162% | 99.838% |
| 2309128 | 8.19E−04 | 0.247% | 99.753% | 8.19E−04 | 0.229% | 99.771% |
| 2179119 | 9.70E−04 | 0.327% | 99.673% | 9.59E−04 | 0.308% | 99.692% |
| 2057136 | 1.09E−03 | 0.417% | 99.583% | 1.16E−03 | 0.404% | 99.596% |
| 1942621 | 1.18E−03 | 0.515% | 99.485% | 1.35E−03 | 0.515% | 99.485% |
| 1835050 | 1.29E−03 | 0.621% | 99.379% | 1.48E−03 | 0.637% | 99.363% |
| 1733948 | 1.43E−03 | 0.739% | 99.261% | 1.58E−03 | 0.767% | 99.233% |
| 1638872 | 1.61E−03 | 0.872% | 99.128% | 1.69E−03 | 0.906% | 99.094% |
| 1549416 | 1.78E−03 | 1.019% | 98.981% | 1.82E−03 | 1.056% | 98.944% |
| 1465207 | 1.93E−03 | 1.179% | 98.821% | 1.95E−03 | 1.217% | 98.783% |
| 1385900 | 2.07E−03 | 1.350% | 98.650% | 2.12E−03 | 1.393% | 98.607% |
| 1311173 | 2.26E−03 | 1.536% | 98.464% | 2.28E−03 | 1.581% | 98.419% |
| 1240729 | 2.49E−03 | 1.742% | 98.258% | 2.48E−03 | 1.785% | 98.215% |
| 1174297 | 2.70E−03 | 1.965% | 98.035% | 2.64E−03 | 2.003% | 97.997% |
| 1111624 | 2.87E−03 | 2.202% | 97.798% | 2.90E−03 | 2.242% | 97.758% |
| 1052471 | 3.00E−03 | 2.450% | 97.550% | 3.17E−03 | 2.504% | 97.496% |
| 996621 | 3.20E−03 | 2.714% | 97.286% | 3.50E−03 | 2.793% | 97.207% |
| 943874 | 3.45E−03 | 2.999% | 97.001% | 3.77E−03 | 3.103% | 96.897% |
| 894038 | 3.75E−03 | 3.308% | 96.692% | 3.98E−03 | 3.432% | 96.568% |
| 846937 | 4.04E−03 | 3.641% | 96.359% | 4.17E−03 | 3.776% | 96.224% |
| 802411 | 4.29E−03 | 3.995% | 96.005% | 4.37E−03 | 4.136% | 95.864% |
| 760305 | 4.54E−03 | 4.370% | 95.630% | 4.61E−03 | 4.516% | 95.484% |
| 720475 | 4.80E−03 | 4.766% | 95.234% | 4.84E−03 | 4.916% | 95.084% |
| 682791 | 5.11E−03 | 5.188% | 94.812% | 5.13E−03 | 5.339% | 94.661% |
| 647131 | 5.40E−03 | 5.634% | 94.366% | 5.44E−03 | 5.788% | 94.212% |
| 613373 | 5.71E−03 | 6.105% | 93.895% | 5.82E−03 | 6.269% | 93.731% |
| 581415 | 5.97E−03 | 6.598% | 93.402% | 6.14E−03 | 6.775% | 93.225% |
| 551152 | 6.24E−03 | 7.113% | 92.887% | 6.42E−03 | 7.305% | 92.695% |
| 522488 | 6.49E−03 | 7.649% | 92.351% | 6.65E−03 | 7.853% | 92.147% |
| 495336 | 6.78E−03 | 8.208% | 91.792% | 6.93E−03 | 8.425% | 91.575% |
| 469612 | 7.06E−03 | 8.791% | 91.209% | 7.19E−03 | 9.018% | 90.982% |
| 445238 | 7.34E−03 | 9.397% | 90.603% | 7.46E−03 | 9.634% | 90.366% |
| 422138 | 7.63E−03 | 10.026% | 89.974% | 7.74E−03 | 10.272% | 89.728% |
| 400243 | 7.94E−03 | 10.682% | 89.318% | 8.03E−03 | 10.935% | 89.065% |
| 379491 | 8.28E−03 | 11.365% | 88.635% | 8.33E−03 | 11.622% | 88.378% |
| 359818 | 8.62E−03 | 12.077% | 87.923% | 8.65E−03 | 12.336% | 87.664% |
| 341168 | 8.98E−03 | 12.818% | 87.182% | 8.99E−03 | 13.078% | 86.922% |
| 323483 | 9.35E−03 | 13.590% | 86.410% | 9.38E−03 | 13.852% | 86.148% |
| 306715 | 9.71E−03 | 14.391% | 85.609% | 9.78E−03 | 14.659% | 85.341% |
| 290814 | 1.01E−02 | 15.223% | 84.777% | 1.02E−02 | 15.503% | 84.497% |
| 275736 | 1.05E−02 | 16.086% | 83.914% | 1.07E−02 | 16.386% | 83.614% |
| 261437 | 1.09E−02 | 16.986% | 83.014% | 1.12E−02 | 17.312% | 82.688% |
| 247876 | 1.14E−02 | 17.926% | 82.074% | 1.17E−02 | 18.277% | 81.723% |
| 235014 | 1.19E−02 | 18.908% | 81.092% | 1.21E−02 | 19.278% | 80.722% |
| 222816 | 1.24E−02 | 19.931% | 80.069% | 1.26E−02 | 20.316% | 79.684% |
| 211247 | 1.29E−02 | 20.992% | 79.008% | 1.30E−02 | 21.391% | 78.609% |
| 200274 | 1.33E−02 | 22.091% | 77.909% | 1.35E−02 | 22.504% | 77.496% |
| 189867 | 1.38E−02 | 23.228% | 76.772% | 1.40E−02 | 23.656% | 76.344% |
| 179996 | 1.42E−02 | 24.401% | 75.599% | 1.44E−02 | 24.847% | 75.153% |
| 170635 | 1.47E−02 | 25.613% | 74.387% | 1.49E−02 | 26.080% | 73.920% |
| 161757 | 1.52E−02 | 26.864% | 73.136% | 1.54E−02 | 27.350% | 72.650% |
| 153336 | 1.56E−02 | 28.155% | 71.845% | 1.59E−02 | 28.658% | 71.342% |
| 145351 | 1.61E−02 | 29.485% | 70.515% | 1.63E−02 | 30.001% | 69.999% |
| 137777 | 1.66E−02 | 30.854% | 69.146% | 1.67E−02 | 31.382% | 68.618% |
| 130595 | 1.70E−02 | 32.261% | 67.739% | 1.72E−02 | 32.801% | 67.199% |
| 123785 | 1.75E−02 | 33.704% | 66.296% | 1.76E−02 | 34.253% | 65.747% |
| 117326 | 1.79E−02 | 35.180% | 64.820% | 1.80E−02 | 35.742% | 64.258% |
| 111203 | 1.83E−02 | 36.689% | 63.311% | 1.84E−02 | 37.264% | 62.736% |

TABLE 6-continued

| | | | | | | |
|---|---|---|---|---|---|---|
| 105396 | 1.87E−02 | 38.230% | 61.770% | 1.89E−02 | 38.821% | 61.179% |
| 99890 | 1.91E−02 | 39.804% | 60.196% | 1.92E−02 | 40.407% | 59.593% |
| 94670 | 1.94E−02 | 41.409% | 58.591% | 1.96E−02 | 42.025% | 57.975% |
| 89722 | 1.98E−02 | 43.047% | 56.953% | 2.00E−02 | 43.672% | 56.328% |
| 85030 | 2.02E−02 | 44.712% | 55.288% | 2.03E−02 | 45.347% | 54.653% |
| 80582 | 2.05E−02 | 46.402% | 53.598% | 2.05E−02 | 47.042% | 52.958% |
| 76366 | 0.0207 | 48.111% | 51.889% | 2.07E−02 | 48.753% | 51.247% |
| 72370 | 0.020925 | 49.838% | 50.162% | 2.09E−02 | 50.475% | 49.525% |
| 68582 | 2.11E−02 | 51.581% | 48.419% | 2.10E−02 | 52.209% | 47.791% |
| 64992 | 2.13E−02 | 53.336% | 46.664% | 2.11E−02 | 53.949% | 46.051% |
| 61589 | 2.13E−02 | 55.094% | 44.906% | 2.11E−02 | 55.690% | 44.310% |
| 58364 | 0.02129 | 56.851% | 43.149% | 2.10E−02 | 57.422% | 42.578% |
| 55308 | 2.13E−02 | 58.605% | 41.395% | 2.08E−02 | 59.142% | 40.858% |
| 52412 | 2.12E−02 | 60.354% | 39.646% | 2.07E−02 | 60.850% | 39.150% |
| 49668 | 2.11E−02 | 62.094% | 37.906% | 2.05E−02 | 62.545% | 37.455% |
| 47067 | 2.09E−02 | 63.818% | 36.182% | 2.03E−02 | 64.219% | 35.781% |
| 44603 | 2.06E−02 | 65.521% | 34.479% | 2.00E−02 | 65.865% | 34.135% |
| 42269 | 2.03E−02 | 67.194% | 32.806% | 1.95E−02 | 67.478% | 32.522% |
| 40057 | 1.98E−02 | 68.831% | 31.169% | 1.91E−02 | 69.056% | 30.944% |
| 37961 | 1.93E−02 | 70.426% | 29.574% | 1.87E−02 | 70.597% | 29.403% |
| 35976 | 1.88E−02 | 71.980% | 28.020% | 1.82E−02 | 72.096% | 27.904% |
| 34095 | 0.01835 | 73.495% | 26.505% | 1.76E−02 | 73.549% | 26.451% |
| 32314 | 1.78E−02 | 74.967% | 25.033% | 1.70E−02 | 74.952% | 25.048% |
| 30626 | 0.01723 | 76.389% | 23.611% | 1.64E−02 | 76.306% | 23.694% |
| 29027 | 1.65E−02 | 77.754% | 22.246% | 1.58E−02 | 77.606% | 22.394% |
| 27513 | 0.01578 | 79.056% | 20.944% | 1.51E−02 | 78.851% | 21.149% |
| 26078 | 1.51E−02 | 80.300% | 19.700% | 1.44E−02 | 80.041% | 19.959% |
| 24719 | 1.44E−02 | 81.490% | 18.510% | 1.38E−02 | 81.180% | 18.820% |
| 23432 | 1.38E−02 | 82.631% | 17.369% | 1.33E−02 | 82.273% | 17.727% |
| 22213 | 1.33E−02 | 83.727% | 16.273% | 1.27E−02 | 83.322% | 16.678% |
| 21058 | 1.28E−02 | 84.782% | 15.218% | 1.22E−02 | 84.328% | 15.672% |
| 19964 | 1.23E−02 | 85.796% | 14.204% | 1.17E−02 | 85.293% | 14.707% |
| 18928 | 1.18E−02 | 86.767% | 13.233% | 1.12E−02 | 86.220% | 13.780% |
| 17946 | 1.12E−02 | 87.694% | 12.306% | 1.07E−02 | 87.106% | 12.894% |
| 17016 | 1.07E−02 | 88.575% | 11.425% | 1.02E−02 | 87.949% | 12.051% |
| 16136 | 1.01E−02 | 89.412% | 10.588% | 9.64E−03 | 88.744% | 11.256% |
| 15301 | 9.59E−03 | 90.203% | 9.797% | 9.09E−03 | 89.494% | 10.506% |
| 14511 | 9.01E−03 | 90.947% | 9.053% | 8.54E−03 | 90.199% | 9.801% |
| 13763 | 8.42E−03 | 91.642% | 8.358% | 8.03E−03 | 90.861% | 9.139% |
| 13053 | 7.85E−03 | 92.290% | 7.710% | 7.49E−03 | 91.479% | 8.521% |
| 12381 | 7.35E−03 | 92.896% | 7.104% | 7.00E−03 | 92.057% | 7.943% |
| 11745 | 6.89E−03 | 93.465% | 6.535% | 6.56E−03 | 92.598% | 7.402% |
| 11142 | 6.45E−03 | 93.998% | 6.002% | 6.21E−03 | 93.110% | 6.890% |
| 10571 | 6.04E−03 | 94.497% | 5.503% | 5.85E−03 | 93.593% | 6.407% |
| 10029 | 5.67E−03 | 94.965% | 5.035% | 5.54E−03 | 94.050% | 5.950% |
| 9516 | 5.34E−03 | 95.406% | 4.594% | 5.19E−03 | 94.478% | 5.522% |
| 9030 | 5.04E−03 | 95.822% | 4.178% | 4.88E−03 | 94.880% | 5.120% |
| 8569 | 4.67E−03 | 96.207% | 3.793% | 4.51E−03 | 95.253% | 4.747% |
| 8133 | 4.28E−03 | 96.561% | 3.439% | 4.16E−03 | 95.596% | 4.404% |
| 7719 | 3.90E−03 | 96.883% | 3.117% | 3.82E−03 | 95.911% | 4.089% |
| 7327 | 3.61E−03 | 97.180% | 2.820% | 3.59E−03 | 96.207% | 3.793% |
| 6955 | 3.35E−03 | 97.456% | 2.544% | 3.42E−03 | 96.489% | 3.511% |
| 6602 | 3.12E−03 | 97.714% | 2.286% | 3.29E−03 | 96.761% | 3.239% |
| 6268 | 2.87E−03 | 97.951% | 2.049% | 3.12E−03 | 97.018% | 2.982% |
| 5951 | 2.65E−03 | 98.169% | 1.831% | 2.91E−03 | 97.258% | 2.742% |
| 5651 | 2.42E−03 | 98.369% | 1.631% | 2.65E−03 | 97.476% | 2.524% |
| 5366 | 2.23E−03 | 98.553% | 1.447% | 2.43E−03 | 97.677% | 2.323% |
| 5096 | 2.05E−03 | 98.722% | 1.278% | 2.25E−03 | 97.863% | 2.137% |
| 4839 | 1.90E−03 | 98.878% | 1.122% | 2.10E−03 | 98.036% | 1.964% |
| 4596 | 1.76E−03 | 99.023% | 0.977% | 1.97E−03 | 98.199% | 1.801% |
| 4366 | 1.61E−03 | 99.156% | 0.844% | 1.86E−03 | 98.352% | 1.648% |
| 4147 | 1.48E−03 | 99.278% | 0.722% | 1.77E−03 | 98.498% | 1.502% |
| 3939 | 1.33E−03 | 99.388% | 0.612% | 1.66E−03 | 98.635% | 1.365% |
| 3742 | 1.19E−03 | 99.487% | 0.513% | 1.53E−03 | 98.761% | 1.239% |
| 3555 | 1.04E−03 | 99.573% | 0.427% | 1.38E−03 | 98.875% | 1.125% |
| 3378 | 9.02E−04 | 99.647% | 0.353% | 1.23E−03 | 98.977% | 1.023% |
| 3209 | 7.86E−04 | 99.712% | 0.288% | 1.10E−03 | 99.068% | 0.932% |
| 3049 | 6.96E−04 | 99.770% | 0.230% | 9.81E−04 | 99.149% | 0.851% |
| 2897 | 6.06E−04 | 99.820% | 0.180% | 9.10E−04 | 99.224% | 0.776% |
| 2753 | 5.24E−04 | 99.863% | 0.137% | 9.03E−04 | 99.298% | 0.702% |
| 2616 | 4.33E−04 | 99.899% | 0.101% | 9.05E−04 | 99.373% | 0.627% |
| 2486 | 3.85E−04 | 99.930% | 0.070% | 8.80E−04 | 99.445% | 0.555% |
| 2362 | 3.20E−04 | 99.957% | 0.043% | 7.90E−04 | 99.511% | 0.489% |
| 2244 | 2.81E−04 | 99.980% | 0.020% | 7.19E−04 | 99.570% | 0.430% |
| 2133 | 1.63E−04 | 99.993% | 0.007% | 6.93E−04 | 99.627% | 0.373% |
| 2027 | 8.04E−05 | 100.00% | 0.000% | 6.67E−04 | 99.682% | 0.318% |
| 1926 | 0.0E+00 | | | 6.13E−04 | 99.733% | 0.267% |
| 1830 | | | | 5.05E−04 | 99.774% | 0.226% |
| 1739 | | | | 4.33E−04 | 99.810% | 0.190% |

TABLE 6-continued

| | | | | | | | |
|---|---|---|---|---|---|---|---|
| 1652 | | | | 3.79E−04 | 99.841% | 0.159% | |
| 1570 | | | | 3.62E−04 | 99.871% | 0.129% | |
| 1491 | | | | 3.45E−04 | 99.900% | 0.100% | |
| 1416 | | | | 3.19E−04 | 99.926% | 0.074% | |
| 1346 | | | | 2.84E−04 | 99.949% | 0.051% | |
| 1278 | | | | 2.21E−04 | 99.968% | 0.032% | |
| 1214 | | | | 1.59E−04 | 99.981% | 0.019% | |
| 1153 | | | | 1.15E−04 | 99.990% | 0.010% | |
| 1094 | | | | 7.16E−05 | 99.996% | 0.004% | |
| 1039 | | | | 3.91E−05 | 99.999% | 0.001% | |
| 986 | | | | 6.32E−06 | 100.000% | 0.000% | |
| 936 | | | | 0.00E+00 | | | |

| | Comp. Ex 3 | | | Comp. Ex 4 | | |
|---|---|---|---|---|---|---|
| Molecular weight | Relative fraction | Percentage above molecular weight | Percentage below molecular weight | Relative fraction | Percentage above molecular weight | Percentage below molecular weight |
| 6649990 | 0.00E+00 | 0.000% | 100.000% | | | |
| 6218706 | 5.43E−05 | 0.004% | 99.996% | | | |
| 5819638 | 1.29E−04 | 0.015% | 99.985% | | | |
| 5450006 | 1.98E−04 | 0.031% | 99.969% | | | |
| 5107319 | 2.14E−04 | 0.049% | 99.951% | | | |
| 4789289 | 2.10E−04 | 0.066% | 99.934% | | | |
| 4493865 | 2.39E−04 | 0.086% | 99.914% | | | |
| 4219189 | 2.81E−04 | 0.109% | 99.891% | | | |
| 3963593 | 3.57E−04 | 0.139% | 99.861% | | | |
| 3725529 | 4.08E−04 | 0.172% | 99.828% | | | |
| 3503612 | 4.73E−04 | 0.211% | 99.789% | | | |
| 3296583 | 4.78E−04 | 0.251% | 99.749% | | | |
| 3103295 | 4.96E−04 | 0.292% | 99.708% | | | |
| 2922685 | 5.00E−04 | 0.333% | 99.667% | | | |
| 2753797 | 5.67E−04 | 0.380% | 99.620% | | | |
| 2595769 | 6.28E−04 | 0.432% | 99.568% | | | |
| 2447789 | 6.97E−04 | 0.489% | 99.511% | | | |
| 2309128 | 7.74E−04 | 0.553% | 99.447% | | | |
| 2179119 | 8.65E−04 | 0.624% | 99.376% | | | |
| 2057136 | 9.43E−04 | 0.702% | 99.298% | 0.0E+00 | 0.000% | 100.000% |
| 1942621 | 9.64E−04 | 0.782% | 99.218% | 4.91E−05 | 0.004% | 99.996% |
| 1835050 | 9.92E−04 | 0.864% | 99.136% | 1.50E−04 | 0.016% | 99.984% |
| 1733948 | 1.05E−03 | 0.950% | 99.050% | 2.65E−04 | 0.038% | 99.962% |
| 1638872 | 1.16E−03 | 1.046% | 99.954% | 3.53E−04 | 0.067% | 99.933% |
| 1549416 | 1.25E−03 | 1.149% | 98.851% | 3.87E−04 | 0.099% | 99.901% |
| 1465207 | 1.34E−03 | 1.260% | 98.740% | 4.46E−04 | 0.136% | 99.864% |
| 1385900 | 1.44E−03 | 1.378% | 98.622% | 5.35E−04 | 0.180% | 99.820% |
| 1311173 | 1.59E−03 | 1.509% | 98.491% | 6.71E−04 | 0.236% | 99.764% |
| 1240729 | 1.75E−03 | 1.654% | 98.346% | 7.85E−04 | 0.301% | 99.699% |
| 1174297 | 1.94E−03 | 1.814% | 98.186% | 8.69E−04 | 0.372% | 99.628% |
| 1111624 | 2.08E−03 | 1.986% | 98.014% | 9.53E−04 | 0.451% | 99.549% |
| 1052471 | 2.25E−03 | 2.172% | 97.828% | 1.08E−03 | 0.540% | 99.460% |
| 996621 | 2.40E−03 | 2.370% | 97.630% | 1.24E−03 | 0.643% | 99.357% |
| 943874 | 2.62E−03 | 2.586% | 97.414% | 1.40E−03 | 0.758% | 99.242% |
| 894038 | 2.83E−03 | 2.819% | 97.181% | 1.55E−03 | 0.886% | 99.114% |
| 846937 | 3.06E−03 | 3.072% | 96.928% | 1.75E−03 | 1.030% | 98.970% |
| 802411 | 3.28E−03 | 3.342% | 96.658% | 1.98E−03 | 1.194% | 98.806% |
| 760305 | 3.52E−03 | 3.633% | 96.367% | 2.22E−03 | 1.377% | 98.623% |
| 720475 | 3.81E−03 | 3.947% | 96.053% | 2.49E−03 | 1.582% | 98.418% |
| 682791 | 4.15E−03 | 4.290% | 95.710% | 2.81E−03 | 1.815% | 98.185% |
| 647131 | 4.48E−03 | 4.660% | 95.340% | 3.23E−03 | 2.081% | 97.919% |
| 613373 | 4.81E−03 | 5.056% | 94.944% | 3.68E−03 | 2.385% | 97.615% |
| 581415 | 5.13E−03 | 5.479% | 94.521% | 4.12E−03 | 2.725% | 98.275% |
| 551152 | 5.42E−03 | 5.927% | 94.073% | 4.55E−03 | 3.101% | 96.899% |
| 522488 | 5.70E−03 | 6.397% | 93.603% | 4.98E−03 | 3.512% | 96.488% |
| 495336 | 5.93E−03 | 6.886% | 93.114% | 5.47E−03 | 3.964% | 96.036% |
| 469612 | 6.24E−03 | 7.401% | 92.599% | 5.99E−03 | 4.459% | 95.541% |
| 445238 | 6.60E−03 | 7.945% | 92.055% | 6.59E−03 | 5.002% | 94.998% |
| 422138 | 7.04E−03 | 8.526% | 91.474% | 7.21E−03 | 5.598% | 94.402% |
| 400243 | 7.44E−03 | 9.140% | 90.860% | 7.86E−03 | 6.247% | 93.753% |
| 379491 | 7.87E−03 | 9.789% | 90.211% | 8.52E−03 | 6.951% | 93.049% |
| 359818 | 8.30E−03 | 10.474% | 89.526% | 9.27E−03 | 7.716% | 92.284% |
| 341168 | 8.82E−03 | 11.201% | 88.799% | 1.01E−02 | 8.550% | 91.450% |
| 323483 | 9.32E−03 | 11.970% | 88.030% | 1.11E−02 | 9.463% | 90.537% |
| 306715 | 9.83E−03 | 12.781% | 87.219% | 1.20E−02 | 10.452% | 89.548% |
| 290814 | 1.03E−02 | 13.630% | 86.370% | 1.29E−02 | 11.519% | 88.481% |
| 275736 | 1.08E−02 | 14.520% | 85.480% | 1.39E−02 | 12.664% | 87.336% |
| 261437 | 1.13E−02 | 15.449% | 84.551% | 1.49E−02 | 13.891% | 86.109% |
| 247876 | 1.18E−02 | 16.421% | 83.579% | 1.59E−02 | 15.203% | 84.797% |
| 235014 | 1.23E−02 | 17.437% | 82.563% | 1.70E−02 | 16.604% | 83.396% |
| 222816 | 1.29E−02 | 18.501% | 81.499% | 1.80E−02 | 18.092% | 81.908% |

TABLE 6-continued

| | | | | | | |
|---|---|---|---|---|---|---|
| 211247 | 1.35E−02 | 19.612% | 80.388% | 1.91E−02 | 19.665% | 80.335% |
| 200274 | 1.40E−02 | 20.765% | 79.235% | 2.00E−02 | 21.315% | 78.685% |
| 189867 | 1.45E−02 | 21.961% | 78.039% | 2.09E−02 | 23.042% | 76.958% |
| 179996 | 1.50E−02 | 23.198% | 76.802% | 2.19E−02 | 24.845% | 75.155% |
| 170635 | 1.55E−02 | 24.479% | 75.521% | 2.27E−02 | 26.718% | 73.282% |
| 161757 | 1.60E−02 | 25.799% | 74.201% | 2.35E−02 | 28.656% | 71.344% |
| 153336 | 1.65E−02 | 27.160% | 72.840% | 2.41E−02 | 30.649% | 69.351% |
| 145351 | 1.70E−02 | 28.558% | 71.442% | 2.47E−02 | 32.691% | 67.309% |
| 137777 | 1.74E−02 | 29.995% | 70.005% | 2.52E−02 | 34.773% | 65.227% |
| 130595 | 1.78E−02 | 31.462% | 68.538% | 2.57E−02 | 36.895% | 63.105% |
| 123785 | 1.82E−02 | 32.961% | 67.039% | 2.61E−02 | 39.050% | 60.950% |
| 117326 | 1.85E−02 | 34.489% | 65.511% | 2.64E−02 | 41.232% | 58.768% |
| 111203 | 1.89E−02 | 36.047% | 63.953% | 2.66E−02 | 43.432% | 56.568% |
| 105396 | 1.92E−02 | 37.631% | 62.369% | 2.68E−02 | 45.644% | 54.356% |
| 99890 | 1.96E−02 | 39.244% | 60.756% | 2.69E−02 | 47.862% | 52.138% |
| 94670 | 1.99E−02 | 40.885% | 59.115% | 2.69E−02 | 50.079% | 49.921% |
| 89722 | 2.02E−02 | 42.555% | 57.445% | 2.67E−02 | 52.284% | 47.716% |
| 85030 | 2.05E−02 | 44.245% | 55.755% | 2.65E−02 | 54.474% | 45.526% |
| 80582 | 2.07E−02 | 45.953% | 54.047% | 2.63E−02 | 56.641% | 43.359% |
| 76366 | 2.09E−02 | 47.676% | 52.324% | 2.59E−02 | 58.777% | 41.223% |
| 72370 | 2.10E−02 | 49.410% | 50.590% | 2.54E−02 | 60.872% | 39.128% |
| 68582 | 2.11E−02 | 51.152% | 48.848% | 2.49E−02 | 62.925% | 37.075% |
| 64992 | 2.12E−02 | 52.897% | 47.103% | 2.43E−02 | 64.931% | 35.069% |
| 61589 | 2.12E−02 | 54.642% | 45.358% | 2.37E−02 | 66.887% | 33.113% |
| 58364 | 2.11E−02 | 56.383% | 43.617% | 2.30E−02 | 68.787% | 31.213% |
| 55308 | 2.10E−02 | 58.113% | 41.887% | 2.23E−02 | 70.625% | 29.375% |
| 52412 | 2.08E−02 | 59.828% | 40.172% | 2.15E−02 | 72.400% | 27.600% |
| 49668 | 2.06E−02 | 61.527% | 38.473% | 2.07E−02 | 74.107% | 25.893% |
| 47067 | 2.03E−02 | 63.205% | 36.795% | 1.98E−02 | 75.743% | 24.257% |
| 44603 | 2.01E−02 | 64.863% | 35.137% | 1.90E−02 | 77.308% | 22.692% |
| 42269 | 1.97E−02 | 66.491% | 33.509% | 1.81E−02 | 78.800% | 21.200% |
| 40057 | 1.93E−02 | 68.086% | 31.914% | 1.72E−02 | 80.222% | 19.778% |
| 37961 | 1.88E−02 | 69.640% | 30.360% | 1.64E−02 | 81.574% | 18.426% |
| 35976 | 1.83E−02 | 71.150% | 28.850% | 1.55E−02 | 82.855% | 17.145% |
| 34095 | 1.77E−02 | 72.614% | 27.386% | 1.46E−02 | 84.062% | 15.938% |
| 32314 | 1.71E−02 | 74.027% | 25.973% | 1.37E−02 | 85.197% | 14.803% |
| 30626 | 1.65E−02 | 75.387% | 24.613% | 1.29E−02 | 86.261% | 13.739% |
| 29027 | 1.58E−02 | 76.691% | 23.309% | 1.21E−02 | 87.260% | 12.740% |
| 27513 | 1.51E−02 | 77.940% | 22.060% | 1.14E−02 | 88.198% | 11.802% |
| 26078 | 1.45E−02 | 79.137% | 20.863% | 1.06E−02 | 89.076% | 10.924% |
| 24719 | 1.39E−02 | 80.283% | 19.717% | 9.94E−03 | 89.896% | 10.104% |
| 23432 | 1.33E−02 | 81.380% | 18.620% | 9.27E−03 | 90.661% | 9.339% |
| 22213 | 1.28E−02 | 82.435% | 17.565% | 8.69E−03 | 91.378% | 8.622% |
| 21058 | 1.23E−02 | 83.451% | 16.549% | 8.16E−03 | 92.051% | 7.949% |
| 19964 | 1.18E−02 | 84.422% | 15.578% | 7.70E−03 | 92.687% | 7.313% |
| 18928 | 1.12E−02 | 85.347% | 14.653% | 7.24E−03 | 93.284% | 6.716% |
| 17946 | 1.06E−02 | 86.224% | 13.776% | 6.77E−03 | 93.843% | 6.157% |
| 17016 | 1.02E−02 | 87.062% | 12.938% | 6.30E−03 | 94.363% | 5.637% |
| 16136 | 9.67E−03 | 87.860% | 12.140% | 5.88E−03 | 94.849% | 5.151% |
| 15301 | 9.21E−03 | 88.619% | 11.381% | 5.50E−03 | 95.303% | 4.697% |
| 14511 | 8.70E−03 | 89.337% | 10.663% | 5.12E−03 | 95.725% | 4.275% |
| 13763 | 8.21E−03 | 90.014% | 9.986% | 4.75E−03 | 96.117% | 3.883% |
| 13053 | 7.77E−03 | 90.655% | 9.345% | 4.36E−03 | 96.477% | 3.523% |
| 12381 | 7.34E−03 | 91.261% | 8.739% | 3.97E−03 | 96.804% | 3.196% |
| 11745 | 6.94E−03 | 91.834% | 8.166% | 3.60E−03 | 97.101% | 2.899% |
| 11142 | 6.54E−03 | 92.373% | 7.627% | 3.33E−03 | 97.376% | 2.624% |
| 10571 | 6.19E−03 | 92.884% | 7.116% | 3.12E−03 | 97.633% | 2.367% |
| 10029 | 5.86E−03 | 93.367% | 6.633% | 2.92E−03 | 97.874% | 2.126% |
| 9516 | 5.60E−03 | 93.829% | 6.171% | 2.71E−03 | 98.098% | 1.902% |
| 9030 | 5.31E−03 | 94.268% | 5.732% | 2.49E−03 | 98.304% | 1.696% |
| 8569 | 5.04E−03 | 94.684% | 5.316% | 2.27E−03 | 98.491% | 1.509% |
| 8133 | 4.73E−03 | 95.074% | 4.926% | 2.03E−03 | 98.658% | 1.342% |
| 7719 | 4.41E−03 | 95.437% | 4.563% | 1.83E−03 | 98.809% | 1.191% |
| 7327 | 4.07E−03 | 95.773% | 4.227% | 1.67E−03 | 98.947% | 1.053% |
| 6955 | 3.77E−03 | 96.084% | 3.916% | 1.59E−03 | 99.078% | 0.922% |
| 6602 | 3.54E−03 | 96.375% | 3.625% | 1.50E−03 | 99.202% | 0.798% |
| 6268 | 3.33E−03 | 96.650% | 3.350% | 1.38E−03 | 99.316% | 0.684% |
| 5951 | 3.13E−03 | 96.909% | 3.091% | 1.20E−03 | 99.415% | 0.585% |
| 5651 | 2.92E−03 | 97.150% | 2.850% | 1.01E−03 | 99.498% | 0.502% |
| 5366 | 2.74E−03 | 97.376% | 2.624% | 8.50E−04 | 99.569% | 0.431% |
| 5096 | 2.58E−03 | 97.588% | 2.412% | 7.38E−04 | 99.629% | 0.371% |
| 4839 | 2.44E−03 | 97.789% | 2.211% | 6.92E−04 | 99.687% | 0.313% |
| 4596 | 2.29E−03 | 97.979% | 2.021% | 7.12E−04 | 99.745% | 0.255% |
| 4366 | 2.15E−03 | 98.156% | 1.844% | 7.16E−04 | 99.804% | 0.196% |
| 4147 | 1.98E−03 | 98.319% | 1.681% | 6.53E−04 | 99.858% | 0.142% |
| 3939 | 1.80E−03 | 98.468% | 1.532% | 5.06E−04 | 99.900% | 0.100% |
| 3742 | 1.65E−03 | 98.604% | 1.396% | 3.83E−04 | 99.932% | 0.068% |
| 3555 | 1.53E−03 | 98.730% | 1.270% | 2.94E−04 | 99.956% | 0.044% |
| 3378 | 1.43E−03 | 98.849% | 1.151% | 2.72E−04 | 99.978% | 0.022% |

TABLE 6-continued

| | | | | | | | |
|---|---|---|---|---|---|---|---|
| 3209 | 1.31E−03 | 98.956% | 1.044% | 1.72E−04 | 99.993% | 0.007% | |
| 3049 | 1.20E−03 | 99.055% | 0.945% | 8.91E−05 | 100.000% | 0.000% | |
| 2897 | 1.11E−03 | 99.147% | 0.853% | 0.0E+00 | | | |
| 2753 | 1.07E−03 | 99.236% | 0.764% | | | | |
| 2616 | 1.04E−03 | 99.322% | 0.678% | | | | |
| 2486 | 1.00E−03 | 99.404% | 0.596% | | | | |
| 2362 | 8.96E−04 | 99.478% | 0.522% | | | | |
| 2244 | 7.58E−04 | 99.541% | 0.459% | | | | |
| 2133 | 6.20E−04 | 99.592% | 0.408% | | | | |
| 2027 | 5.96E−04 | 99.641% | 0.359% | | | | |
| 1926 | 6.05E−04 | 99.691% | 0.309% | | | | |
| 1830 | 6.21E−04 | 99.742% | 0.258% | | | | |
| 1739 | 5.64E−04 | 99.789% | 0.211% | | | | |
| 1652 | 5.07E−04 | 99.831% | 0.169% | | | | |
| 1570 | 4.67E−04 | 99.869% | 0.131% | | | | |
| 1491 | 4.43E−04 | 99.906% | 0.094% | | | | |
| 1416 | 3.86E−04 | 99.937% | 0.063% | | | | |
| 1346 | 3.21E−04 | 99.964% | 0.036% | | | | |
| 1278 | 2.40E−04 | 99.984% | 0.016% | | | | |
| 1214 | 1.44E−04 | 99.996% | 0.004% | | | | |
| 1153 | 5.57E−05 | 100.000% | 0.000% | | | | |
| 1094 | 0.00E+00 | | | | | | |
| 1039 | | | | | | | |
| 986 | | | | | | | |
| 936 | | | | | | | |

From the raw GPC molecular weight data in Table 6, FIGS. 21–22 were generated to provide high molecular weight/weight fraction comparisons between the inventive compositions and comparative composition 3. These molecular weight comparisons indicate that comparative composition 3 includes a significant amount of ultra high molecular weight material (i.e., about 0.2 weight percent of the composition has a molecular weight greater than or equal to 3.5 Million grams/mole), whereas none of this ultra high molecular weight material is present for the inventive examples. Surprisingly, however, although comparative composition 3 contains a significant amount of ultra high molecular weight material and exhibits good processibility, such does not translate into superior tear resistance. That is, the inventive compositions have equivalent to or superior tear resistance relative to comparative composition 3 although the inventive compositions do not contain such ultra high molecular weight polymer portions. Thus, unexpectedly, the inventive examples represent the ability to use higher compositional uniformity to compensate for lower molecular weight and still achieve excellent film tear resistance and as such ultra high molecular weights are not required for excellent blown film tear resistance.

In another evaluation, the effect of product $I_{10}/I_2$ and specific process variations were investigated at a nominal composition density of 0.918 g/cc. In this evaluation, Inventive Composition 9 was compared to four other inventive compositions, Inventive Compositions 11–14. Inventive Compositions 11–14 were manufactured using essentially the same polymerization system as described herein above for Inventive Composition 2. While make-up comonomer (i.e., 1-octene) was only fed to the first reactor for all inventive composition in the evaluation, Table 7 shows the specific variation in polymer production weight percent split between the first and second reactors as well as a variation with regard to injection of the catalyst system and the feed (i.e., make-up ethylene and comonomer). FIGS. 26 and 27 further illustrate the injection variation in this evaluation. FIG. 26 shows simultaneous injection of the Ziegler-Natta catalyst system and make-up feed using a mechanical agitator (i.e., a Lightening Mixer) and FIG. 27 shows the separate injection of the Ziegler-Natta catalyst system and make-up feed as well as two make-up feed injection points.

Nominal 0.8 mil (0.02 mm) blown film was fabricated from the inventive compositions using a Sterling blown film unit equipped with 3.5 inch diameter (8.9 cm), 30:1 L/D extruder and an 8 inch (20.3 cm) annular die. The density, $I_2$, $I_{10}/I_2$ as well as tear and impact performance of the composition were measured and are also reported in Table 7.

Table 7 shows that Inventive Compositions 12–14 exhibit a better balance of properties relative to Inventive Compositions 9 and 11, and as such Inventive Compositions 12–14 represent especially preferred embodiments of the present invention. This product preference is attributed to a combination of product and process or system preferences as Table 7 indicates that Inventive Compositions 12–14 are distinguished by (1) having an $I_{10}/I_2$ in the range of 8 to 10.4, (2) a first reactor split of less than 36 percent and (3) separate injection of the catalyst system and the make-up feed as opposed to simultaneous introduction (such as, for example, as in Inventive Composition 9 wherein the catalyst and make-up feed are injected together and mixed with reaction stream contents in a mechanical mixer) or pre-mixing of the catalyst system and the make-up feed.

Within the purview of the present invention, it appears the most improved property balance is achieved when the first reactor polymer split is less than 36 weight percent, preferably less than 31 weight percent, more preferably less than or equal to 27 percent and when the make-up (fresh) feed is injected into the reaction stream and allowed some time to mix with reaction stream contents before it is contacted with fresh catalyst. In a continuous polymerization process, the delay between the injection of make-up feed and the injection of fresh catalyst is established by injector design, size of the polymerization system (piping and equipment lengths, 5 diameters, etc.) and reaction stream velocity. Most preferably, in the present invention, the delay in injection time or contact time is preferably at least 2 seconds and more preferably at least 5 seconds.

The separate injection or delayed contacting and mixing of fresh catalyst and make-up feed can be achieved with any convenient means known in the art, including using a mechanical mixer for each separate injection point or a combination of a mechanical mixer at one injection point and a static mixer (e.g., a Kenix mixer) at the another injection point. However, preferably, static mixers are employed at the various injection points; that is, injection is accomplished without the use of mechanical mixer or stirrer devices. Also, preferably, the polymerization system is provided with at least two separate make-up feed injection points (multiple injection points) in at least one reactor.

(fresh) comonomer feed into the first reactor (as opposed to $I_{10}/I_2$ ratios greater than 10.4 for both Inventive Compositions 1 and 15 and make-up comonomer injection into the second reactor as for Inventive Composition 1). As such, in especially preferred embodiments, make-up comonomer is separately injected early in the polymerization system, for

TABLE 7

| Example | Composition Density | $I_2$, g/10 min. | $I_{10}/I_2$ | Polymer Split* | Comonomer Make-up to Reactor # | Injection Point Mixer | Elmendorf MD Tear, g/mil | Dart Impact, grams |
|---|---|---|---|---|---|---|---|---|
| Inv. Ex. 9  | 0.9188 | 0.5  | 10.32 | 25.6 | 1 | mechanical | 509 | 250 |
| Inv. Ex. 11 | 0.9182 | 0.54 | 10.63 | 37   | 1 | static | 604 | 312 |
| Inv. Ex. 12 | 0.918  | 0.48 | 8.38  | 30.5 | 1 | static | 449 | >850 |
| Inv. Ex. 13 | 0.9182 | 0.51 | 10.17 | 30.7 | 1 | static | 489 | 620 |
| Inv. Ex. 14 | 0.9179 | 0.47 | 10.18 | 25.6 | 1 | static | 598 | 722 |

Elmendorf MD Tear was measured as Type B and determined in accordance with ASTM D1922.
Dart Impact was measured as Method A and determined in accordance with ASTM D1709.
*Polymer split refers to the weight percent of polymer production that occurred in the first reactor of the two reactor polymerization system used to manufacture the inventive compositions.

In another evaluation, the effect of product $I_{10}/I_2$ and specific process variations were investigated at a nominal composition density of 0.927 g/cc. In this evaluation, Inventive Compositions 1 and 2 were compared to Inventive Composition 15. Inventive Composition 15 was manufactured using essentially the same polymerization system as described herein above for Inventive Composition 2. Kenix static mixers were used at the various injection points as shown in FIG. 27 for all three inventive compositions. Table 8 shows the polymer split was essentially the same for all three inventive compositions, however, Inventive Composition 1 differed from the other two by having make-up comonomer injected into the second reactor as opposed to the first reactor.

Nominal 3.0 mil (0.08 mm) blown film was fabricated from these inventive compositions using a Macro blown film unit equipped with a 6 inch (15.2 cm) annular die at a 40 mil (1 mm) die gap. The density, $I_2$, $I_{10}/I_2$ as well as tear and impact performance of the various compositions were measured and are also reported in Table 8.

example, but not limited to, into the first reactor of a multiple reactor system, wherein the first reactor refers to the reactor furthermost from the product outlet.

In another evaluation, the effect of melt index and process percent ethylene conversion were investigated at a nominal composition density of 0.916 g/cc–0.918 g/cc. In this evaluation, Inventive Compositions 16–19 were manufactured using essentially the same polymerization system as described herein above for Inventive Composition 12. In particular, static mixers were employed and the comonomer make-up was directed to the first reactor of the two-reactor polymerization system and was injected separate from the catalyst feed, comonomer flow was adjusted to provide the composition density per sample listed in Table 9, hydrogen flow was controlled to each reactor to provide the melt index and $I_{10}/I_2$ values listed per sample in Table 9 and the polymer split to first reactor was as shown per sample in Table 9. Percent ethylene conversion in the first reactor was varied by known techniques (e.g. by controlling the catalyst feed rate to the reaction stream).

TABLE 8

| Example | Composition Density | $I_2$, g/10 min. | $I_{10}/I_2$ | Polymer Split* | Comonomer Make-up to Reactor # | Injection Point Mixer | Elmendorf MD Tear, g/mil | Dart Impact, grams |
|---|---|---|---|---|---|---|---|---|
| Inv. Ex. 1  | 0.927  | 0.46 | 10.46 | 30.4 | 2 | static | 241 | 313 |
| Inv. Ex. 2  | 0.9274 | 0.39 | 10.25 | 30.3 | 1 | static | 264 | 457 |
| Inv. Ex. 15 | 0.9275 | 0.5  | 11.67 | 30.3 | 1 | static | 246 | 394 |

Elmendorf MD Tear was measured as Type B and determined in accordance with ASTM D1922.
Dart Impact was measured as Method A and determined in accordance with ASTM D1709.
*Polymer split refers to the weight percent of polymer production that occurred in the first reactor of the two reactor polymerization system used to manufacture the inventive compositions.

Relative to Inventive Compositions 1 and 15, Table 8 shows that Inventive Composition 2 exhibits a better balance of properties, and as such (like Inventive Compositions 12–14 above) Inventive Composition 2 represents an especially preferred embodiment of the present invention. The improved balance of properties embodied by Inventive Composition 2 is also attributed to a combination of product and process or system preferences. That is, Table 8 indicates that Inventive Composition 2 is distinguished by (1) having an $I_{10}/I_2$ in the range of 8 to 10.4, (2) separate injection of the catalyst system and the make-up feed and (3) make-up Nominal 3.0 mil (0.08 mm) blown film was fabricated from these inventive compositions using a Macro blown film unit equipped with a 6 inch (15.2 cm) annular die at a 40 mil (1 mm) die gap. The density, $I_2$, $I_{10}/I_2$ as well as tear and impact performance of the various compositions were measured. The dart impact was determined using a modification of ASTM D-1709 Method A (i.e. a 3 kg weight was used) since the film samples did not fail under the standard test (i.e. values were all greater than 850 grams). In addition to the process and product details, Table also provide the tear and impact performance properties of Inventive Composition 16–19 as compared to Inventive Composition 12.

TABLE 9

| Example | Composition Density | $I_2$, g/10 min. | $I_{10}/I_2$ | Polymer Split* | Percent $C_2$ Conversion | $M_w/M_n$ | $W_{critical}$† | $W_{measured}$†† | $T_{DPT}$ above 75° C. | Elmendorf MD Tear, g/mil | Dart Impact, grams |
|---|---|---|---|---|---|---|---|---|---|---|---|
| Inv. Ex. 12 | 0.9180 | 0.48 | 8.38 | 30.5 | 75 | ≧4 | 30.4 | 36.1 | 81.4 | 449 | 742 |
| Inv. Ex. 16 | 0.9183 | 0.48 | 8.39 | 25.7 | 76 | 4.0 | 31.0 | 32.4 | 80.8 | 364 | 816 |
| Inv. Ex. 17 | 0.9156 | 0.50 | 8.06 | 25.6 | 76 | 4.1 | 25.5 | 28.3 | 80.8 | 475 | 924 |
| Inv. Ex. 18 | 0.9185 | 0.44 | 8.10 | 25.6 | 89 | 4.1 | 31.5 | 35.9 | 80.4 | 457 | 897 |
| Inv. Ex. 19 | 0.9175 | 0.72 | 8.33 | 25.7 | 89 | 4.2 | 29.3 | 30.2 | 80.9 | 485 | 1004 |

Elmendorf MD Tear was measured as Type B and determined in accordance with ASTM D1922.
Dart Impact was measured using a modification of ASTM D1709 Method A (i.e. the dart travel distance after film rupture was increased to 2 feet (61 centimeters) and the total weight was increased to 1500 grams).
*Polymer split refers to the weight percent of polymer production that occurred in the first reactor of the two reactor polymerization system used to manufacture the inventive compositions.
†$W_{critical}$ denotes the weight percent crystallized polymer portions at the dominant peak temperature above 75° C. as calculated from the equation $1.7946 \times 10^{-28} \times 10^{(31.838 \times composition\ density)}$ wherein composition density is in grams/cubic centimeter and the dominant peak temperature is determined using crystallization analysis fractionation through the range of 20 to 100° C..
††$W_{measured}$ denotes the weight percent crystallized polymer portions at the dominant peak temperature above 75° C., as determined using crystallization analysis fractionation in the range of 20 to 100° C..

The results in Table 9 show that Inventive Composition 19 exhibits outstanding property balance, as it surprisingly had the highest tear resistance and impact resistance of all samples evaluated even though it melt index was relatively high. As such, Inventive Composition 19 represents the most preferred embodiment of the present invention wherein, in addition to being characterized as having an $I_{10}/I_2$ in the range of 8 to 10.4 and being manufactured using separate injection of the catalyst system and the make-up feed and by injecting make-up (fresh) comonomer feed into the first reactor, this most preferred embodiment of the present invention is further characterized as having an $I_{10}/I_2$ in the range of 8 to 8.5, being manufactured using a polymer split for the first reactor which is relatively low (i.e. less than or equal to 27 weight percent) and by controlling the weight percent comonomer conversion for the first reactor at a relatively high level (i.e. at greater than 75 weight percent, more preferably at greater than or equal to 80 weight percent and most preferably at greater than or equal to 87 weight percent).

We claim:

1. A process for making an ethylene polymer composition, the process having at least two injection points and at least two polymerization reactors, each reactor having a reaction stream or zone wherein at least one catalyst system and make-up feed is injected and wherein the make-up feed comprises ethylene and optionally at least one unsaturated comonomer, and comprising continuously operating the at least two polymerization reactors and separately injecting the catalyst system and the make-up feed into the reaction stream or zone of at least one reactor, the composition comprising ethylene interpolymerized with at least one unsaturated comonomer and characterized as having:
 a) a melt flow ratio, $I_{10}/I_2$, from 8 to 10.4,
 b) a $M_w/M_n$ of greater than 4 as determined by gel permeation chromatography,
 c) a melt index, $I_2$, from 0.1 to 10 gram/10 minutes,
 d) a composition density less than 0.945 gram/cubic centimeter, and
 e) based on the total weight of crystallizable polymer portions, a weight percent at the dominant peak temperature above 75° C., as determined using crystallization analysis fractionation in the range of 20 to 100° C., equal to or greater than the mathematical product of $1.7946 \times 10^{-28} \times 10^{(31.839 \times composition\ density)}$ for composition density in grams/cubic centimeter.

2. The process of claim 1 wherein the at least one unsaturated comonomer is a $C_3$–$C_{20}$ α-olefin.

3. The process of claim 1 wherein the interpolymer is a copolymer of ethylene and 1-octene.

4. The process of claim 1 wherein one of the at least two reactors is a recirculating loop reactor.

5. The process of claim 1 wherein the at least two reactors are recirculating loop reactors.

6. The process of claim 1 wherein the process is operated non-adiabatically.

7. The process of claim 6 wherein the system further comprises at least one heat exchange apparatus which removes the heat of reaction or polymerization from the reaction stream of the process at a rate of at least 7.4 kW/m$^3$·° K.

8. The process of claim 2 wherein the separate injection provides a contacting and mixing delay between injected catalyst and injected make-feed of at least 2 seconds.

9. The process of claim 1 wherein static mixers are employed at make-up feed injection points.

10. The process of claim 1 wherein static mixers are employed at catalyst and make-up feed injection points.

11. The process of claim 1 wherein the system further comprises at least two make-up feed injection points.

12. The process of claim 1 wherein make-up comonomer is injected into the first reactor.

* * * * *